US012547061B2

(12) United States Patent
Maruyama et al.

(10) Patent No.: US 12,547,061 B2
(45) Date of Patent: Feb. 10, 2026

(54) LIGHT SOURCE APPARATUS AND PROJECTOR

(71) Applicant: SEIKO EPSON CORPORATION, Tokyo (JP)

(72) Inventors: Kiyotaka Maruyama, Matsumoto (JP); Makoto Zakoji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/040,090

(22) Filed: Jan. 29, 2025

(65) Prior Publication Data

US 2025/0244654 A1     Jul. 31, 2025

(30) Foreign Application Priority Data

Jan. 30, 2024    (JP) ................. 2024-012213

(51) Int. Cl.
*G03B 21/20*      (2006.01)
*F21V 8/00*      (2006.01)

(52) U.S. Cl.
CPC .......... *G03B 21/208* (2013.01); *G02B 6/0008* (2013.01)

(58) Field of Classification Search
CPC ... G03B 21/208; G02B 6/0006; G02B 6/0008
See application file for complete search history.

(56) References Cited

U.S. PATENT DOCUMENTS

| | | | |
|---|---|---|---|
| 11,953,818 B2 | 4/2024 | Iwama | |
| 12,235,485 B1 * | 2/2025 | Jones | G02B 1/005 |
| 2019/0278018 A1 * | 9/2019 | Angelini | G02B 6/0008 |
| 2020/0166828 A1 * | 5/2020 | Sakata | G03B 33/12 |
| 2020/0174352 A1 * | 6/2020 | Suzuki | G03B 21/204 |

(Continued)

FOREIGN PATENT DOCUMENTS

| | | |
|---|---|---|
| JP | 2023-140582 A | 10/2023 |
| WO | WO 2020/078790 A | 4/2020 |

*Primary Examiner* — Alexander K Garlen

(74) *Attorney, Agent, or Firm* — Dority & Manning, P.A.

(57) ABSTRACT

A light source apparatus includes a light guide having a side surface extending in a first direction and first and second end surfaces; an angle converter bonded to the first end surface; a base; a substrate on which a light source configured to output light toward the side surface is mounted and which is fixed to the base; and a cover member fixed to the base and configured to accommodate along with the base the angle converter, the base including a first accommodating section configured to accommodate the light guide in a state in which the side surface is exposed, the light guide fixed to the first accommodating section, and a second accommodating section configured to accommodate along with the cover member an accommodated section that is a portion from the angle converter to a portion of the light guide that faces the angle converter, the second accommodating section and the cover member surrounding a circumference of the accommodated section and form an accommodating space configured to accommodate the accommodated section, a portion of the light guide that is fixed to the first accommodating section being a fixed end, and a portion of the light guide that has the first end surface, to which the angle converter is bonded, and faces the angle converter being a free end.

13 Claims, 29 Drawing Sheets

(56) References Cited

U.S. PATENT DOCUMENTS

| | | | | |
|---|---|---|---|---|
| 2020/0201156 A1* | 6/2020 | Suzuki | ............... | H04N 9/3105 |
| 2020/0201157 A1* | 6/2020 | Suzuki | ............... | G02B 6/0003 |
| 2020/0218001 A1* | 7/2020 | Hoelen | ................. | F21V 9/30 |
| 2021/0297640 A1* | 9/2021 | Sakata | ............... | H04N 9/3158 |
| 2022/0066307 A1* | 3/2022 | Sakata | ............... | G03B 21/208 |
| 2022/0342137 A1* | 10/2022 | Yu | ..................... | G02B 6/0003 |
| 2023/0090913 A1* | 3/2023 | Hoelen | ............ | G02B 19/0066 |
| | | | | 362/551 |
| 2023/0221628 A1* | 7/2023 | Sakata | ............ | G03B 21/2066 |
| | | | | 353/98 |
| 2023/0305372 A1* | 9/2023 | Iwama | ............... | G03B 21/204 |

* cited by examiner

LIGHT SOURCE APPARATUS AND PROJECTOR

The present application is based on, and claims priority from JP Application Serial Number 2024-012213, filed Jan. 30, 2024, the disclosure of which is hereby incorporated by reference herein in its entirety.

BACKGROUND

1. Technical Field

The present disclosure relates to a light source apparatus and a projector.

2. Related Art

There is a known light source apparatus including a wavelength converting apparatus that converts the wavelength of light incident from a light source and outputs the resultant light. As such a light source apparatus, there is a known light source apparatus including an elongated columnar wavelength converter (see JP-A-2023-140582, for example).

The light source apparatus described in JP-A-2023-140582 includes a wavelength converting member, a light source section, an angle converting member, a mirror, a support member, and a position restricting member.

The wavelength converting member contains at least a phosphor, and converts excitation light having a first wavelength band into fluorescence having a second wavelength band different from the first wavelength band. The wavelength converting member is formed in a quadrangular columnar shape and has first to sixth surfaces. The first and second surfaces intersect with the longitudinal direction of the wavelength converting member and are located opposite each other. The third to sixth surfaces intersect with each of the first and second surfaces.

The light source section includes a light emitter that emits the excitation light having the first wavelength band. The light emitting surface of the light emitter faces the third surface of the wavelength converting member.

The angle converting member is formed in a truncated quadrangular pyramidal shape, and is fixed to the first surface of the wavelength converting member with an optical adhesive. The angle converting member makes the maximum exiting angle of the fluorescence that exits via the light exiting surface smaller than the maximum incident angle of the fluorescence incident on the light incident surface from the wavelength converting member.

The mirror is provided at the second surface of the wavelength converting member, and reflects the light incident via the second surface to cause the reflected light to enter the wavelength converting member.

The support member is provided so as to surround the circumference of the wavelength converting member, and diffuses heat generated in the wavelength converting member to dissipate the heat out of the wavelength converting member.

The position restricting member restricts the position of the wavelength converting member relative to the support member.

JP-A-2023-140582 is an example of the related art.

In the light source apparatus described in JP-A-2023-140582, the angle converting member is exposed to the space outside the support member. There is therefore a problem of failure in protecting the angle converting member. There is therefore a risk of separation of the angle converting member from a light guide, for example, when an external force acts on the angle converting member.

It has therefore been required to provide a configuration capable of protecting the angle converting member.

SUMMARY

A light source apparatus according to a first aspect of the present disclosure includes: a light guide having a side surface extending in a first direction and a first end surface and a second end surface that intersect with the side surface and are located opposite each other; an angle converter bonded to the first end surface and configured to convert an angle of light output via the first end surface; a base at which the light guide is disposed; a substrate on which a light source configured to output light toward the side surface is mounted, the substrate disposed at a side opposite the base with the light guide therebetween to cover the light guide, the substrate fixed to the base; and a cover member fixed to the base and configured to accommodate along with the base the angle converter, the base including a first accommodating section configured to accommodate the light guide in a state in which the side surface is exposed, the light guide fixed to the first accommodating section, and a second accommodating section configured to accommodate along with the cover member an accommodated section that is a portion from the angle converter to a portion of the light guide that faces the angle converter, the second accommodating section and the cover member surrounding a circumference of the accommodated section and form an accommodating space configured to accommodate the accommodated section, a portion of the light guide that is fixed to the first accommodating section is a fixed end, and a portion of the light guide that has the first end surface, to which the angle converter is bonded, and faces the angle converter is a free end.

A projector according to a second aspect of the present disclosure includes: the light source apparatus according to the first aspect described above; a light modulator configured to modulate light output from the light source apparatus to form image light; and a projection optical apparatus configured to project the image light.

A light source apparatus according to a third aspect of the present disclosure includes: a light guide having a side surface extending in a first direction and a first end surface that intersects with the side surface; an angle converter bonded to the first end surface and configured to convert an angle of light output via the first end surface; a base at which the light guide is disposed; a substrate on which a light source configured to output light toward the side surface is mounted, the substrate disposed at a side opposite the base with the light guide therebetween, the substrate fixed to the base; and a cover member having a first inner surface configured to form along with the base an accommodating space configured to accommodate an accommodated section that is a portion from the angular converter to a portion of the light guide that faces the angular converter, the cover member disposed at a side opposite the base with the angular converter therebetween, the cover member fixed to the base, the base including a first accommodating section to which the light guide is fixed in a state in which the side surface is exposed, and a second accommodating section having a second inner surface configured to form along with the cover member the accommodating space, the second accommodating section configured to accommodate along with the cover member the accommodated section in the accommodating space, a portion of the light guide that is fixed to the first accommodating section being a fixed end, a portion of the light guide that has the first end surface, to which the angle converter is bonded, and faces the angle converter being a free end, and the angular converter being in contact with none of the first and second inner surfaces.

A light source apparatus according to a fourth aspect of the present disclosure includes: a light guide having a side surface extending in a first direction and a first end surface that intersects with the side surface; an angle converter bonded to the first end surface and configured to convert an angle of light output via the first end surface; a holder including a holding section configured to hold the side surface and a fixed section fixed to the angular converter, the holder disposed so as to extend over a portion where the light guide and the angular converter are bonded to each other; a base at which the light guide is disposed; a substrate on which a light source configured to output light toward the side surface is mounted, the substrate disposed at a side opposite the base with the light guide therebetween, the substrate fixed to the base; and a cover member having a first inner surface configured an accommodating space to form along with the base configured to accommodate an accommodated section that is a portion from the angular converter to a portion of the light guide that faces the angular converter, the accommodated section including the holder, the cover member disposed at a side opposite the base with the angular converter therebetween, the cover member fixed to the base, the base including a first accommodating section to which the light guide is fixed in a state in which the side surface is exposed, and a second accommodating section having a second inner surface configured to form along with the cover member the accommodating space, the second accommodating section configured to accommodate along with the cover member the accommodated section in the accommodating space, a portion of the light guide that is fixed to the first accommodating section being a fixed end, a portion of the light guide that has the first end surface, to which the angle converter is bonded, and faces the angle converter being a free end, and the holder being in contact with none of the first and second inner surfaces.

A light source apparatus according to a fifth aspect of the present disclosure includes: a light outputting member extending in a first direction and configured to output light in the first direction; a base at which the light outputting member is disposed; a light source configured to output light to be incident on the light outputting member along a second direction that intersects with the first direction; a substrate on which the light source is mounted, the substrate disposed at a side opposite the base with the light outputting member therebetween in the second direction, the substrate covering a portion of the light outputting member that is oriented in an opposite direction of the second direction; and a cover member disposed at a side opposite the base with the light outputting member therebetween, the light outputting member including a light guide extending in the first direction and having a side surface on which the light output from the light source is incident, and an end surface that is located at a position shifted in the first direction and intersects with the side surface, and an angle converter bonded to the end surface and configured to convert an angle of light output via the end surface, the base including a first accommodating section to which the light guide is fixed in a state in which the side surface is exposed, and a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at the position shifted in the first direction, and the accommodated section is not in contact with an inner surface of the accommodating space.

A light source apparatus according to a sixth aspect of the present disclosure includes: a light outputting member extending in a first direction and configured to output light in the first direction; a base at which the light outputting member is disposed; a light source configured to output light to be incident on the light outputting member along a second direction that intersects with the first direction; a substrate on which the light source is mounted, the substrate disposed at a side opposite the base with the light outputting member therebetween in the second direction, the substrate covering a portion of the light outputting member that is oriented in an opposite direction of the first direction; and a cover member disposed at a side opposite the base with the light outputting member therebetween, the light outputting member including a light guide extending in the first direction and having a side surface on which the light output from the light source is incident, and an end surface that is located at a position shifted in the first direction and intersects with the side surface, an angle converter bonded to the end surface and configured to convert an angle of light output via the end surface, and a holder including a holding section configured to hold the side surface and a fixed section fixed to the angular converter, the holder disposed so as to extend over a portion where the light guide and the angular converter are bonded to each other, the base including a first accommodating section to which the light guide is fixed in a state in which the side surface is exposed, and a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at a position shifted in the first direction, the accommodated section including the holder, and the accommodated section is not in contact with an inner surface of the accommodating space.

DESCRIPTION OF EMBODIMENTS

First Embodiment

Figure 1:
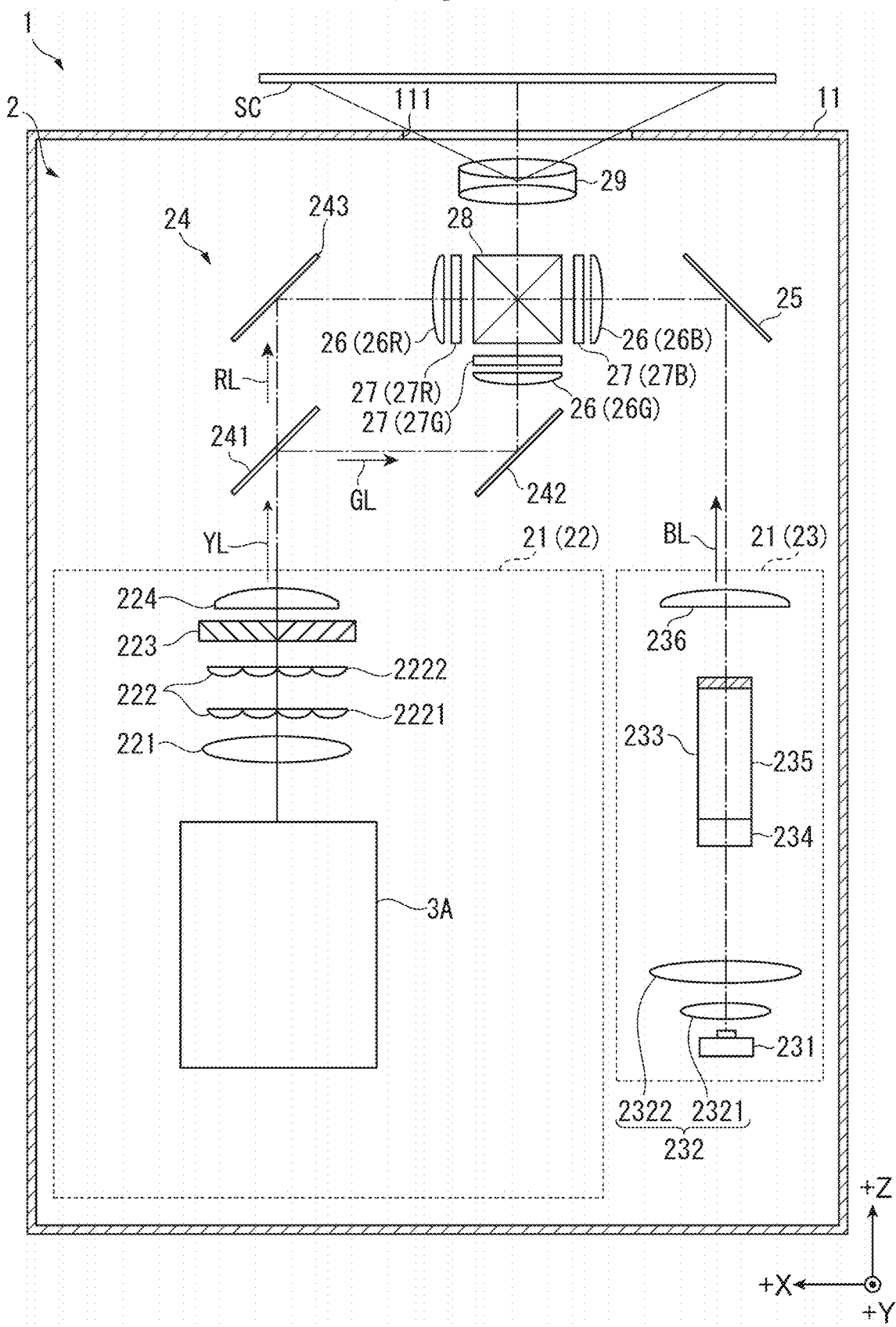
FIG. 1 is a diagrammatic view showing the configuration of a projector according to a first embodiment.

A first embodiment of the present disclosure will be described below with reference to the drawings.
Schematic Configuration of Projector FIG. 1 is a diagrammatic view showing the configuration of a projector 1 according to the present embodiment.

The projector 1 according to the present embodiment is a display apparatus that modulates the light output from a light source to form image light, enlarges the formed image light, and projects the enlarged image light onto a projection receiving surface SC such as a screen. The projector 1 includes an exterior enclosure 11, which constitutes the exterior of the projector 1, and an image projecting apparatus 2 accommodated in the exterior enclosure 11, as shown in FIG. 1. In addition to the above, the projector 1 includes, although not shown, a control apparatus that controls the operation of the projector 1, a cooling apparatus that cools cooling targets, and a power supply apparatus that supplies electronic parts that constitute the projector 1 with electric power.
Configuration of Image Projecting Apparatus The image projecting apparatus 2 projects image light according to image information under the control of the control apparatus described above. This image projecting apparatus 2 includes an illuminator 21, a color separation system 24, a reflection mirror 25, parallelizing lenses 26, light modulators 27, a light combiner 28, and a projection optical apparatus 29.

The illuminator 21 includes a first illuminator 22, which outputs fluorescence YL containing green light GL and red light RL, and a second illuminator 23, which outputs blue light BL.
Configuration of First Illuminator The first illuminator 22 irradiates the color separation system 24 with the fluorescence YL. The first illuminator 22 includes a light source apparatus 3A, parallelizing system 221, an optical integration system 222, a polarization converter 223, and a superimposing system 224.

The light source apparatus 3A outputs the fluorescence YL. The configuration of the light source apparatus 3A will be described later in detail.

The parallelizing system 221 parallelizes the fluorescence YL output from the light source apparatus 3A.

The optical integration system 222 homogenizes the illuminance distribution of the fluorescence YL incident from the light source apparatus 3A via the parallelizing system 221. In the present embodiment, the optical integration system 222 includes a first lens array 2221 and a second lens array 2222. Although not shown in detail, the first lens array 2221 includes multiple first lenses arranged in a matrix, and the second lens array 2222 includes multiple second lenses corresponding to the multiple first lenses. The first lens array 2221 divides the fluorescence YL incident from the parallelizing system 221 into multiple sub-luminous fluxes, which each pass through the corresponding one of the multiple second lenses. Note that the optical integration system 222 may be configured with a rod integrator.

The multiple sub-luminous fluxes output from the second lens array 2222 enters the polarization converter 223. That is, the fluorescence YL enters the polarization converter 223. The polarization converter 223 converts the incident fluorescence YL into one kind of linearly polarized light and outputs the linearly polarized fluorescence YL.

Out of the multiple sub-luminous fluxes incident via the polarization converter 223, the superimposing system 224 causes the sub-luminous fluxes that constitute the green light GL to be superimposed on a modulation region of a green light modulator 27G, and causes the sub-luminous fluxes that constitute the red light RL to be superimposed on the modulation region of a red light modulator 27R. Note that the fluorescence YL output from the superimposing system 224 enters the color separation system 24.
Configuration of Second Illuminator The second illuminator 23 irradiates the reflection mirror 25 with the blue light BL. The second illuminator 23 includes a blue light source 231, a light collector 232, a homogenizer 233, and a relay lens 236.

The blue light source 231 has at least one light emitter that emits the blue light BL.

The light collector 232 collects the blue light BL output from the blue light source 231 and causes the collected blue light BL to enter the homogenizer 233. The light collector 232 includes, for example, multiple lenses 2321 and 2322.

The homogenizer 233 homogenizes the illuminance distribution of the blue light BL incident from the light collector 232. In the present embodiment, the homogenizer 233 includes a diffuser plate 234 and a rod integrator 235.

The relay lens 236 relays the blue light BL incident from the homogenizer 233 to the reflection mirror 25.

Configurations of Color Separation System and Reflection Mirror

The color separation system 24 separates the fluorescence YL incident from the first illuminator 22 into the green light GL and the red light RL, guides the green light GL to the green light modulator 27G, and guides the red light RL to the red light modulator 27R. The color separation system 24 includes a dichroic mirror 241 and reflection mirrors 242 and 243.

The dichroic mirror 241 separates the fluorescence YL incident from the first illuminator 22 into the green light GL and the red light RL.

The reflection mirror 242 reflects the green light GL reflected off the dichroic mirror 241 toward the green light modulator 27G.

The reflection mirror 243 reflects the red light RL having passed through the dichroic mirror 241 toward the red light modulator 27R.

The reflection mirror 25 reflects the blue light BL incident from the second illuminator 23 toward a blue light modulator 27B.

Configuration of Parallelizing Lens

The parallelizing lenses 26 are each a field lens that parallelizes incident light. The parallelizing lenses 26 include a blue parallelizing lens 26B, a green parallelizing lens 26G, and a red parallelizing lens 26R.

The blue parallelizing lens 26B is provided between the reflection mirror 25 and the blue light modulator 27B in the optical path of the blue light BL. The blue parallelizing lens 26B parallelizes the blue light BL to be incident on the blue light modulator 27B.

The green parallelizing lens 26G is provided between the reflection mirror 242 and the green light modulator 27G in the optical path of the green light GL. The green parallelizing lens 26G parallelizes the green light GL to be incident on the green light modulator 27G. The red parallelizing lens 26R is provided between the reflection mirror 243 and the red light modulator 27R in the optical path of the red light RL. The red parallelizing lens 26R parallelizes the red light RL to be incident on the red light modulator 27R.

Configuration of Light Modulators

The light modulators 27 are each an image forming apparatus that modulates incident light in accordance with image information. The light modulators 27 include the blue light modulator 27B, which modulates the blue light BL, the green light modulator 27G, which modulates the green light GL, and the red light modulator 27R, which modulates the red light RL.

In the present embodiment, the light modulators 27B, 27G, and 27R each include a transmissive liquid crystal panel and a pair of polarizer plates that sandwich the liquid crystal panel. That is, the light modulators 27 are each a transmissive liquid crystal light valve.

Light Combiner and Projection Optical Apparatus

The color light BL, the color light GL, and the color light RL modulated by the light modulators 27R, 27G, and 27B enter the light combiner 28. The light combiner 28 combines the incident color light BL, color light GL, and color light RL with one another to generate image light to be projected by the projection optical apparatus 29. In the present embodiment, the light combiner 28 is configured with a cross dichroic prism, and may instead be configured with multiple dichroic mirrors.

The projection optical apparatus 29 projects the combined image light from the light combiner 28 onto the projection receiving surface SC via a projection port 111 of the exterior enclosure 11. That is, the projection optical apparatus 29 projects the light modulated by the light modulators 27. The projection optical apparatus 29 can, for example, be a lens assembly including multiple lenses and a tubular lens barrel that accommodates the multiple lenses.

Configuration of Light Source Apparatus

Figure 2:
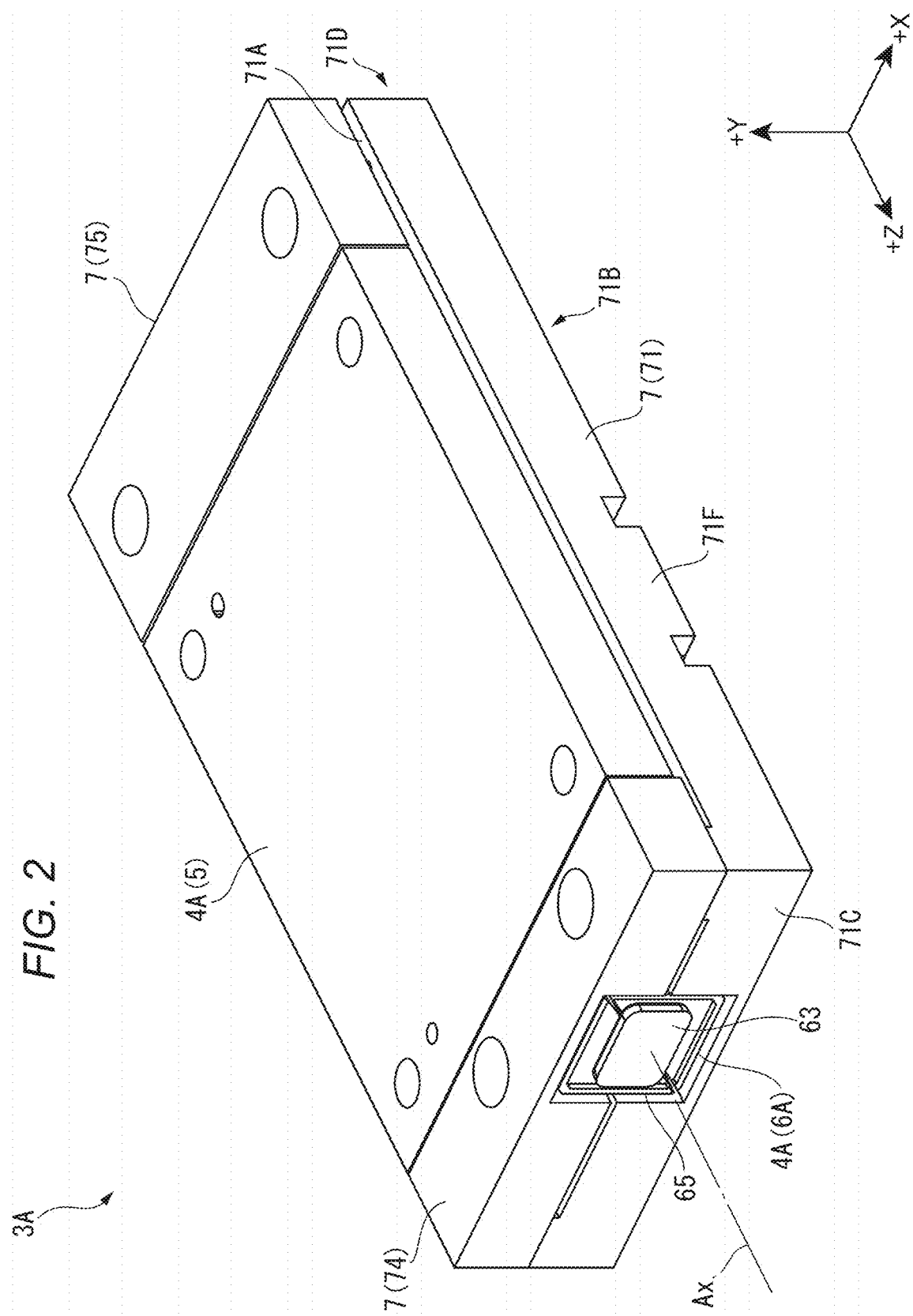
FIG. 2 is a perspective view showing a light source apparatus according to the first embodiment.
Figure 3:
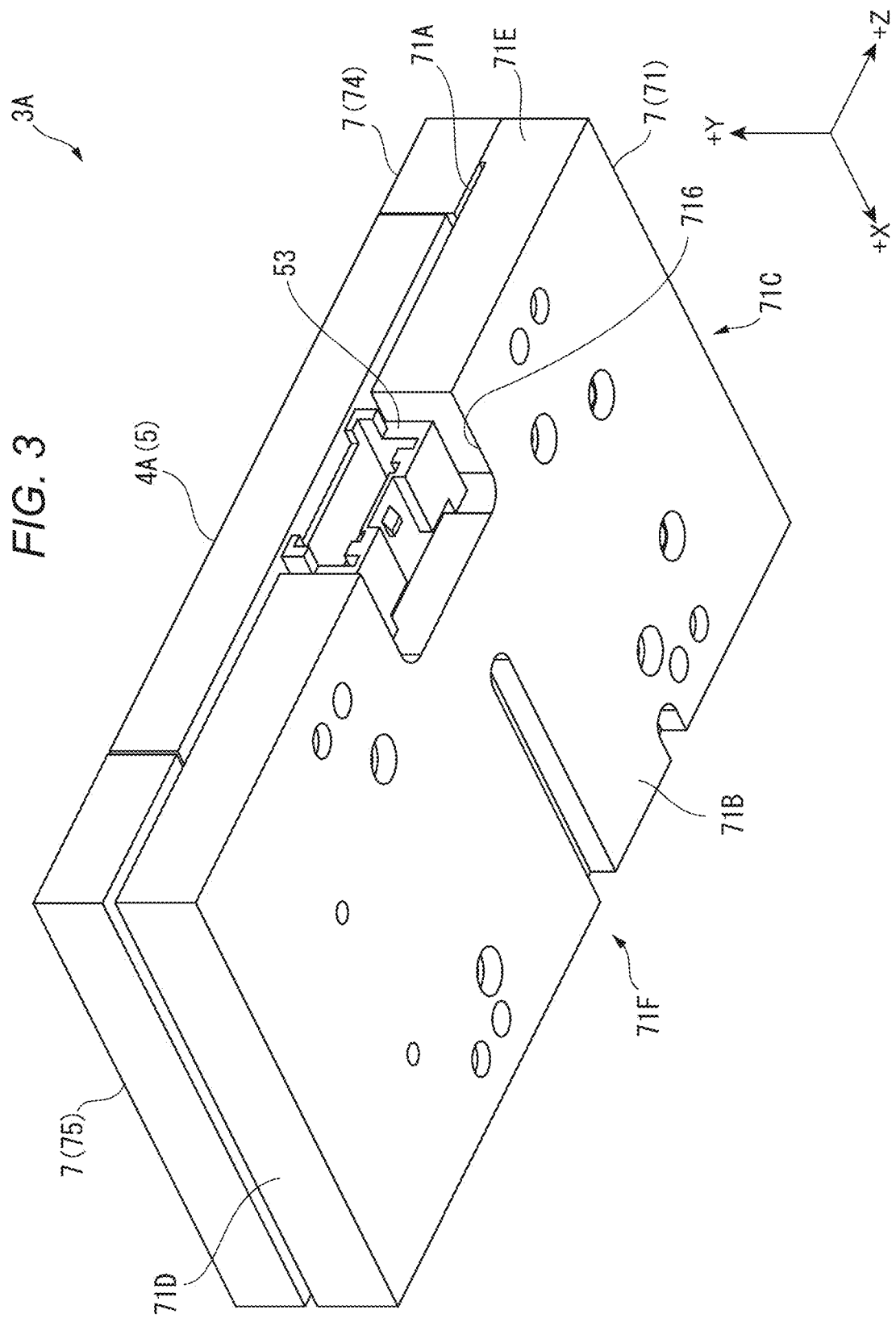
FIG. 3 is a perspective view showing the light source apparatus according to the first embodiment.

FIG. 2 is a perspective view showing the light source apparatus 3A viewed from the side via which the fluorescence YL exits, and FIG. 3 is a perspective view showing the light source apparatus 3A viewed from the side opposite the side via which the fluorescence YL exits.

The light source apparatus 3A includes a fluorescence outputting apparatus 4A and a housing 7, which accommodates the fluorescence outputting apparatus 4A, as shown in FIGS. 2 and 3.

It is assumed in the description below that three directions perpendicular to one another are called +X, +Y, and +Z directions. It is assumed in the present embodiment that the +Z direction is the direction in which the light source apparatus 3A outputs the fluorescence YL, and that the +Y direction is the direction in which cover members 74 and 75 are shifted from a base 71, which will be described later, in the housing 7. It is assumed that the +X direction is the rightward direction in the view so viewed in the +Z direction that the +Y direction is the upward direction. Although not shown, it is assumed that the opposite direction of the +X direction is a −X direction, that the opposite direction of the +Y direction is a −Y direction, and that the opposite direction of the +Z direction is a −Z direction. It is further assumed that an axis along the +X direction is an X-axis, that an axis along the +Y direction is a Y-axis, and that an axis along the +Z direction is a Z-axis.

Configuration of Fluorescence Outputting Apparatus

Figure 4:
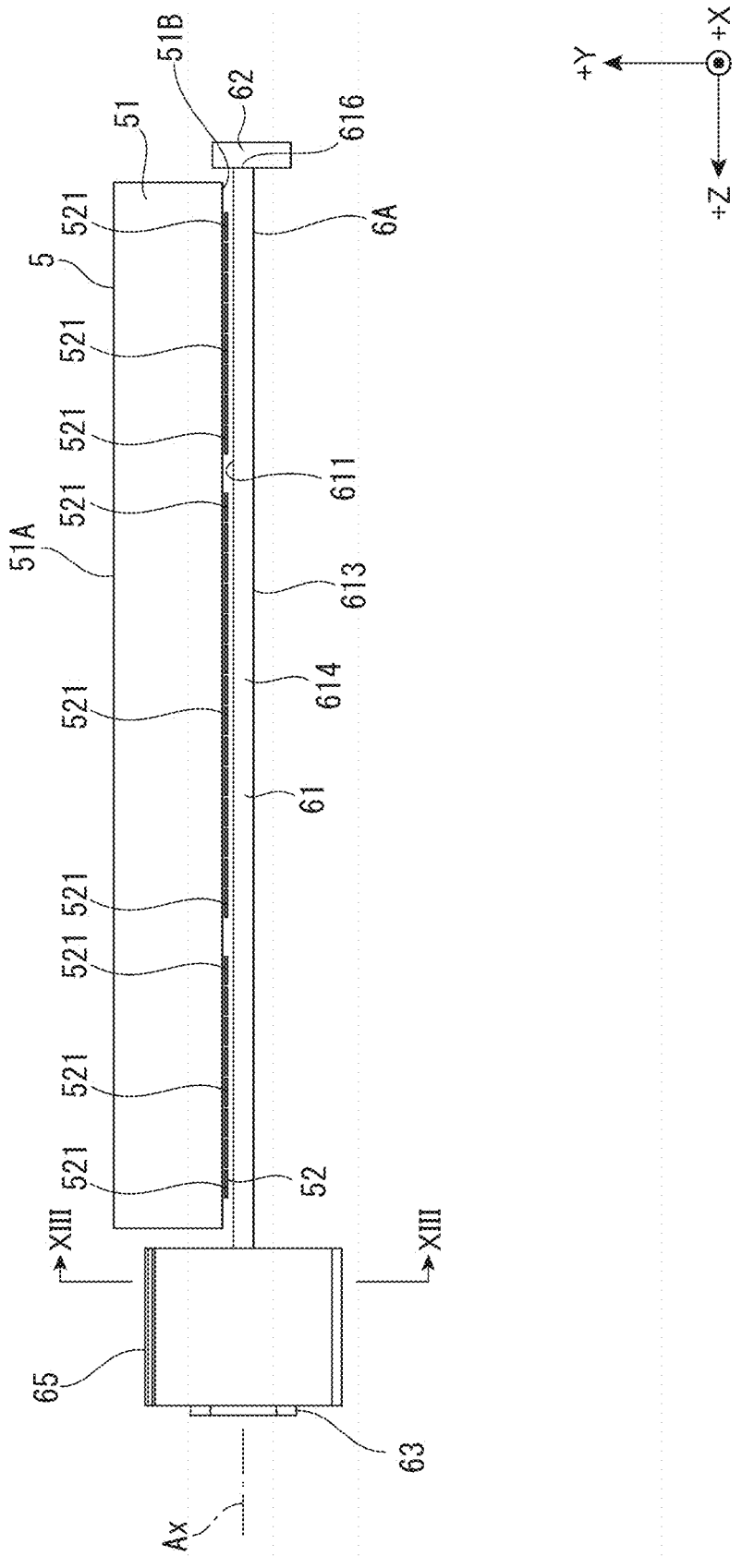
FIG. 4 is a side view showing a fluorescence outputting apparatus according to the first embodiment.
Figure 5:
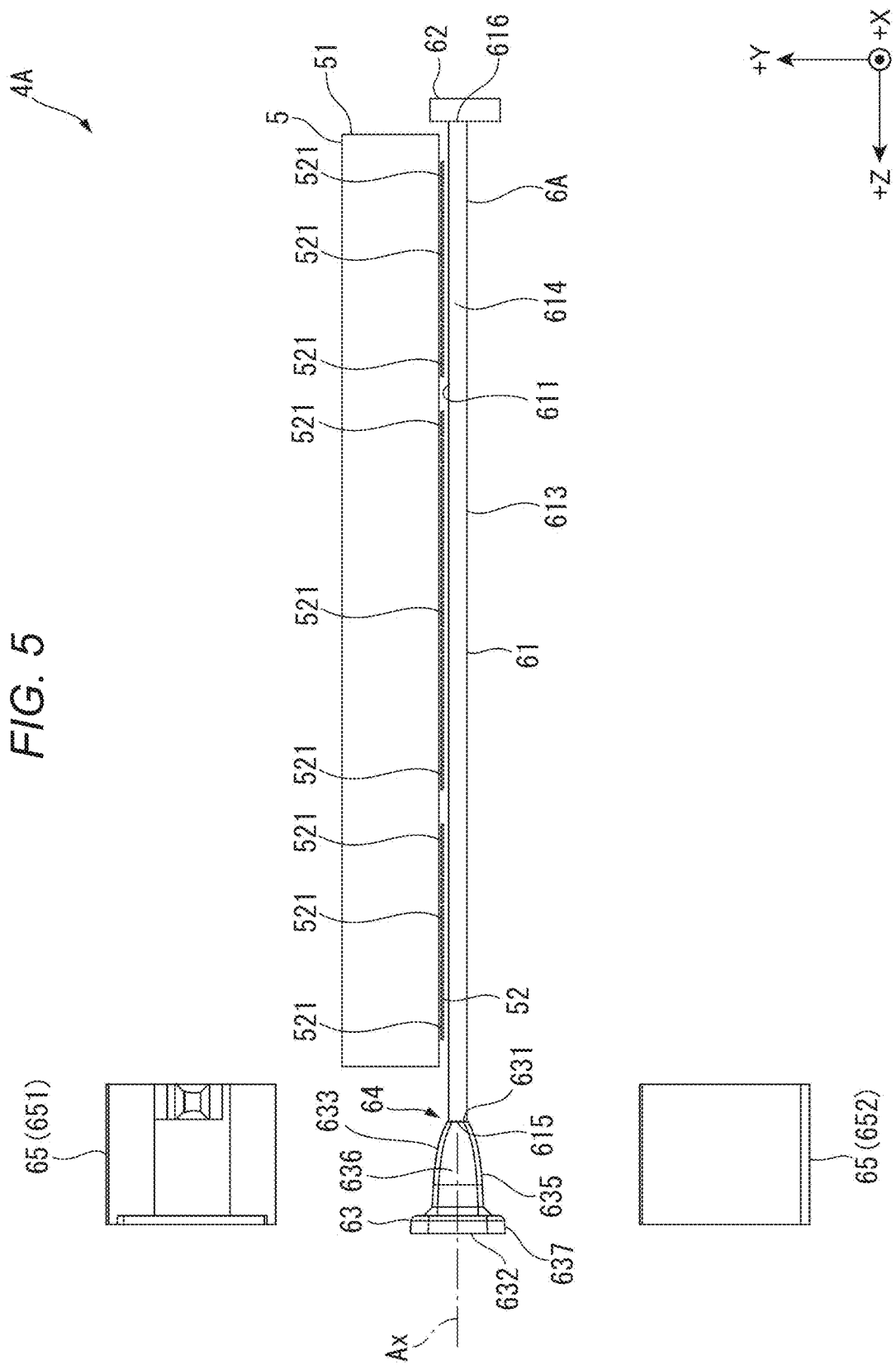
FIG. 5 is a side view showing the fluorescence outputting apparatus according to the first embodiment.
Figure 6:
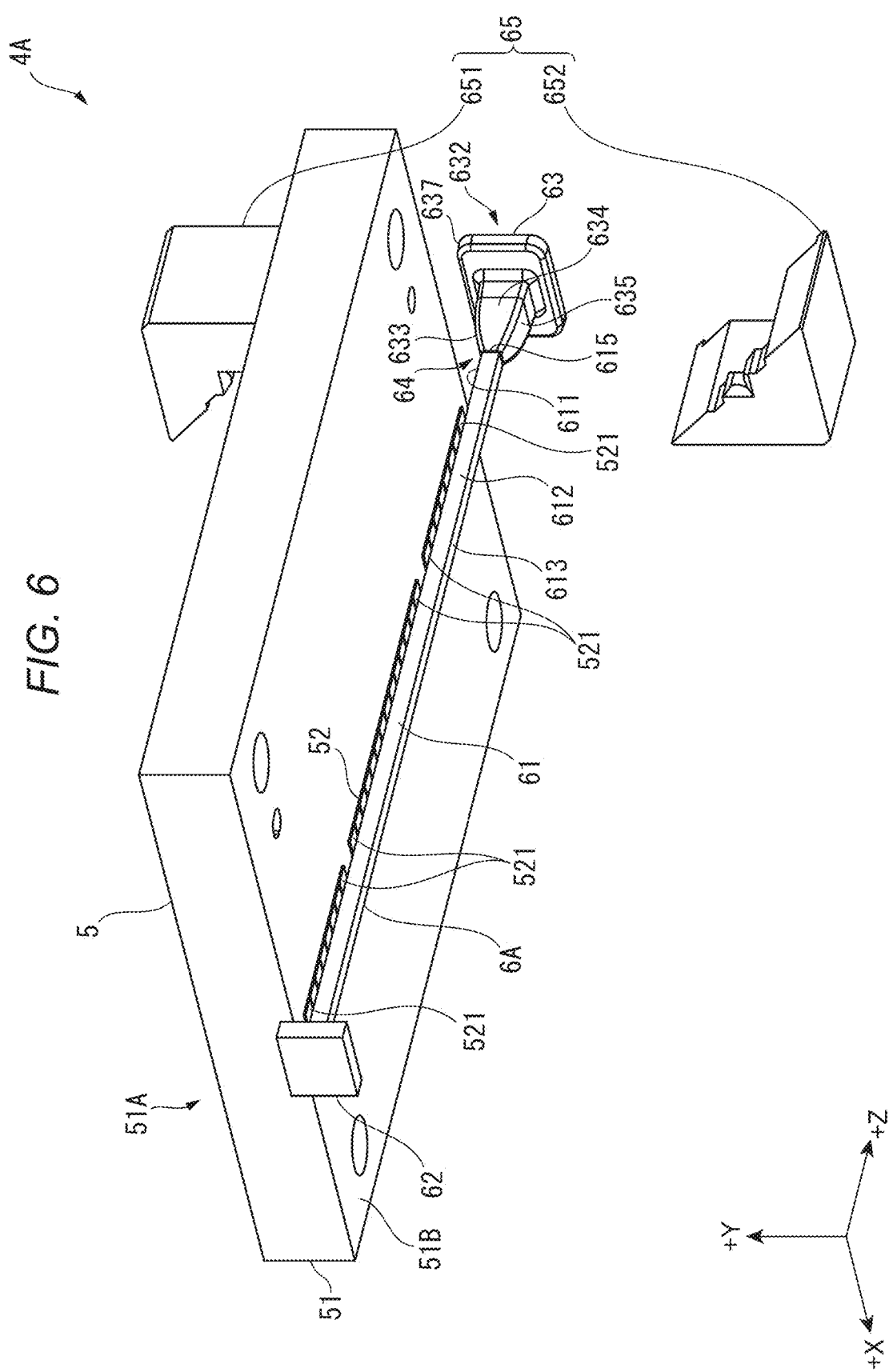
FIG. 6 is an exploded perspective view showing the fluorescence outputting apparatus according to the first embodiment.

FIG. 4 is a side view showing the fluorescence outputting apparatus 4A viewed in the +X direction. FIG. 5 is a side view of the fluorescence outputting apparatus 4A viewed in the +X direction in a state in which a first holding member 66 and a second holding member 67 of a holder 65 are separate from the fluorescence outputting apparatus 4A. FIG. 6 is an exploded perspective view of the fluorescence outputting apparatus 4A viewed in the −Z direction in the state in which the first holding member 66 and the second holding member 67 are separate from the fluorescence outputting apparatus 4A.

The fluorescence outputting apparatus 4A is accommodated in the housing 7 and outputs the fluorescence YL. The fluorescence outputting apparatus 4A includes a light source section 5 and a light outputting member 6A, as shown in FIGS. 4 to 6.

Configuration of Light Source Section

The light source section 5 outputs light to a light guide 61, which will be described later, of the light outputting member 6A. In the present embodiment, the light source section 5 outputs excitation light that excites a phosphor contained in the light guide 61 to the light guide 61. The light source section 5 is disposed at a position shifted from the light guide 61 in the +Y direction. The light source section 5 includes a substrate 51, a light source 52 mounted on the substrate 51, and a connector 53.

The substrate 51 is disposed at the side opposite the base 71, which will be described later, of the housing 7 with the light guide 61 therebetween to cover the light guide 61, and is fixed to the base 71. The substrate 51 has a first surface 51A facing the positive end in the Y direction, and a second surface 51B facing the negative end in the Y direction.

The first f surface 51A constitutes an outer surface of the light source apparatus 3A when the substrate 51 is fixed to the base 71.

The second surface 51B is a surface opposite the first surface 51A. The light source 52 and the connector 53 are mounted on the second surface 51B.

The light source 52 outputs the excitation light in the −Y direction. The light source 52 is configured with one or more light emitters 521 arranged along the Z-axis, and the light emitting surface of each of the light emitters 521 faces a first side surface 611, which will be described later, of the light guide 61. That is, the multiple light emitters 521 each output the excitation light to be incident on the first side surface 611. The excitation light output by each of the light emitters 521 is, for example, light having a first wavelength band ranging from 400 nm to 480 nm, and the peak wavelength of the excitation light is, for example, 445 nm. In the present embodiment, the light emitters 521 are each a light emitting diode (LED), and may instead be a laser diode (LD), or any other light emitter.

The connector 53 is provided at the second surface 51B at a position shifted from the light source 52 in the −X direction. Electric power that allows the light emitters 521 to emit light is externally supplied to the connector 53.

Configuration of Light Outputting Member

Figure 7:
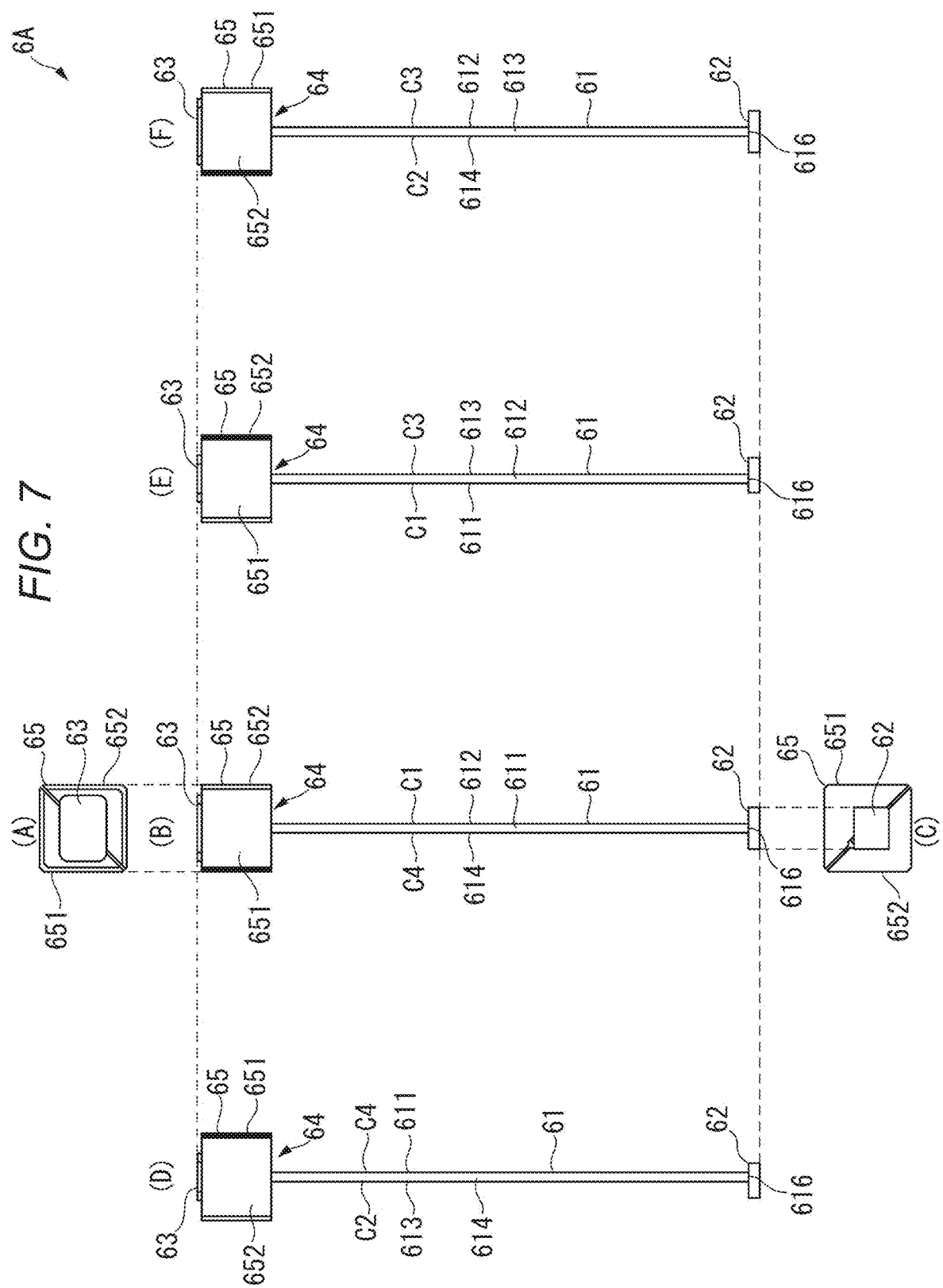
FIG. 7 is a hexagonal view showing a light outputting member according to the first embodiment.

FIG. 7 is a hexagonal view showing the light outputting member 6A. In detail, FIG. 7A is a front view showing the light outputting member 6A viewed in the +Z direction, FIG. 7B is a plan view showing the light outputting member 6A viewed in the +Y direction, FIG. 7C is a rear view showing the light outputting member 6A viewed in the −Z direction, FIG. 7D is a side view showing the light outputting member 6A viewed in the +X direction, FIG. 7E is a side view showing the light outputting member 6A viewed in the −X direction, and FIG. 7F is a bottom view showing the light outputting member 6A viewed in the −Y direction.

The light outputting member 6A has the function of guiding light based on the light output from the light source section 5 to the space outside the light source apparatus 3A. In the present embodiment, the light outputting member 6A converts the wavelength of the excitation light output from the light source section 5 to generate the fluorescence YL, and guides the fluorescence YL to the space outside the light source apparatus 3A. That is, the light outputting member 6A is a wavelength converting member and is also a light transmitting member.

The light outputting member 6A includes the light guide 61, a reflector 62, an angle converter 63, an adhesive 64, and the holder 65, as shown in FIGS. 5 to 7.

Configuration of Light Guide

The light guide 61 is a light outputting member on which the excitation light is incident along the −Y direction from the light emitters 521. The light guide 61 outputs light based on the incident excitation light in the +Z direction, which intersects with the −Y direction. In the present embodiment, the light guide 61 contains phosphor excited by the incident excitation light. The light guide 61 generates the fluorescence YL having wavelengths different from the wavelength of the incident excitation light and outputs the fluorescence YL in the +Z direction. That is, the light guide 61 is a wavelength converter that converts the wavelength of incident excitation light and outputs the fluorescence YL. The phosphor contained in the light guide 61 may, for example, be a YAG-based phosphor containing yttrium, aluminum, and garnet.

The light guide 61 has the first side surface 611, a second side surface 612, a third side surface 613, a fourth side surface 614, a first end surface 615, and a second end surface 616, and is formed in a substantially quadrangular columnar shape elongated along the Z-axis, as shown in FIGS. 5 to 7. The area of a cross section of the light guide 61 perpendicular to the Z-axis is substantially fixed along the Z-axis, and is greater than or equal to 0.25 mm$^2$ but smaller than or equal to 4.00 mm$^2$.

The side surfaces 611 to 614 extend along the Z-axis. The first side surface 611 is an outer surface facing the positive end in the Y direction, and the third side surface 613 is an outer surface facing the negative end in the Y direction, as shown in FIGS. 5 and 6. The second side surface 612 is an outer surface facing the negative end in the X direction, as shown in FIG. 6, and the fourth side surface 614 is an outer surface facing the positive end in the X direction, as shown in FIG. 5.

The first side surface 611 has a light incident region that faces the light source 52 and receives the excitation light from the light source 52, as shown in FIGS. 5 and 6.

The light guide 61 has four corners C1 to C4 formed by the side surfaces 611 to 614, as shown in FIG. 7. The first corner C1 is formed by the first side surface 611 and the second side surface 612, which intersect with each other, and the second corner C2 is formed by the third side surface 613 and the fourth side surface 614, which intersect with each other. The third corner C3 is formed by the second side surface 612 and the third side surface 613, which intersect with each other, and the fourth corner C4 is formed by the first side surface 611 and the fourth side surface 614, which intersect with each other. That is, the second corner C2 is opposite the first corner C1, and the fourth corner C4 is opposite the third corner C3.

Figure 8:
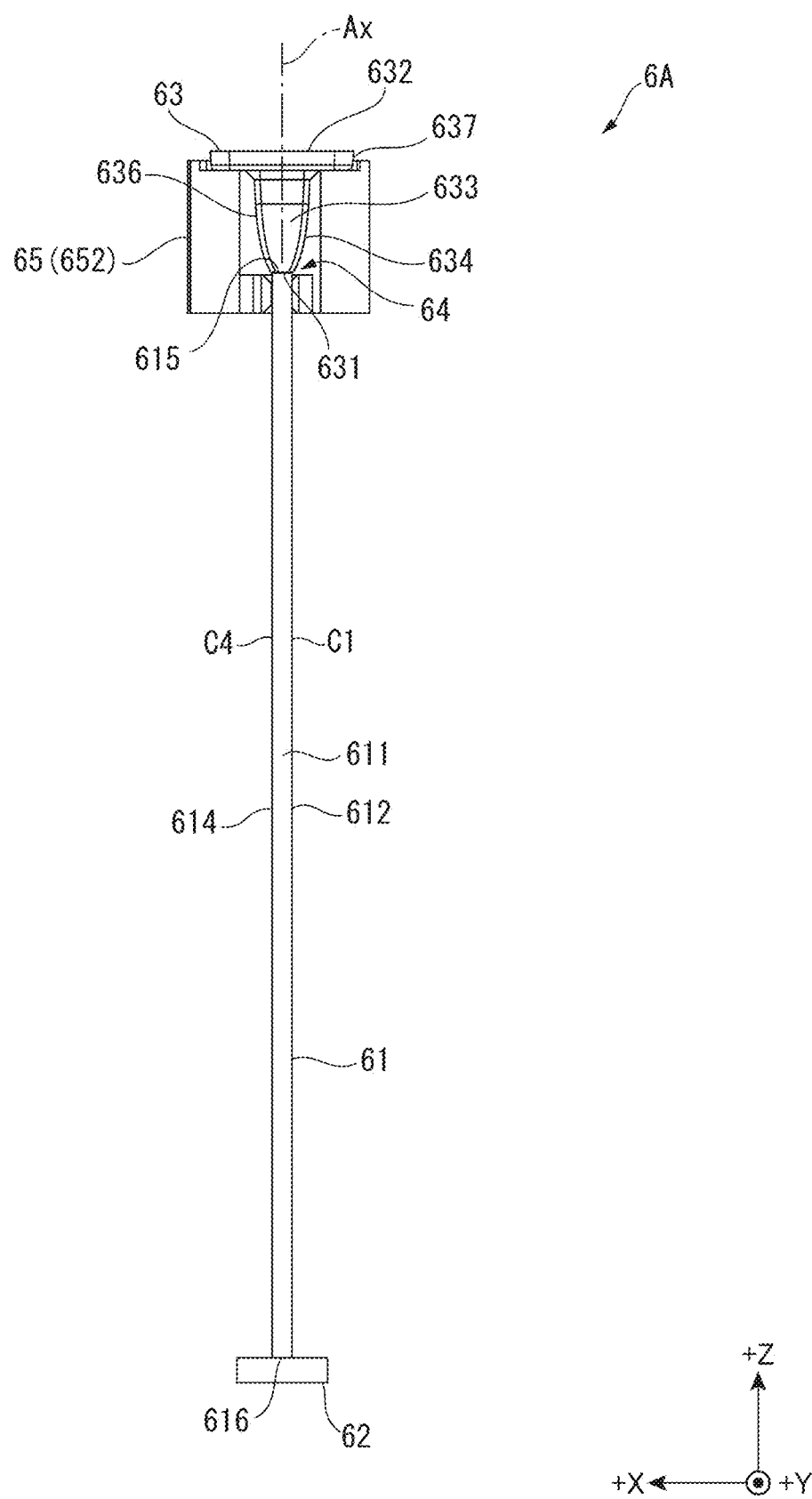
FIG. 8 is a plan view showing the light outputting member according to the first embodiment from which a first holding member is removed.

FIG. 8 is a plan view of the light outputting member 6A viewed in the +Y direction in a state in which the first holding member 66, which constitutes the holder 65, is removed.

The first end surface 615 and the second end surface 616 are surfaces located at opposite sides along the Z-axis, the first end surface 615 is an outer surface facing the positive end in the Z direction, and the second end surface 616 is an outer surface facing the negative end in the Z direction, as shown in FIG. 8. The first end surface 615 and the second end surface 616 each intersect with each of the side surfaces 611 to 614. The first end surface 615 and the second end surface 616 each have a square shape.

The reflector 62 is pressed against the second end surface 616 by an urging member 73, which will be described later. Although will be described later in detail, the light having exited out of the light guide 61 via the second end surface 616 is reflected off the reflector 62 and enters the light guide 61 via the second end surface 616.

The first end surface 615 is a light exiting surface via which the fluorescence YL generated in the light guide 61 exits. The angle converter 63 is bonded to the first end surface 615 with the adhesive 64.

Configuration of Angle Converter

The angle converter 63 is provided at the first end surface 615. The angle converter 63 is a compound parabolic concentrator (CPC), and is made of a light transmissive material, such as borosilicate glass or a cycloolefin resin, and formed in a truncated substantially rectangular pyramidal shape. The angle converter 63 has a light incident end surface 631, a light exiting end surface 632, side surfaces 633, 634, 635, and 636, and a flange 637, as shown in FIGS. 5, 6, and 8.

The light incident end surface 631 is disposed so as to face the first end surface 615, and bonded to the first end surface 615 with the adhesive 64, as shown in FIGS. 5 and 8. The fluorescence YL output via the first end surface 615 is incident on the light incident end surface 631.

The light exiting end surface 632 is a surface opposite the light incident end surface 631. The fluorescence YL having entered the angle converter 63 via the light incident end surface 631 exits via the light exiting end surface 632.

Figure 9:
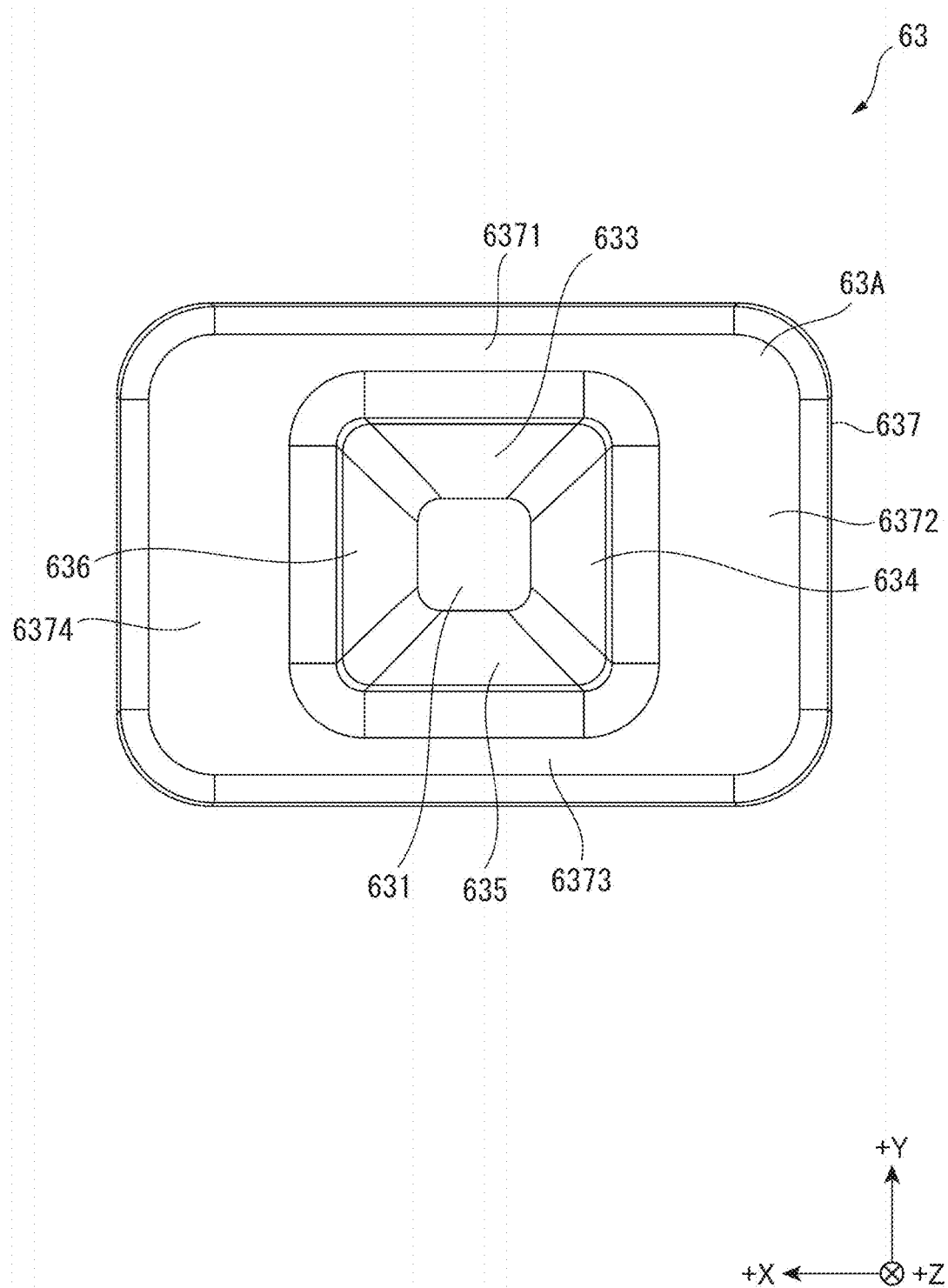
FIG. 9 is a rear view showing an angle converter according to the first embodiment.

FIG. 9 is a rear view showing the angle converter 63 viewed in the −Z direction.

The four side surfaces 633 to 636 are outer surfaces that intersect with each of the light incident end surface 631 and the light exiting end surface 632 and extend along the circumferential direction around an optical axis Ax of the angle converter 63. The side surfaces 633 to 636 are each a parabolic curved surface.

The first side surface 633 faces the positive end in the Y direction, and the third side surface 635 faces the negative end in the Y direction, as shown in FIG. 9. The second side surface 634 faces the negative end in the X direction, and the fourth side surface 636 faces the positive end in the X direction. The inner surfaces of the side surfaces 633 to 636 function as reflection surfaces that reflect the fluorescence YL having entered the angle converter 63 via the light incident end surface 631 toward the light exiting end surface 632.

The cross-sectional area perpendicular to the optical axis Ax of the angle converter 63, that is, the cross-sectional area of the angle converter 63 perpendicular to the Z-axis increases as the angle converter 63 extends from the light incident end surface 631 toward the light exiting end surface 632, and the area of the light exiting end surface 632 is greater than the area of the light incident end surface 631, as shown in FIGS. 5 and 8.

The dimension of the side surfaces 633 and 635 along the X-axis increases as the side surfaces extend from the light incident end surface 631 toward the light exiting end surface 632, as shown in FIG. 8.

The dimension of the side surfaces 634 and 636 in the Y-axis direction increases as the side surfaces extend from the light incident end surface 631 toward the light exiting end surface 632, as shown in FIG. 5.

The X-axis and the Y-axis are axes orthogonal to the optical axis Ax of the angle converter 63 along the Z-axis. The optical axis Ax of the angle converter 63 passes through the centers of the light incident end surface 631 and the light exiting end surface 632, and is parallel to the Z-axis. The optical axis Ax of the angle converter 63 coincides with the optical axis of the first illuminator 22.

The flange 637 is a portion protruding from an light-exiting-side end portion of the angle converter 63 outward in the radial direction starting from the optical axis Ax, and the surface of the flange 637 that faces the positive end in the Z direction is flush with the light exiting end surface 632. The flange 637 is provided in a region where the fluorescence YL incident via the light incident end surface 631 and exiting via the light exiting end surface 632 does not pass through the angle converter 63. That is, the flange 637 protrudes outward in the radial direction starting from the optical axis Ax beyond the region of the light exiting end surface 632 where the fluorescence YL passes through.

The flange 637 has fixed regions 6371 to 6374 provided at a surface 63A of the flange 637, which faces the negative end in the Z direction, as shown in FIG. 9.

The first fixed region 6371 is a region of the surface 63A that faces the positive end in the Y direction.

The second fixed region 6372 is a region of the surface 63A that faces the negative end in the X direction.

The third fixed region 6373 is a region of the surface 63A that faces the negative end in the Y direction.

The fourth fixed region 6374 is a region of the surface 63A that faces the positive end in the X direction.

The first fixed region 6371 and the second fixed region 6372 are fixed to the first holding member 66 of the holder 65, and the third fixed region 6373 and the fourth fixed region 6374 are fixed to the second holding member 67 of the holder 65.

Configuration of Adhesive

The adhesive 64 bonds the first end surface 615 of the light guide 61 and the light incident end surface 631 of the angle converter 63 to each other, as shown in FIGS. 5, 6, and 8. In the present embodiment, the adhesive 64 is provided across the region between the first end surface 615 and the light incident end surface 631.

Out of the fluorescence YL incident from the interior of the light guide 61 on the inner side of the first end surface 615, the fluorescence YL incident at angles greater than or equal to the critical angle is totally reflected off the inner side of the first end surface 615, and cannot therefore enter the angle converter 63. A region where a gap is provided between the first end surface 615 and the light incident end surface 631 has a of the smaller critical angle, so that the amount fluorescence YL passing through the first end surface 615 and enters the angle converter 63 decreases.

On the other hand, when the adhesive 64 is provided across the region between the first end surface 615 and the light incident end surface 631 and there is therefore no gap between the first end surface 615 and the light incident end surface 631, the aforementioned decrease in the critical angle can be suppressed, so that the amount of the fluorescence YL that cannot enter the angle converter 63 can be reduced. In other words, when there is no gap between the first end surface 615 and the light incident end surface 631, the fluorescence YL is readily allowed to be incident on the light incident end surface 631 via the first end surface 615.

In view of the above, it is desirable that the difference in refractive index between the light guide 61 and the adhesive 64, and the difference in refractive index between the adhesive 64 and the angle converter 63 be as small as possible.

In the present embodiment, the light guide 61 is made of a material containing a YAG-based phosphor, and the angle converter 63 is made of a light transmissive material such as borosilicate glass. The refractive index of the light guide 61 is about 1.8, and the refractive index of the angle converter 63 is greater than or equal to 1.50 but smaller than or equal to 1.55. It is therefore difficult to match the refractive index of the light guide 61 with the refractive index of the angle converter 63. It is therefore preferable that the difference in refractive index between the angle converter 63 and the adhesive 64 be as small as possible.

When the angle converter 63 is made of borosilicate glass, the refractive index of the angle converter 63 is about 1.5. Instead, the adhesive 64 may be made of a phenyl-based silicone resin adhesive, and an additive may be added to the adhesive 64 as necessary to appropriately adjust the refractive index of the adhesive 64, so that the adhesive 64, which bonds the light guide 61 and the angle converter 63 to each other, can have a refractive index of about 1.5. The difference in refractive index between the angle converter 63 and the adhesive 64 can thus be reduced, so that the fluorescence YL is readily allowed to enter the angle converter 63 from the light guide 61.

Since the fluorescence YL output via the first end surface 615 needs to be incident on the light incident end surface 631, the adhesive 64 has light transparency. In addition, it is preferable that the adhesive 64 is a phenyl-based silicone resin adhesive having a thermosetting or ultraviolet-curable property among phenyl-based silicone resin adhesives.

Figure 10:
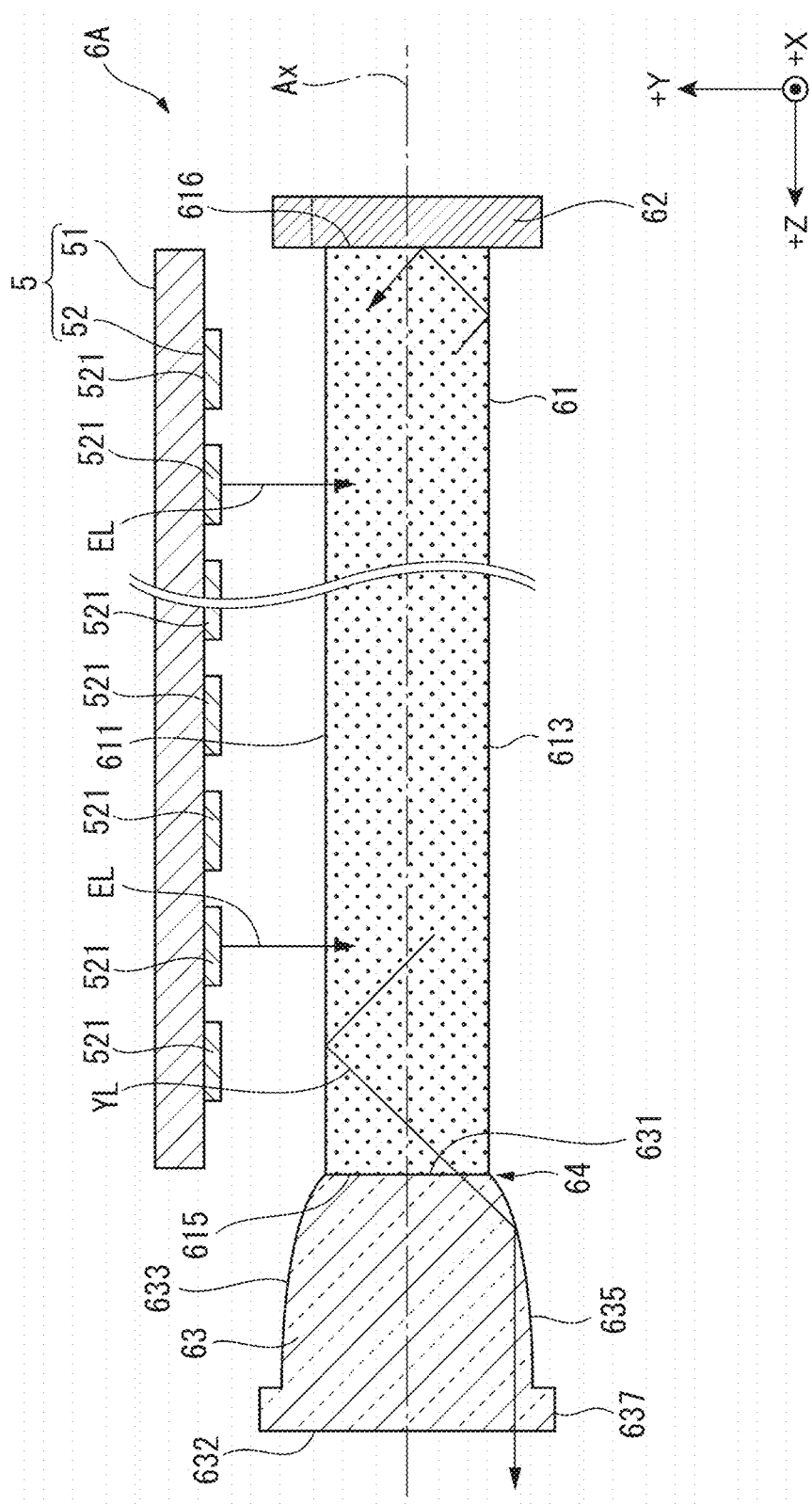
FIG. 10 shows the optical path of fluorescence output from a light guide and the angle converter according to the first embodiment.

Operation of Outputting Fluorescence Performed by Light Guide and Angle Converter FIG. 10 shows the cross section of the fluorescence outputting apparatus 4A taken along the YZ plane, and shows the optical paths of the fluorescence YL output from the light guide 61 and the angle converter 63.

Excitation light EL output from the light source 52 is incident on the first side surface 611 of the light guide 61, which is a wavelength converter, and excites the phosphor contained in the light guide 61, and the fluorescence YL is diffusively emitted from an arbitrary light emitting point, as shown in FIG. 10. The fluorescence YL travels omnidirectionally from the arbitrary light emitting point, and the fluorescence YL toward the side surfaces 611 to 614 of the light guide 61 travels inside the light guide 61 toward the first end surface 615 or the second end surface 616 while repeatedly totally reflected at multiple locations on the inner sides of the side surfaces 611 to 614.

The fluorescence YL having traveled inside the light guide 61 exits via the first end surface 615. The fluorescence YL traveling toward the first end surface 615 exits via the first end surface 615, and enters the angle converter 63 via the adhesive 64. The fluorescence YL traveling toward the second end surface 616 is reflected off the reflector 62, is then incident on the second end surface 616, and travels toward the first end surface 615.

Out of the excitation light EL having entered the light guide 61, part of the excitation light EL that has not been used for the excitation of the phosphor is reflected off a member around the light guide 61 including the light emitters 521 of the light source 52, or the reflector 62 provided at the second end surface 616. The part of the excitation light EL is therefore confined in the light guide 61 and reused. Note that the member around the light guide 61 includes the inner surface of a first accommodating section 711 of the base 71, which will be described later.

While the fluorescence YL having entered the angle converter 63 travels inside the angle converter 63, and whenever the fluorescence YL is totally reflected off the inner sides of the side surfaces 633 to 636, the traveling direction of the fluorescence YL changes so as to approach the direction parallel to the optical axis Ax of the angle converter 63. The angle converter 63 thus changes the exiting angle distribution of the fluorescence YL that exits via the first end surface 615 of the light guide 61. Specifically, the angle converter 63 makes the maximum exiting angle of the fluorescence YL at the light exiting end surface 632 smaller than the maximum incident angle of the fluorescence YL at the light incident end surface 631.

In general, the etendue of light that is defined by the product of the area of a light exiting region and the solid angle (maximum exiting angle) of the light is preserved, so that the etendue of the fluorescence YL is preserved before and after the fluorescence Y passes through the angle converter 63. The area of the light exiting end surface 632 is greater than the area of the light incident end surface 631, as described above. Therefore, to preserve the etendue, the angle converter 63 can make the maximum exiting angle of the fluorescence YL at the light exiting end surface 632 smaller than the maximum incident angle of the fluorescence YL incident on the light incident end surface 631.

Configuration of Holder

The holder 65 is disposed so as to extend over the portion where the light guide 61 and the angle converter 63 are bonded to each other, and holds the light guide 61 and the angle converter 63, as shown in FIG. 8. In other words, the holder 65 covers end portions of the side surfaces 611 to 614 of the light guide 61, the end portions facing the positive end in the Z direction, the side surfaces 633 to 636 of the angle converter 63, and the adhesive 64, and fixes the angle converter 63 to the light guide 61. In addition, the holder 65 is capable of heat dissipation and dissipates heat transferred, for example, from the light guide 61 and the angle converter 63. The thus configured holder 65 can be made of metal or synthetic resin.

The holder 65 includes the first holding member 66 and the second holding member 67, which are combined with each other as shown in FIGS. 5 to 7.

Configuration of First Holding Member

Figure 11:
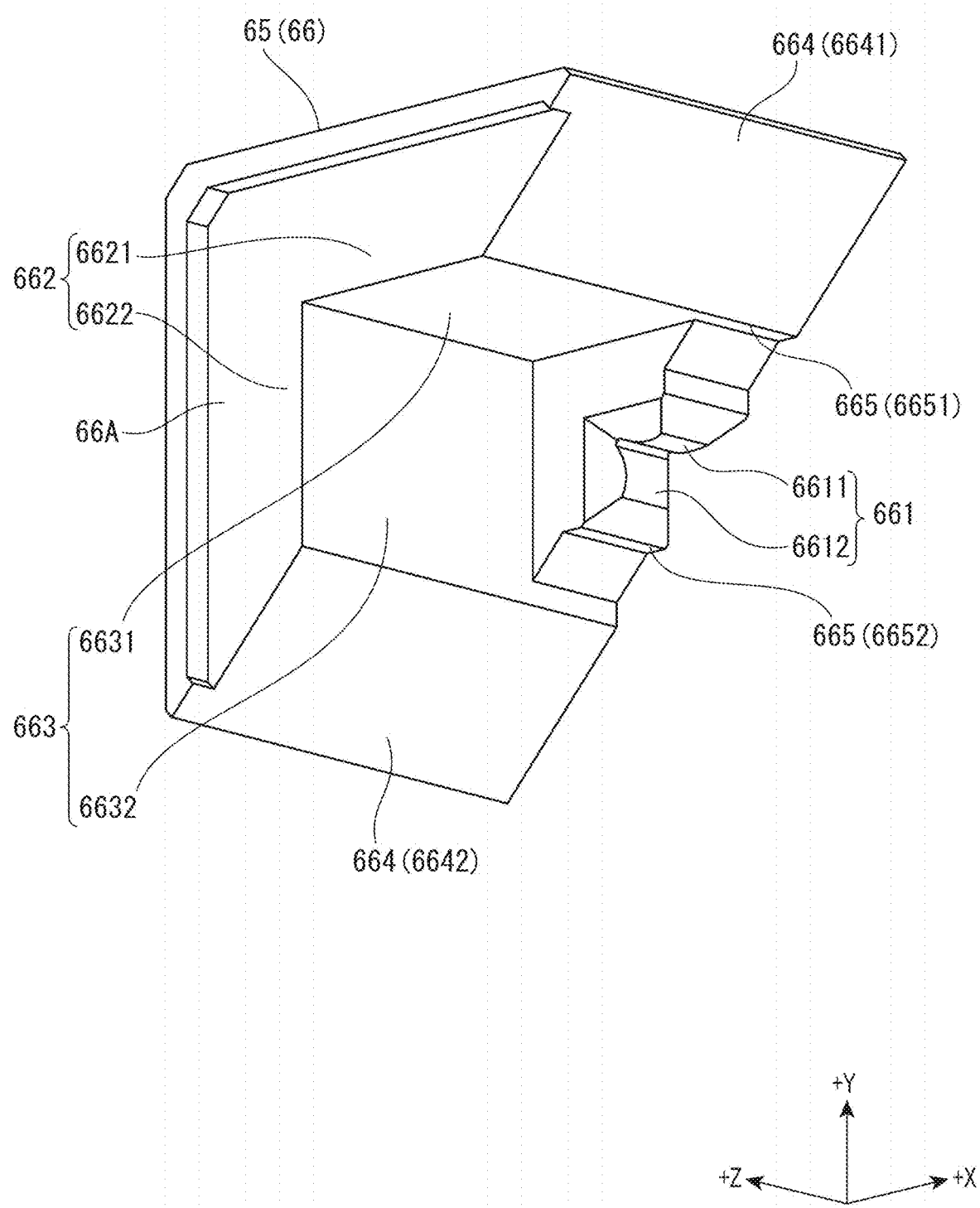
FIG. 11 is a perspective view showing a first holding member according to the first embodiment.

FIG. 11 is a perspective view showing the first holding member 66 viewed in the +Z direction.

The first holding member 66 is disposed at a position shifted from the light guide 61 and the angle converter 63 in the +Y direction and the −X direction, and is linked to the second holding member 67. The first holding member 66 is formed in a substantially isosceles triangular columnar shape when viewed in the −Z direction or the +Z direction, as shown in FIG. 11. The first holding member 66 includes a first holding section 661, a first fixed section 662, a first cover section 663, a first linkage surface 664, and a first recessed section 665.

The first holding section 661 holds the first side surface 611 and the second side surface 612 of the light guide 61. That is, the first holding section 661 is provided at a portion of the first holding member 66 that corresponds to a portion of the light guide 61 that is shifted from the first end surface 615 in the −Z direction. The first holding section 661 is configured with a recess having a first contact section 6611 along the XZ plane and a second contact section 6612 along the YZ plane.

The first contact section 6611 is in contact with the first side surface 611. The first contact section 6611 is formed in a substantially arcuate shape protruding in the −Y direction. In detail, the first contact section 6611 is formed in a truncated pyramidal shape having a dimension along the +Z direction decreasing as the first contact section 6611 protrudes in the −Y direction, and the surface of the protruding front end portion of the first contact section 6611 is formed in an arcuate shape around an axis along the Z-axis. The first contact portion 6611 is therefore in line-contact with the first side surface 611 along the Z-axis.

The second contact section 6612 is in contact with the second side surface 612. The second contact section 6612 is formed in a substantially arcuate shape protruding in the +X direction. In detail, the second contact section 6612 is formed in a truncated pyramidal shape having a dimension along the +Z direction decreasing as the second contact section 6612 protrudes in the +X direction, and the surface of a protruding front end portion of the second contact section 6612 is formed in an arcuate shape around an axis along the Z-axis. The second contact section 6612 is therefore in line-contact with the second side surface 612 along the Z-axis.

The first fixed section 662 is a portion fixed to the angle converter 63, and is provided at a surface 66A of the first holding member 66, which faces the positive end in the Z direction. The first fixed section 662 has a first fixed region 6621 and a second fixed region 6622.

The first fixed region 6621 is located at a portion of the surface 66A that faces the positive end in the Y direction and extends along the X-axis. The first fixed region 6621 is fixed to the first fixed region 6371 of the flange 637 with an adhesive.

The second fixed region 6622 is located at a portion of the surface 66A that faces the negative end in the X direction and extends along the Y-axis. The second fixed region 6622 is fixed to the second fixed region 6372 of the flange 637 with an adhesive.

The first cover section 663 is a recess provided at a position shifted from the first holding section 661 in the +Z direction. When the first holding member 66 and the second holding member 67 are linked to each other, the first cover section 663 forms a space that accommodates the angle converter 63. The first cover section 663 has a first inner surface 6631 along the XZ plane and a second inner surface 6632 along the YZ plane.

The first inner surface 6631 faces the negative end in the Y direction and faces the first side surface 633 of the angle converter 63.

The second inner surface 6632 faces the positive end in the X direction and faces the second side surface 634 of the angle converter 63.

The first linkage surface 664 is a surface facing the positive end in the X direction and the negative end in the Y direction, and inclines by about 45° with respect to each of the XZ and YZ planes. The first linkage surface 664 is configured with paired surfaces so provided as to sandwich the first holding section 661 and the first cover section 663. That is, the first linkage surface 664 has a first linkage region 6641 and a second linkage region 6642, the latter of which is located at the side opposite the first linkage region 6641 with the first holding section 661 and the first cover section 663 sandwiched therebetween. The second linkage region 6642 is provided at a position shifted from the first linkage region 6641 in the −Y direction.

When the first holding member 66 and the second holding member 67 are linked to each other, the first linkage surface 664 is bonded to a second linkage surface 674, which will be described later, of the second holding member 67 via an adhesive.

The first recessed section 665 is a recess provided in a portion of the first linkage surface 664 that faces the first holding section 661, and constitutes, along with a second recessed section 675 of the second holding member 67, adhesive relief sections 653 and 654, which will be described later. The first holding member 66 is provided with two first recessed sections 665.

The two first recessed sections 665 include a first recessed section 6651 provided in a portion of the first linkage region 6641 that faces the first holding section 661, and a first recessed section 6652 provided in a portion of the second linkage region 6642 that faces the first holding section 661.

Configuration of Second Holding Member

Figure 12:
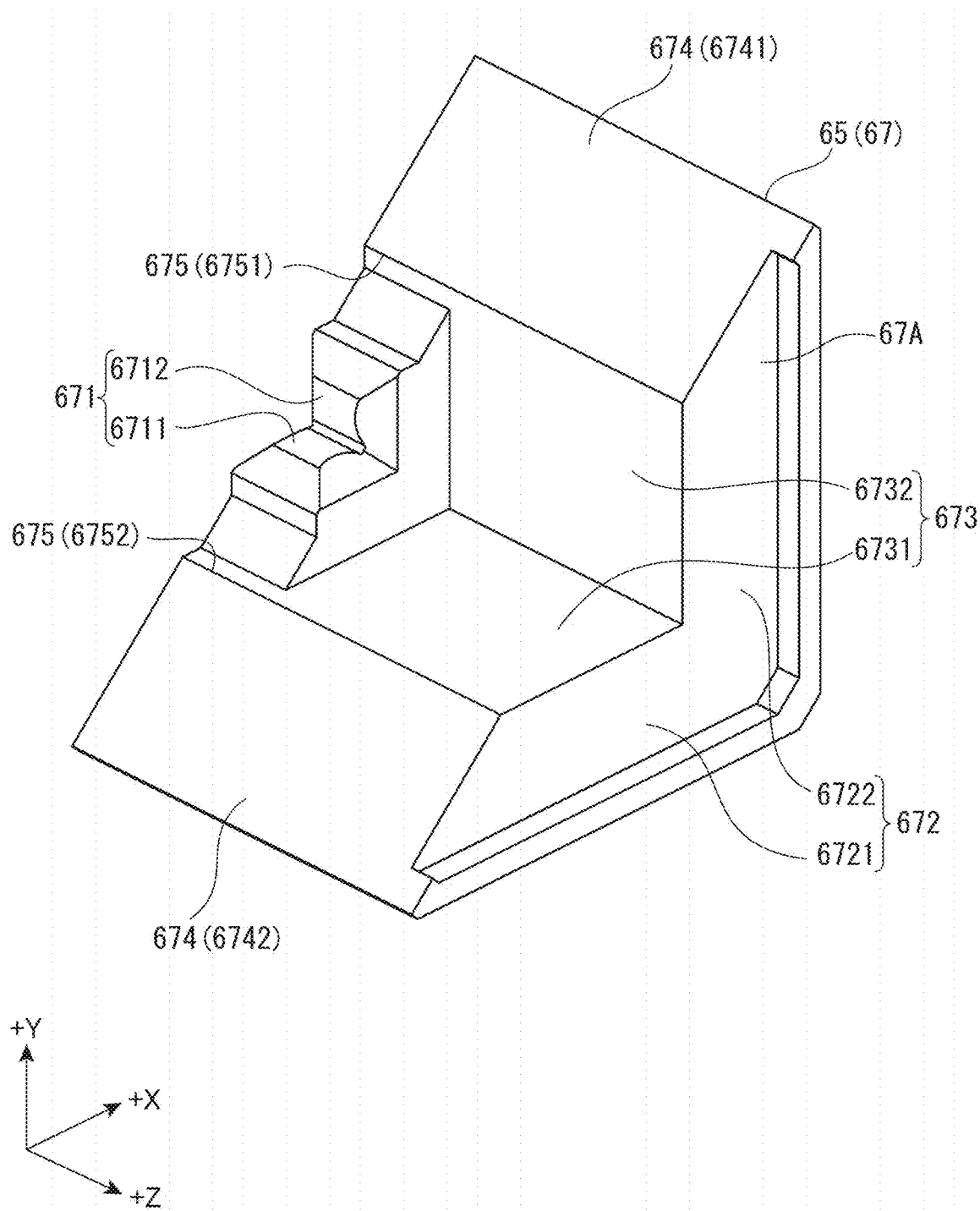
FIG. 12 is a perspective view showing a second holding member according to the first embodiment.

FIG. 12 is a perspective view showing the second holding member 67 viewed in the +Z direction.

The second holding member 67 is linked to the first holding member 66, holds the light guide 61, and fixes the angle converter 63 to the light guide 61. The second holding member 67 and the first holding member 66 are linearly symmetric with respect to the optical axis Ax of the angle converter 63, as shown in FIG. 12. That is, the second holding member 67 and the first holding member 66 are mirror symmetric. The second holding member 67 includes a second holding section 671, a second fixed section 672, a second cover section 673, the second linkage surface 674, and the second recessed section 675.

The second holding section 671 holds the third side surface 613 and the fourth side surface 614 of the light guide 61. That is, the second holding section 671 is provided at a position in the second holding member 67 that corresponds to a portion of the light guide 61 shifted from the first end surface 615 in the −Z direction. The second holding section 671 is configured with a recess having a third contact section 6711 along the XZ plane and a fourth contact section 6712 along the YZ plane.

The third contact section 6711 is in contact with the third side surface 613. The third contact section 6711 is formed in a substantially arcuate shape protruding in the +Y direction. In detail, the third contact section 6711 is formed in a truncated pyramidal shape having a dimension along the +Z direction decreasing as the third contact section 6711 protrudes in the +Y direction, and the surface of a protruding front end portion of the third contact section 6711 is formed in an arcuate shape around an axis along the Z-axis. The third contact portion 6711 is therefore in line-contact with the third side surface 613 along the Z-axis.

The fourth contact section 6712 is in contact with the fourth side surface 614. The fourth contact section 6712 is formed in a substantially arcuate shape protruding in the −X direction. In detail, the fourth contact section 6712 is formed in a truncated pyramidal shape having a dimension along the +Z direction decreasing as the fourth contact section 6712 protrudes in the −X direction, and the surface of a protruding front end portion of the fourth contact section 6712 is formed in an arcuate shape around an axis along the Z-axis. The fourth contact section 6712 is therefore in line-contact with the fourth side surface 614 along the Z-axis.

The second fixed section 672 is a portion fixed to the angle converter 63, and is disposed at a surface 67A of the second holding member 67, which faces the positive end in the Z direction. The second fixed section 672 has a third fixed region 6721 and a fourth fixed region 6722.

The third fixed region 6721 is located at a portion of the surface 67A that faces the negative end in the Y direction and extends along the X-axis. The third fixed region 6721 is fixed to the third fixed region 6373 of the flange 637 with an adhesive.

The fourth fixed region 6722 is located at a portion of the surface 67A that faces the positive end in the X direction and extends along the Y-axis. The fourth fixed region 6722 is fixed to the fourth fixed region 6374 of the flange 637 with an adhesive.

The second cover section 673 is a recess provided at a position shifted from the second holding section 671 in the +Z direction. When the first holding member 66 and the second holding member 67 are combined with each other, the second cover section 673 forms a space that accommodates the angle converter 63. The second cover section 673 has a third inner surface 6731 along the XZ plane and a fourth inner surface 6732 along the YZ plane.

The third inner surface 6731 faces the positive end in the Y direction and faces the third side surface 635 of the angle converter 63.

The fourth inner surface 6732 faces the negative end in the X direction and faces the fourth side surface 636 of the angle converter 63.

The second linkage surface 674 is a surface facing the negative end in the X direction and the positive end in the Y direction, and inclines by approximately 45° with respect to each of the XZ and YZ planes. The second linkage surface 674 is configured with paired surfaces so provided as to sandwich the second holding section 671 and the second cover section 673. That is, the second linkage surface 674 has a third linkage region 6741 and a fourth linkage region 6742, the latter of which is located at the side opposite the third linkage region 6741 with the second holding section 671 and the second cover section 673 sandwiched therebetween. The fourth linkage region 6742 is provided at a position shifted from the third linkage region 6741 in the −Y direction.

The second linkage surface 674 is bonded to the first linkage surface 664 of the first holding member 66 via an adhesive 68. In this process, the third linkage region 6741 is bonded to the first linkage region 6641, and the fourth linkage region 6742 is bonded to the second linkage region 6642. That is, when the first holding member 66 and the second holding member 67 are linked to each other, the first linkage surface 664 and the second linkage surface 674 face each other and are parallel to each other. Note that the adhesive 68, which bonds the first linkage surface 664 and the second linkage surface 674 to each other, can be a light transmissive adhesive, as the adhesive 64.

The second recessed section 675 is a recess provided in a portion of the second linkage surface 674 that faces the second holding section 671, and constitutes, along with the first recessed section 665 of the first holding member 66, the adhesive relief sections 653 and 654, which will be described later. The second holding member 67 is provided with two second recessed sections 675.

The two second recessed sections 675 include a second recessed section 6751 provided in a portion of the third linkage region 6741 that faces the second holding section 671, and a second recessed section 6752 provided in a portion of the fourth linkage region 6742 that faces the second holding section 671. Although will be described later in detail, the second recessed section 6751 and the first recessed section 6651 constitute the adhesive relief section 653, and the second recessed section 6752 and first recessed section 6652 constitute the adhesive relief section 654.

Fixing Angle Converter to Light Guide Via Holder

Figure 13:
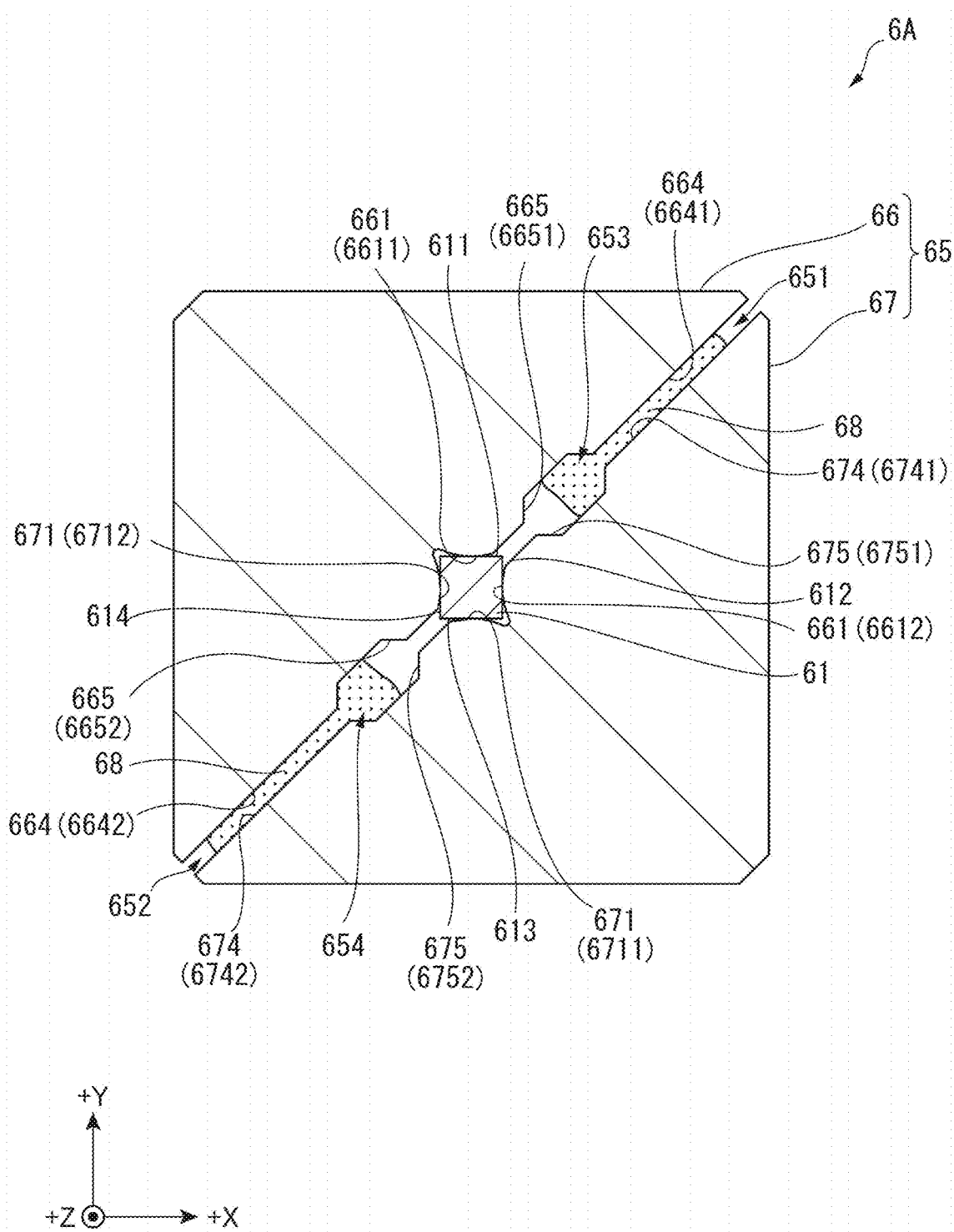
FIG. 13 is a cross-sectional view showing a light outputting member according to the first embodiment.

FIG. 13 shows the cross section of the light outputting member 6A taken along the XZ plane. In other words, FIG. 13 is a cross-sectional view taken along the line XIII-XIII in FIG. 4.

The holder 65 is the combination of the first holding member 66 and the second holding member 67, as described above. In detail, the first holding member 66 and the second holding member 67 are combined with each other by bonding the first linkage region 6641 and the third linkage region 6741 to each other with the adhesive 68 and bonding the second linkage region 6642 and the fourth linkage region 6742 to each other with the adhesive 68, as shown in FIG. 13.

The first linkage region 6641 and the third linkage region 6741 are thus bonded to each other with the adhesive 68 to form a first linkage section 651, which links the first holding member 66 and the second holding member 67 to each other. The second linkage region 6642 and the fourth linkage region 6742 are bonded to each other with the adhesive 68 to form a second linkage section 652, which links the first holding member 66 and the second holding member 67 to each other. That is, the holder 65 includes the linkage sections 651 and 652, which link the first holding member 66 and the second holding member 67 to each other in the state in which the first linkage surface 664 and the second linkage surface 674 face each other.

When the first holding member 66 and the second holding member 67 are linked to each other, the adhesive relief section 653 is formed by the first recessed section 6651 of the first holding member 66 and the second recessed section 6751 of the second holding member 67, and the adhesive relief section 654 is formed by the first recessed section 6652 of the first holding member 66 and the second recessed section 6752 of the second holding member 67. That is, the holder 65 includes the adhesive relief sections 653 and 654.

The adhesive relief sections 653 and 654 are each a portion that prevents an excess adhesive 68 from flowing to the light guide 61. The adhesive relief section 653 is provided between the first linkage section 651 and the light guide 61, and the adhesive relief section 654 is provided between the second linkage section 652 and the light guide 61.

The adhesive relief sections 653 and 654 are each a widened portion between the first linkage surface 664 and the second linkage surface 674. In detail, the distance between the first linkage surface 664 and the second linkage surface 674 in the adhesive relief section 653 is greater than the distance between the first linkage surface 664 and the second linkage surface 674 in the first linkage section 651. Furthermore, the distance between the first linkage surface 664 and the second linkage surface 674 in the adhesive relief section 654 is greater than the distance between the first linkage surface 664 and the second linkage surface 674 in the second linkage section 652.

Figure 14:
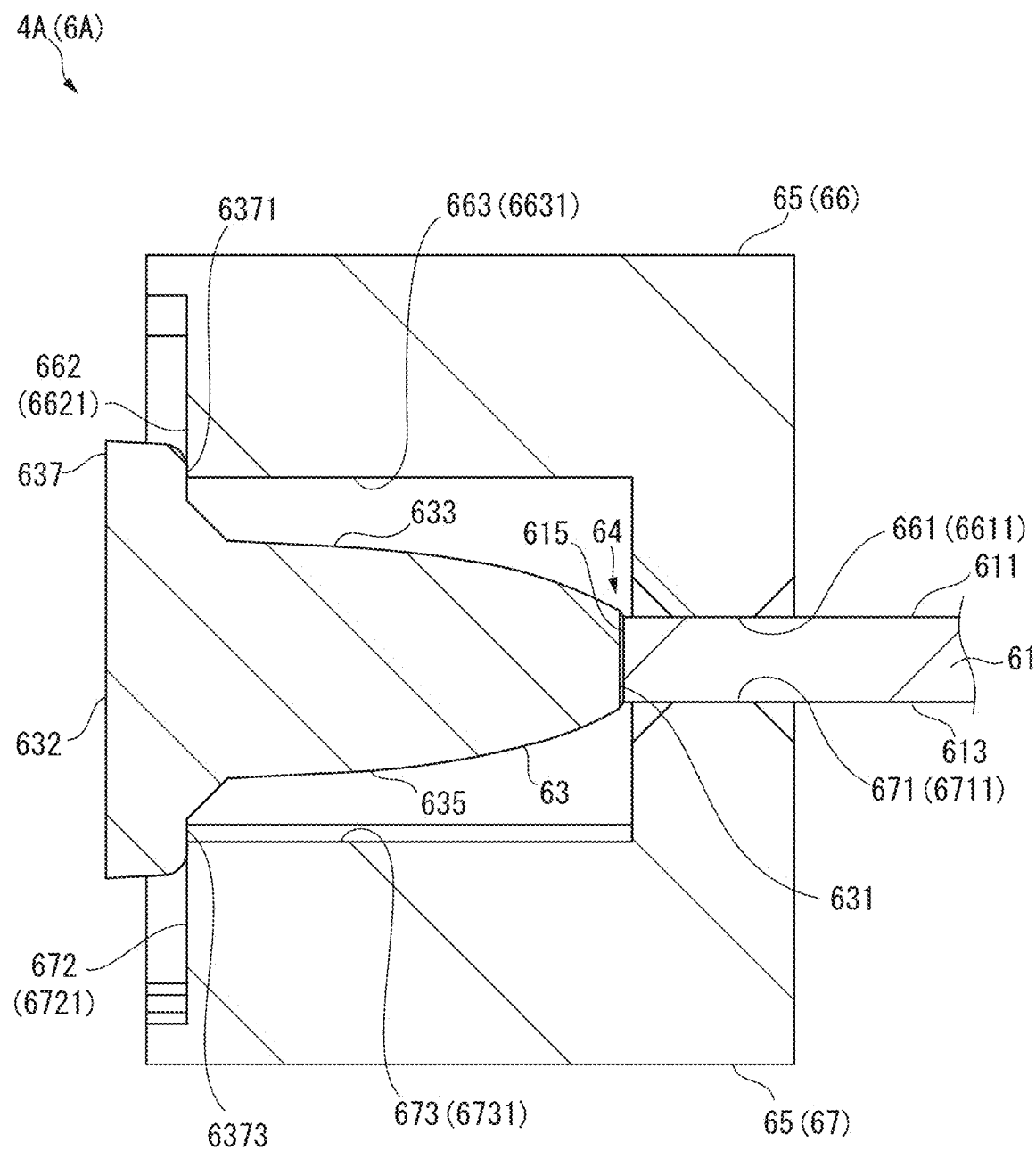
FIG. 14 is a cross-sectional view showing the light outputting member according to the first embodiment.
Figure 15:
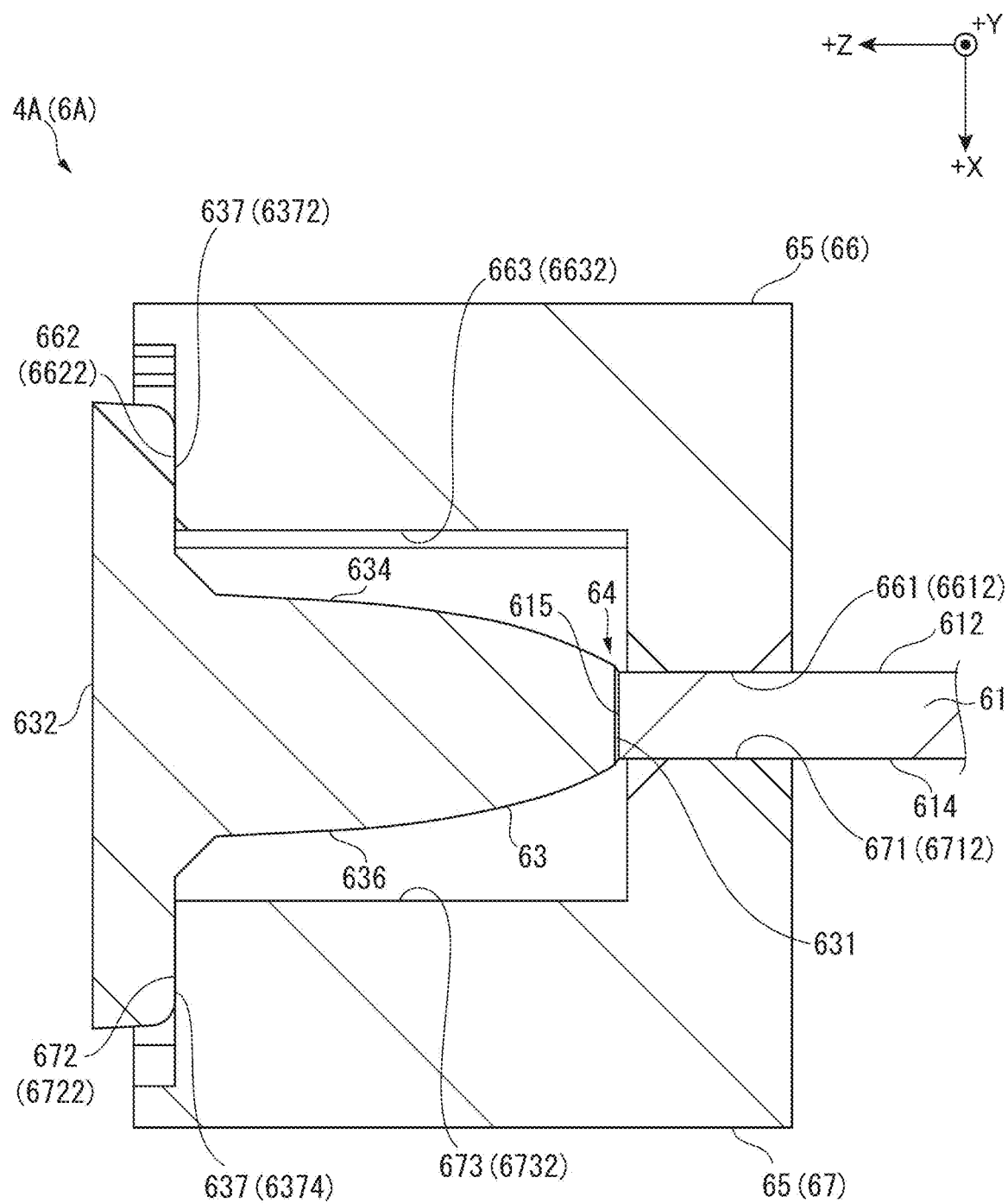
FIG. 15 is a cross-sectional view showing a light outputting member according to the first embodiment.

FIG. 14 shows the cross section of the light outputting member 6A taken along the YZ plane, FIG. 15 shows the cross section of the light outputting member 6A along the XZ plane.

When the holder 65 is attached to the light guide 61 and the angle converter 63, the first holding section 661 and the second holding section 671 of the holder 65 hold the side surfaces 611 to 614 of the light guide 61, and the first fixed section 662 and the second fixed section 672 of the holder 65 are fixed to the flange 637 of the angle converter 63, as shown in FIGS. 14 and 15.

In detail, the first contact section 6611 of the first holding section 661 is in line-contact with the first side surface 611 of the light guide 61 along the Z-axis, and the third contact section 6711 of the second holding section 671 is in line-contact with the third side surface 613 of the light guide 61 along the Z-axis, as shown in FIG. 14.

Note that the first fixed region 6621 of the first fixed section 662 is fixed to the first fixed region 6371 of the flange 637 with an adhesive, and that the third fixed region 6721 of the second fixed section 672 is fixed to the third fixed region 6373 of the flange 637 with an adhesive.

The second contact section 6612 of the first holding section 661 is in line-contact with the second side surface 612 of the light guide 61 along the Z axis, and the fourth contact section 6712 of the second holding section 671 is in line-contact with the fourth side surface 614 of the light guide 61 along the Z axis, as shown in FIG. 15.

Note that the second fixed region 6622 of the first fixed section 662 is fixed to the second fixed region 6372 of the flange 637 with an adhesive, and that the fourth fixed region 6722 of the second fixed section 672 is fixed to the fourth fixed region 6374 of the flange 637 with an adhesive.

The holder 65 disposed so as to extend over the adhesive 64, which constitutes the portion where the light guide 61 and the angle converter 63 are bonded to each other, can thus suppress separation of the angle converter 63 from the light guide 61. Furthermore, since the holder 65 and the light guide 61 are in line-contact with each other at the contact sections 6611, 6612, 6711, and 6712, the contact area between the holder 65 and the light guide 61 can be reduced. Leakage of the fluorescence YL and the excitation light EL from the light guide 61 can thus be suppressed.

Configuration of Housing

Figure 16:
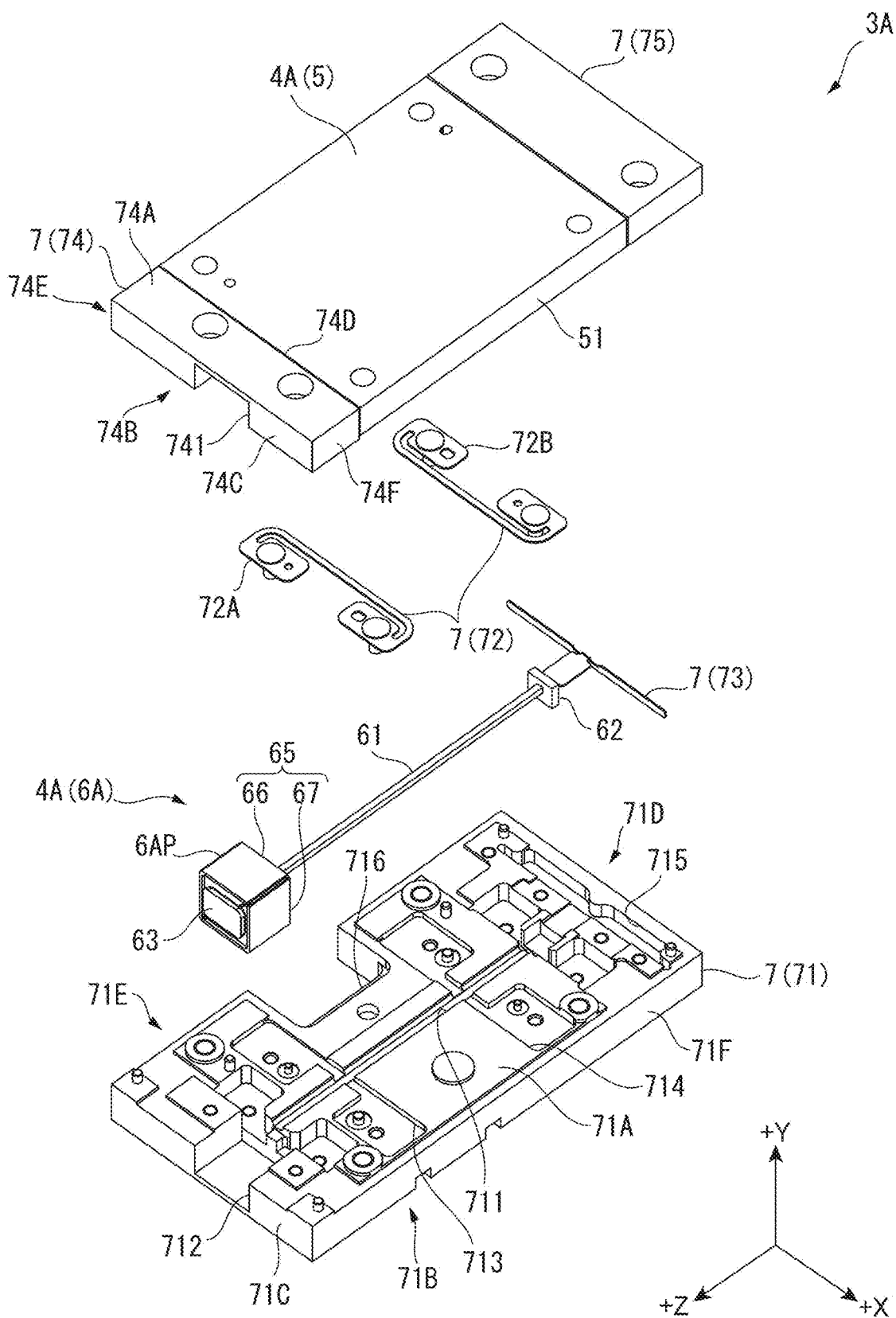
FIG. 16 is an exploded perspective view showing the light source apparatus according to the first embodiment.
Figure 17:
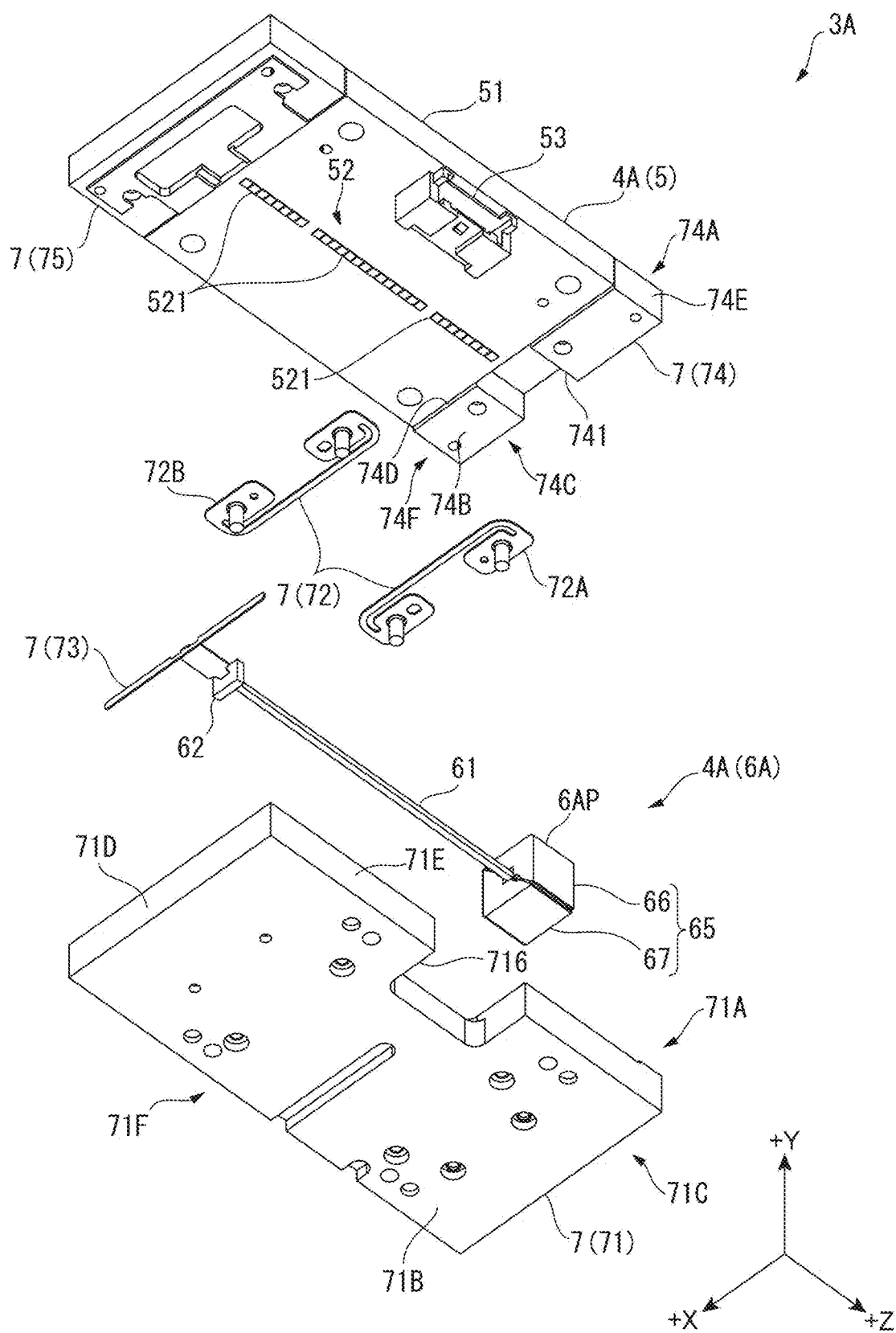
FIG. 17 is an exploded perspective view showing the light source apparatus according to the first embodiment.

FIG. 16 is an exploded perspective view showing the light source apparatus 3A viewed in the +Z direction, and FIG. 17 is an exploded perspective view showing the light source apparatus 3A viewed from the −Z direction.

The housing 7 supports the fluorescence outputting apparatus 4A and accommodates the light outputting member 6A of the fluorescence outputting apparatus 4A, as shown in FIGS. 2, 3, 16, and 17. The housing 7 includes the base 71, two fixing members 72, the urging member 73, the first cover member 74, and the second cover member 75, as shown in FIGS. 16 and 17.

Configuration of Base

The base 71 supports the fluorescence outputting apparatus 4A in the −Y direction. That is, the light outputting member 6A is disposed at the base 71. In addition, the first cover member 74 and the second cover member 75 are fixed to the base 71. The base 71 is a metal body made of metal such as aluminum, iron, or stainless steel, and is capable of heat dissipation.

The base 71 is formed in the shape of a rectangular plate elongated along the Z-axis when viewed in the +Y direction. The base 71 has surfaces 71A, 71B, 71C, 71D, 71E, and 71F.

In the base 71, the first surface 71A is a surface facing the positive end in the Y direction, and the second surface 71B is a surface facing the negative end in the Y direction. The second surface 71B is a surface opposite the first surface 71A.

In the base 71, the third surface 71C is a surface facing the positive end in the Z direction, and the fourth surface 71D is a surface facing the negative end in the Z direction. The fourth surface 71D is a surface opposite the third surface 71C.

In the base 71, the fifth surface 71E is a surface facing the negative end in the X direction, and the sixth surface 71F is a surface facing the positive end in the X direction. The sixth surface 71F is a surface opposite the fifth surface 71E.

The surfaces 71C, 71D, 71E, and 71F are therefore surfaces that intersect with each of the first surface 71A and the second surface 71B.

Figure 18:
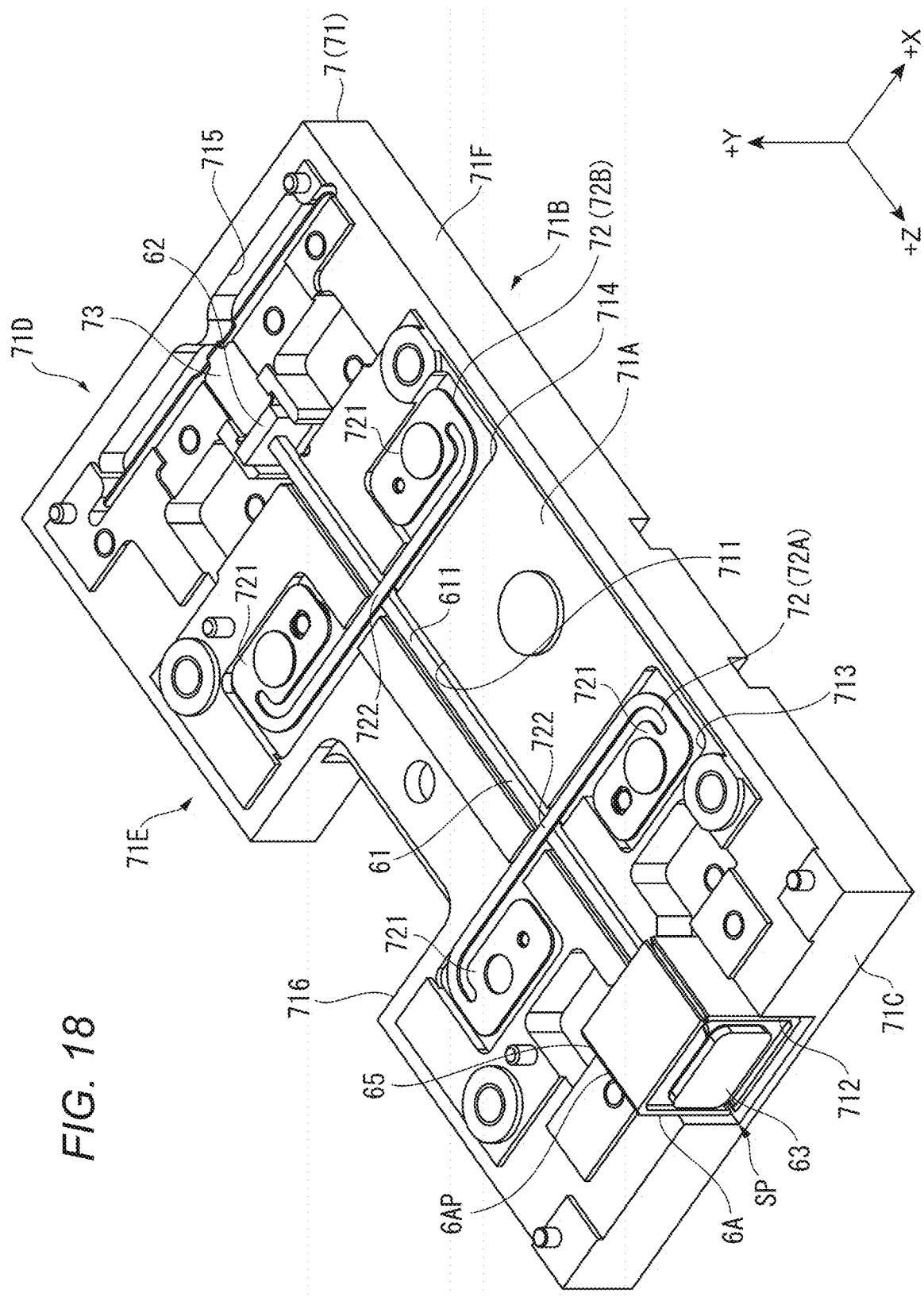
FIG. 18 is a perspective view showing a base according to the first embodiment.
Figure 19:
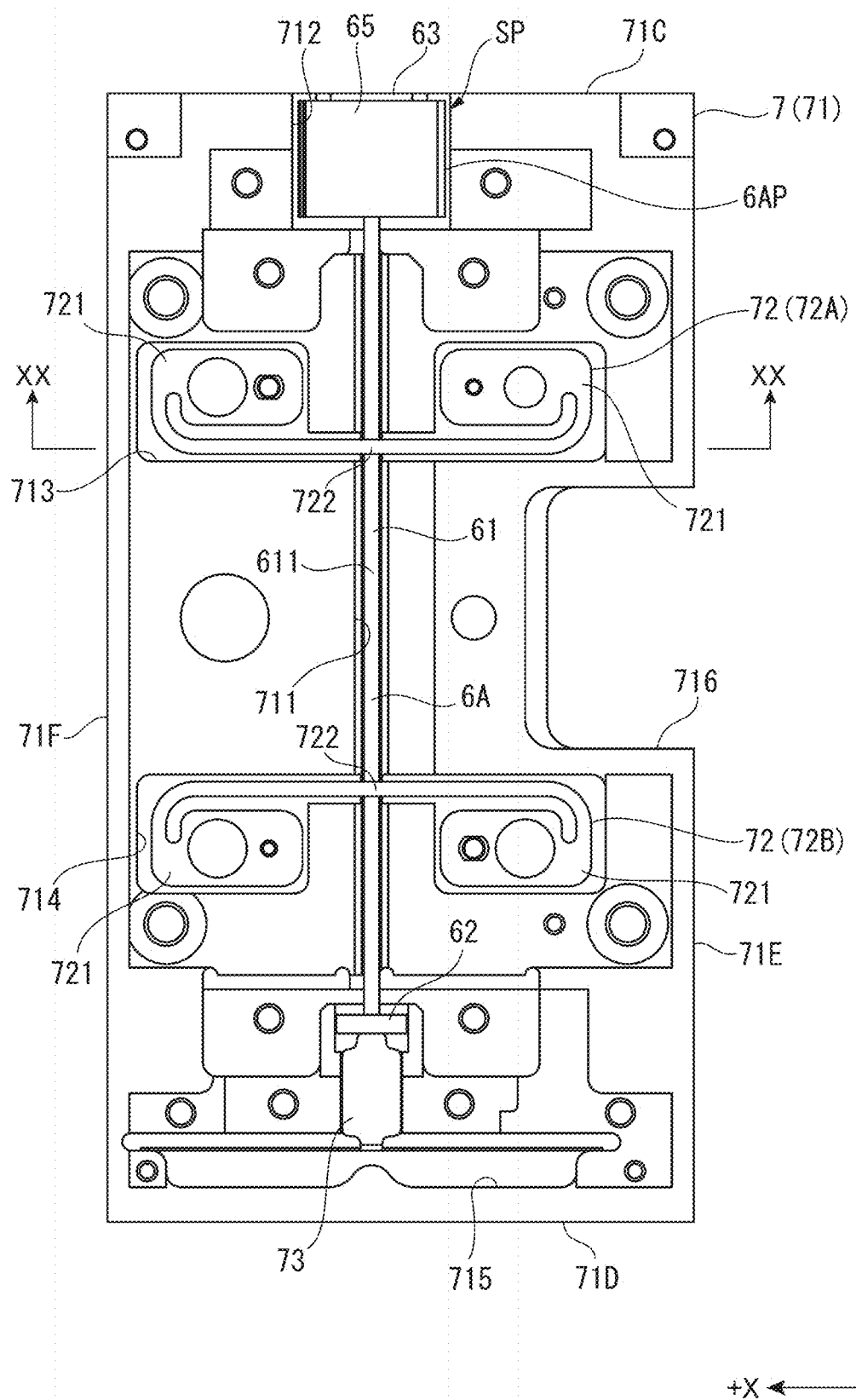
FIG. 19 is a plan view showing the base according to the first embodiment.

FIG. 18 is a perspective view showing the base 71 viewed in the +Y direction, and FIG. 19 is a plan view showing the base 71 viewed in the +Y direction. FIGS. 18 and 19 show the base 71 in a state in which the light outputting member 6A is disposed.

The base 71 first further includes the accommodating section 711, a second accommodating section 712, a first recessed section 713, a second recessed section 714, a placement section 715, and a third recessed section 716, and the sections 711 to 715 are provided at the first surface 71A.

Configuration of First Accommodating Section

Figure 20:
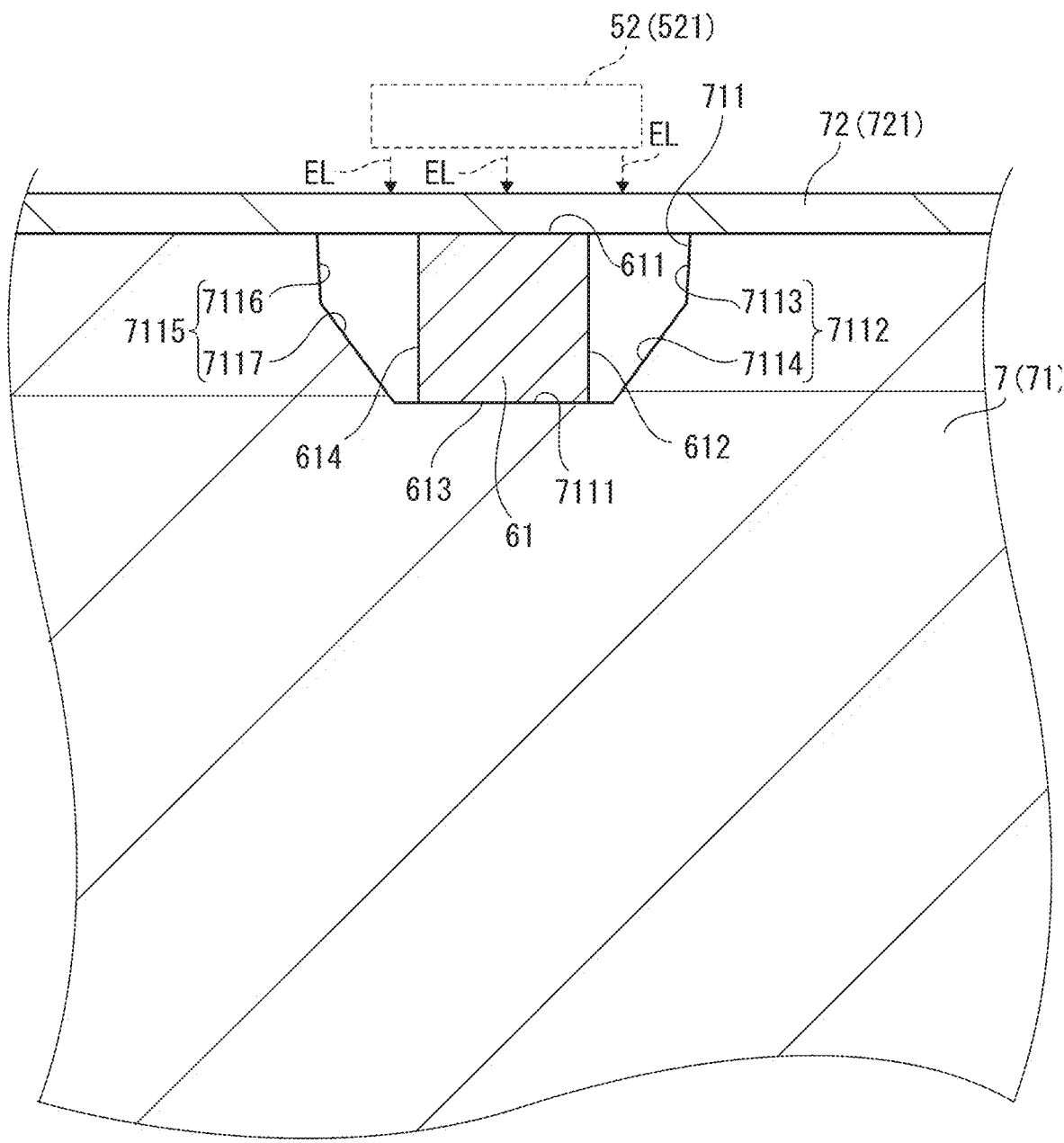
FIG. 20 is a cross-sectional view showing the base according to the first embodiment.

FIG. 20 shows the cross section of the base 71 taken along an XY plane in the first accommodating section 711. In other words, FIG. 20 shows the cross section of the base 71 taken along the line XX-XX in FIG. 19.

The first accommodating section 711 accommodates the light guide 61. In detail, the light guide 61 is fixed to the first accommodating section 711 in a state in which the first side surface 611 is exposed. The first accommodating section 711 linearly extends along the Z-axis and is a groove that opens in the +Y direction. In detail, the first accommodating section 711 is provided at the center of the first surface 71A along the X-axis and extends along the Z-axis.

The first accommodating section 711 has a support surface 7111, a first wall surface 7112, and a second wall surface 7115 as inner surfaces, and the cross section of the first accommodating section 711 taken along the XY plane has the shape of a substantially U letter, as shown in FIG. 20.

The support surface 7111 is a surface facing the positive end in the Y direction and corresponds to the bottom surface of the first accommodating section 711. When the light guide 61 is disposed in the first accommodating section 711, the support surface 7111 supports the third side surface 613.

The first wall surface 7112 and the second wall surface 7115 each intersect with the support surface 7111, and face each other. The first wall surface 7112 faces the positive end in the X direction, and the second wall surface 7115 faces the negative end in the X direction. When the light guide 61 is disposed in the first accommodating section 711, the first wall surface 7112 faces the second side surface 612, and the second wall surface 7115 faces the fourth side surface 614. A gap is provided between the first wall surface 7112 and the second side surface 612, and a gap is provided between the second wall surface 7115 and the fourth side surface 614.

The first wall surface 7112 includes a first section 7113, which is far from the support surface 7111 and shifted toward the positive end in the Y direction, and a second section 7114, which is close to the support surface 7111 and shifted toward the negative end in the Y direction.

The first section 7113 is a surface perpendicular to the support surface 7111.

The second section 7114 is an inclining surface that inclines so as to approach the second wall surface 7115 as extending from the end of the first section 7113 that faces the support surface 7111 toward the support surface 7111. In other words, the second section 7114 inclines so as to approach the second side surface 612 as extending toward the support surface 7111.

The second wall surface 7115 is also configured in the same manner as the first wall surface 7112. That is, the second wall surface 7115 has a first section 7116, which is far from the support surface 7111 and shifted toward the positive end in the Y direction, and a second section 7117, which is close to the support surface 7111 and shifted toward the negative end in the Y direction.

The first section 7116 is a surface perpendicular to the support surface 7111, and the second section 7117 is an inclining surface that inclines so as to approach the first wall surface 7112 and the fourth side surface 614 as extending from the end of the first section 7116 that faces the support surface 7111 toward the support surface 7111.

The first accommodating section 711 can be formed by cutting the base 71. The wall surfaces 7112 and 7115 are therefore each formed by a surface made of any of the metals described above.

In the present embodiment, the wall surfaces 7112 and 7115 are further mirror-finished, so that the wall surfaces 7112 and 7115 have light reflectivity. The wall surfaces 7112 and 7115 therefore reflect the incident excitation light EL. The wall surfaces 7112 and 7115 may each be configured with another metal film or a dielectric multilayer film formed at the surface made of any of the metals described above.

The dimension of the light emitting surface of each of the light emitters 521, which constitute the light source 52, along the X-axis is greater than the dimension of the light guide 61 along the X-axis, but smaller than the dimension along the X-axis between the first section 7113 and the first section 7116. The opposite ends of the light emitting surface of each of the light emitters 521 along the X axis therefore extend off the first side surface 611 of the light guide 61. The dimension of the support surface 7111 along the X-axis is greater than the dimension of the light guide 61 along the X-axis.

Therefore, part of the excitation light EL output from each of the light emitters 521 passes through the gap between the second side surface 612 of the light guide 61 and the first section 7113 of the first wall surface 7112, and is then reflected off the second section 7114, which inclines with respect to the support surface 7111, and is incident on the second side surface 612. The same holds for the excitation light EL passing through the gap between the fourth side surface 614 of the light guide 61 and the second wall surface 7115. The excitation light EL passing through the gap between the second side surface 612 and the first wall surface 7112 and the excitation light EL passing through the gap between the fourth side surface 614 and the second wall surface 7115 can thus readily enter the light guide 61.

Configuration of Second Accommodating Section

Figure 21:
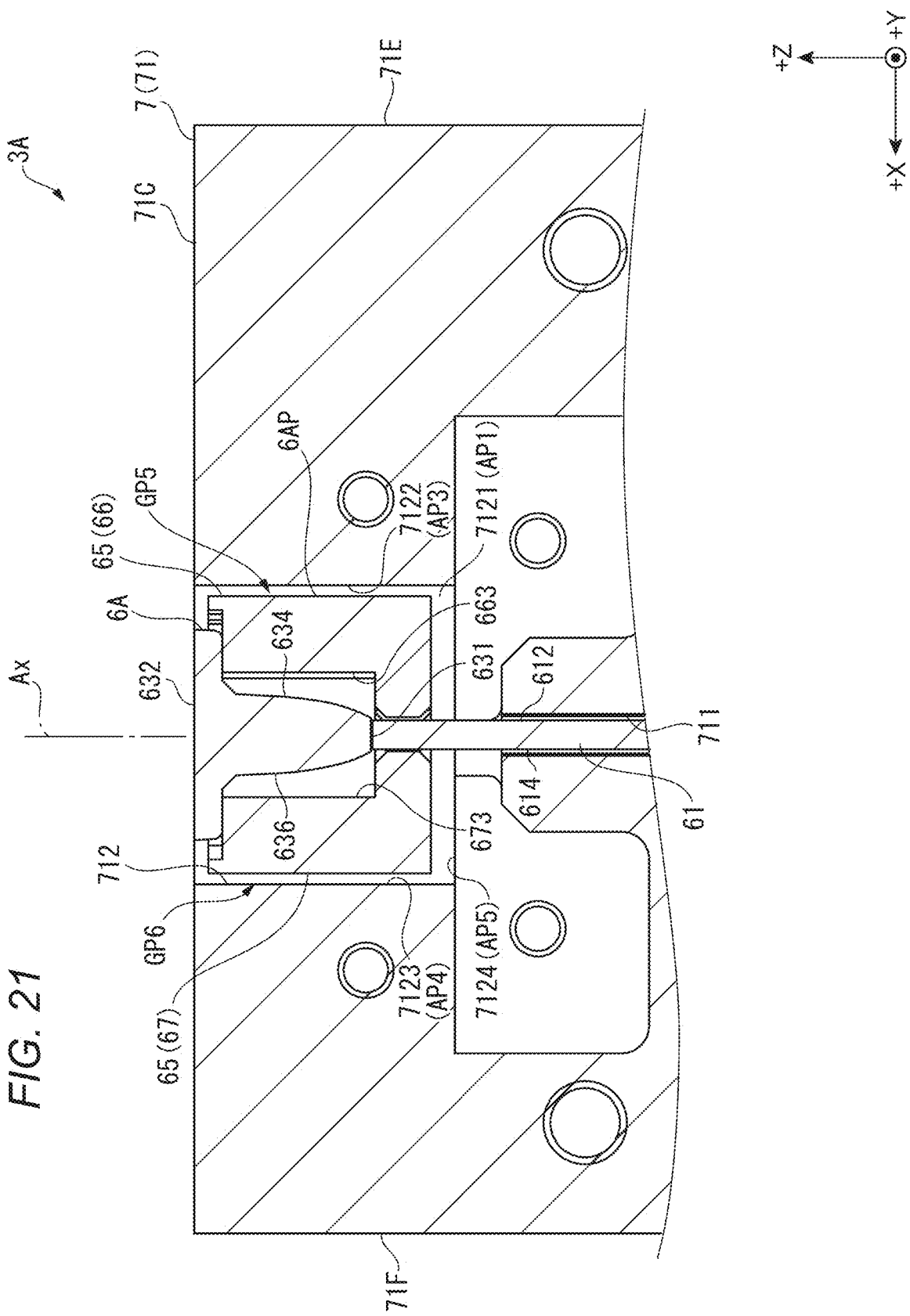
FIG. 21 is a cross-sectional view showing the light source apparatus according to the first embodiment.

FIG. 21 shows a portion of the cross section of the light source apparatus 3A taken along the XZ plane in the second accommodating section 712.

The second accommodating section 712 is provided at a position shifted in the +Z direction from the first accommodating section 711, as shown in FIGS. 18 and 19. The second accommodating section 712 has inner surfaces 7121, 7122, 7123, and 7124, is a recess that opens in the +Y direction and the +Z direction, and is formed in a rectangular shape when viewed in the +Y direction, as shown in FIG. 21. The inner surfaces 7121, 7122, 7123, and 7124 correspond to a second inner surface.

The inner surface 7121 is a surface facing the positive end in the Y direction and constitutes the bottom of the second accommodating section 712.

The inner surface 7122 is a surface facing the positive end in the X direction, and the inner surface 7123 is a surface facing the negative end in the X direction. The inner surface 7122 and the inner surface 7123 face each other.

The inner surface 7124 is a surface facing the positive end in the Z direction.

The second accommodating section 712 communicates with the first accommodating section 711, which accommodates the light guide 61, and accommodates a portion of an accommodated section 6AP of the light outputting member 6A. That is, when the first cover member 74 is fixed to the base 71, the second accommodating section 712 constitutes along with the first cover member 74 an accommodating space SP, which accommodates the accommodated section 6AP of the light outputting member 6A.

The accommodated section 6AP is a portion of the light outputting member 6A that is accommodated in the accommodating space SP. The accommodated section 6AP is a portion configured with an end portion of the light guide 61 that faces the positive end in the Z direction, the angle converter 63, the adhesive 64, and the holder 65, and the second accommodating section 712 accommodates a portion of the accommodated section 6AP that faces the negative end in the Y direction.

Configuration of First and Second Recessed Sections

The first recessed section 713 and the second recessed section 714 are each a recess extending along the X-axis over the first accommodating section 711, which extends along the Z-axis, and is recessed in the −Y direction from the first surface 71A, as shown in FIGS. 18 and 19. The first recessed section 713 and the second recessed section 714 are separate from each other along the Z-axis, and the second recessed section 714 is provided at a position shifted in the −Z direction from the first recessed section 713. A first fixing member 72A out of the fixing members 72 is disposed in the first recessed section 713, and a second fixing member 72B out of the fixing members 72 is fixed to the second recessed section 714 with screws.

Configurations of Placement Section and Third Recessed Section

The placement section 715 is a recess provided at an end portion of the first surface 71A that faces the negative end in the Z direction and recessed in the −Y direction from the first surface 71A. The urging member 73 is disposed in the placement section 715. The placement section 715 is covered with the second cover member 75 in the +Y direction.

The third recessed section 716 is a recess recessed in the +X direction from the fifth surface 71E of the base 71, and opens in the −X direction, the +Y direction, and the −Y direction. When the light source section 5 is fixed to the base 71, the connector 53 of the substrate 51 is disposed in the third recessed section 716.

Configuration of Fixing Members

The two fixing members 72 are each fixed to the base 71 in a state in which the light guide 61 is pressed toward the base 71 in the +Y direction. The two fixing members 72 include the first fixing member 72A disposed in the first recessed section 713 and the second fixing member 72B disposed in the second recessed section 714. The second fixing member 72B is separate from the first fixing member 72A in the −Z direction.

The fixing members 72A and 72B each include two fixed sections 721 and a pressing section 722, and are each configured with a plate spring in the present embodiment.

The two fixed sections 721 are provided at opposite ends of each of the fixing members 72, which extend along the X-axis, in the longitudinal direction. The fixed sections 721 are each fixed to the bottom surface of the first recessed section 713 or the bottom surface of the second recessed section 714 with a screw.

The pressing section 722 is provided at a position between the two fixed sections 721. The pressing section 722 is in contact with the first side surface 611 of the light guide 61, and presses the light guide 61 toward the support surface 7111 of the first accommodating section 711. The light guide 61 is thus fixed to the first accommodating section 711.

Configurations of Urging Member and Second Cover Member

The urging member 73 is disposed in the placement section 715, and urges the reflector 62 toward the second end surface 616 of the light guide 61. The urging member 73 can be configured, for example, with a plate spring.

The second cover member 75 is fixed to the base 71 and covers in the +Y direction the urging member 73 disposed in the placement section 715, as shown in FIGS. 16 and 17. The second cover member 75 is disposed at a position shifted in the −Z direction from the substrate 51 of the light source section 5, and is fixed to the end of the base 71 that faces the negative end in the Z direction.

Configuration of First Cover Member

The first cover member 74 is disposed at a position shifted in the +Z direction from the substrate 51 of the light source section 5, and is fixed to the base 71 so as to cover the second accommodating section 712 in the +Y direction, as shown in FIGS. 16 and 17. When the first cover member 74 is combined with the base 71, the first cover member 74 surrounds the circumference of the accommodated section 6AP of the light outputting member 6A disposed at the base 71, and forms the accommodating space SP, which accommodates the accommodated section 6AP.

The first cover member 74 is made, for example, of metal and is capable of heat dissipation.

The first cover member 74 has a first surface 74A, a second surface 74B, a third surface 74C, a fourth surface 74D, a fifth surface 74E, and a sixth surface 74F.

The first surface 74A is a surface facing the positive end in the Y direction.

The second surface 74B is a surface facing the negative end in the Y direction, and is a surface opposite the first surface 74A. When the first cover member 74 is disposed at the base 71, the second surface 74B faces the first surface 71A of the base 71.

The third surface 74C is a surface facing the positive end in the Z direction. When the first cover member 74 is fixed to the base 71, the third surface 74C is substantially flush with an extension surface of the third surface 71C of the base 71.

The fourth surface 74D is a surface facing the negative end in the Z direction, and is a surface opposite the third surface 74C. The fourth surface 74D faces the surface of the substrate 51 of the light source section 5 that faces the positive end in the Z direction.

The fifth surface 74E is a surface facing the negative end in the X direction. The sixth surface 74F is a surface facing the positive end in the X direction, and is a surface opposite the fifth surface 74E. When the first cover member 74 is fixed to the base 71, the fifth surface 74E is substantially flush with an extension surface of the fifth surface 71E of the base 71, and the sixth surface 74F is substantially flush with an extension surface of the sixth surface 71F of the base 71.

Figure 22:
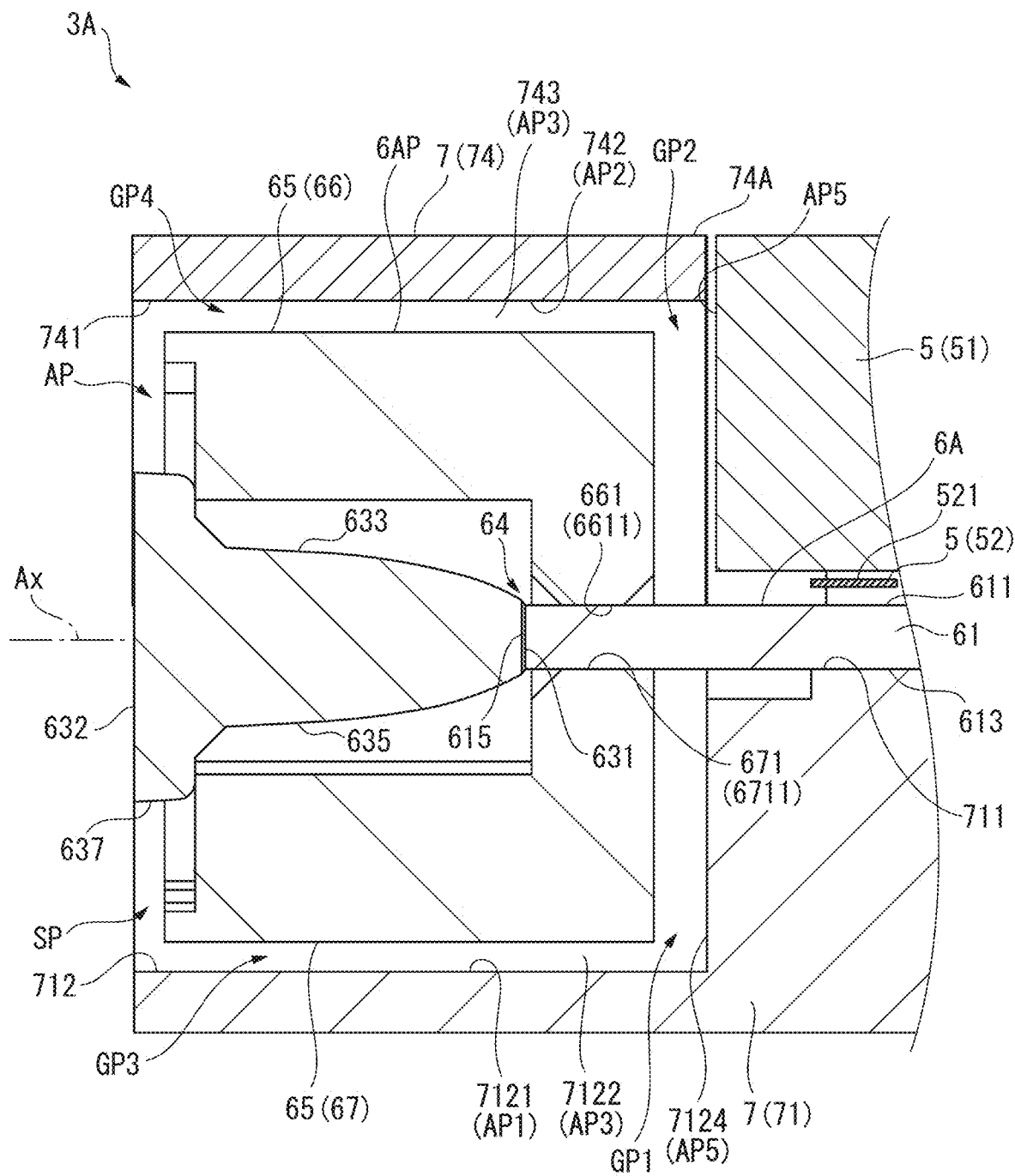
FIG. 22 is a cross-sectional view showing the light source apparatus according to the first embodiment.
Figure 23:
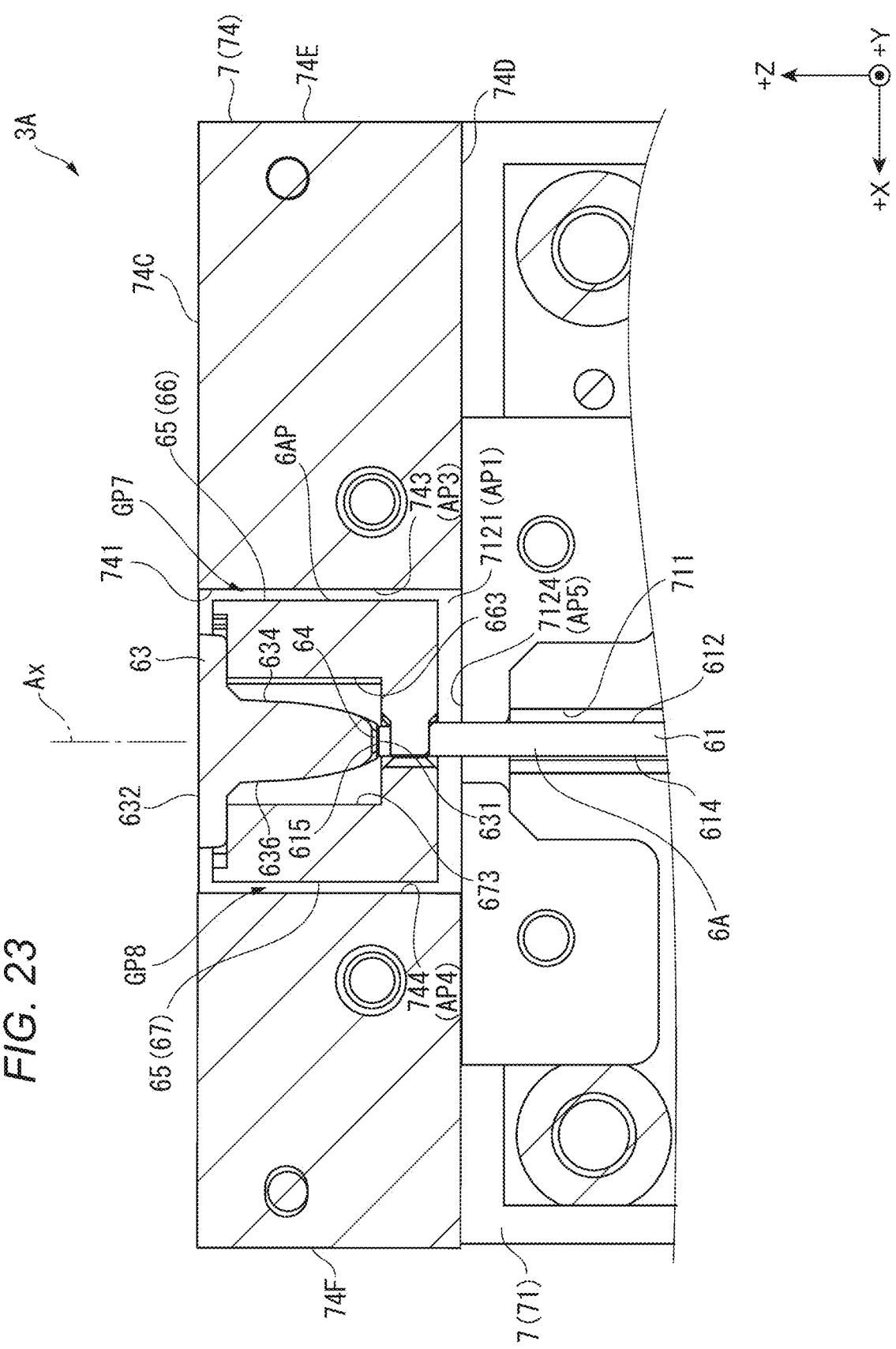
FIG. 23 is a cross-sectional view showing the light source apparatus according to the first embodiment.

FIG. 22 shows a portion of the cross section of the light source apparatus 3A taken along the YZ plane. In detail, FIG. 22 shows a portion of the cross section of the light source apparatus 3A including the optical axis Ax of the angle converter 63. FIG. 23 shows a portion of the cross section of the light source apparatus 3A taken along the XZ plane in the first cover member 74.

The first cover member 74 further includes an accommodating recessed section 741.

The accommodating recessed section 741 is a recess recessed in the +Y direction from the second surface 74B, and opens in the −Y direction, the +Z direction, and the −Z direction. That is, the accommodating recessed section 741 passes through the first cover member 74 along the Z-axis. The accommodating recessed section 741 has an inner surface 742 shown in FIG. 22 and inner surfaces 743 and 744 shown in FIG. 23. Note that the inner surfaces 742 to 744 correspond to a first inner surface.

The inner surface 742 is an inner surface facing the negative end in the Y direction.

The inner surface 743 is an inner surface facing the positive end in the X direction. The inner surface 743 is substantially flush with an extension surface of the inner surface 7122 of the second accommodating section 712.

The inner surface 744 is an inner surface facing the negative end in the X direction. The inner surface 744 is substantially flush with an extension surface of the inner surface 7123 of the second accommodating section 712.

The inner surfaces 743 and 744 face each other and intersect with the inner surface 742.

The dimension between the inner surfaces 743 and 744, that is, the dimension of the accommodating recessed section 741 along the X-axis is substantially equal to the dimension of the second accommodating section 712 along the X-axis, and the dimension of the accommodating recessed section 741 along the Z-axis is substantially equal to the dimension of the second accommodating section 712 along the Z-axis.

When the first cover member 74 is disposed at the base 71, the accommodating recessed section 741 of the first cover member 74 and the second accommodating section 712 of the base 71 form the accommodating space SP described above. That is, the accommodating recessed section 741 accommodates a portion of the accommodated section 6AP that faces the positive end in the Y direction.

Arrangement of Accommodated Section in Accommodating Space

The portion of the light guide 61 that is fixed to the first accommodating section 711 by the fixing members 72 is a fixed end. Specifically, a portion of the light guide 61 that extends in the −Z direction from the section where the light guide 61 is in contact with the first fixing member 72A is a fixed end fixed to the first accommodating section 711.

A portion of the light guide 61 that extends in the +Z direction from the portion where the light guide 61 is in contact with the first fixing member 72A is a free end. In detail, a portion of the light guide 61 that extends in +Z direction from the portion where the light guide 61 is in contact with the first fixing member 72A, has the first end surface 615, to which the angle converter 63 is bonded, and faces the angle converter 63 is partially a free end.

In other words, a portion of the light outputting member 6A that extends in the −Z direction from the portion where the light outputting member 6A is in contact with the first fixing member 72A is a fixed end, a portion of the light outputting member 6A that extends in the +Z direction from the portion where the light outputting member 6A is in contact with the first fixing member 72A is a free end, and the free end of the light outputting member 6A includes the accommodated section 6AP.

The thus configured accommodated section 6AP is in contact with none of the inner surfaces 7121 to 7124 of the second accommodating section 712 and the inner surfaces 742 to 744 of the first cover member 74, which form the accommodating space SP, as shown in FIGS. 21 to 23.

When receiving the excitation light EL incident from the light source section 5, the light guide 61, which is a wavelength converter, generates heat and expands accordingly. In this case, the accommodated section 6AP extends in the +Z direction.

The accommodated section 6AP is, however, in contact with none of the second accommodating section 712 and the first cover member 74 along the Z-axis, as shown in FIGS. 21 to 23.

In a state in which the light guide 61 has not expanded, the accommodated section 6AP is separate from the inner surface 7124 of the second accommodating section 712, which is located at a position shifted in the −Z direction from the accommodated section 6AP, and a gap GP1 is provided between the accommodated section 6AP and the inner surface 7124, as shown in FIG. 22. In the state in which the light guide 61 has not expanded, the accommodated section 6AP is separate also from the substrate 51 of the light source section 5, which is located at a position shifted in the −Z direction from the accommodated section 6AP, and a gap GP2 is provided between the accommodated section 6AP and the substrate 51. Therefore, when the light guide 61 has not expanded, the accommodated section 6AP is in contact with none of the inner surface 7124 and the substrate 51.

Therefore, even when the light guide 61 expands or contracts along the −Z axis, the accommodated section 6AP comes into contact with none of the inner surfaces 7121 to 7124 of the second accommodating section 712 and the inner surfaces 742 to 744 of the first cover member 74, which forms the accommodating space SP.

When an impact in a direction that intersects with the Z-axis acts on the light source apparatus 3A, the accommodated section 6AP swings in the direction in which the impact acts and the opposite direction of the direction in which the impact acts.

In view of the face described above, a gap GP3 is provided in the Y-axis between the accommodated section 6AP and the inner surface 7121 of the second accommodating section 712, and a gap GP4 is provided in the Y-axis between the accommodated section 6AP and the inner surface 742 of the accommodating recessed section 741, as shown in FIG. 22. That is, the accommodated section 6AP is in contact with none of the inner surface 7121 of the second accommodating section 712 and the inner surface 742 of the accommodating recessed section 741 in the Y-axis direction. Therefore, when an impact acts on the light source apparatus 3A along the Y-axis, the accommodated section 6AP does not come into contact with at least one of the inner surface 7121 of the second accommodating section 712 and the inner surface 742 of the accommodating recessed section 741.

A gap GP5 is provided along the X-axis between the accommodated section 6AP and the inner surface 7122 of the second accommodating section 712, and a gap GP6 is provided along the X-axis between the accommodated section 6AP and the inner surface 7123 of the second accommodating section 712, as shown in FIG. 21. The accommodated section 6AP is therefore in contact with none of the inner surfaces 7122 and 7123 of the second accommodating section 712 along the X-axis.

A gap GP7 is provided along the X-axis between the accommodated section 6AP and the inner surface 743 of the accommodating recessed section 741, and a gap GP8 is provided along the X-axis between the accommodated section 6AP and the inner surface 744 of the accommodating recessed section 741, as shown in FIG. 23. The accommodated section 6AP is therefore in contact with none of the inner surfaces 743 and 744 of the accommodating recessed section 741 along the X-axis.

Therefore, when an impact acts on the light source apparatus 3A along the X-axis, the accommodated section 6AP does not come into contact with none of the inner surface 7122 of the second accommodating section 712 and the inner surface 743 of the accommodating recessed section 741 and/or none of the inner surface 7123 of the second accommodating section 712 and the inner surface 744 of the accommodating recessed section 741.

In other words, the housing 7 has an opening AP, which opens in the +Z direction and in which the accommodated section 6AP is disposed. The opening AP is an opening via which the light exiting end surface 632 of the angle converter 63 is exposed, and can therefore be taken as a light exiting port via which the fluorescence outputting apparatus 4A outputs the fluorescence YL.

The opening AP has an inner surface AP1 facing the positive end in the Y direction, an inner surface AP2 facing the negative end in the Y direction, an inner surface AP3 facing the positive end in the X direction, an inner surface AP4 facing the negative end in the X direction, and a bottom surface AP5 facing the positive end in the Z direction. The inner surfaces AP1 to AP4 and the bottom surface AP5 are configured with the inner surfaces of the second accommodating section 712 and the accommodating recessed section 741.

Specifically, the inner surface AP1 is configured with the inner surface 7121, and the inner surface AP2 is configured with the inner surface 742. The inner surface AP3 is configured with the inner surfaces 7122 and 743, and the inner surface AP4 is configured with the inner surfaces 7123 and 744. The bottom surface AP5 is configured with the inner surface 7124 and a surface of the substrate 51 that faces the positive end in the Z direction.

The gap GP3 is provided between the accommodated section 6AP and the inner surface AP1, and the gap GP4 is provided between the accommodated section 6AP and the inner surface AP2. The gaps GP5 and GP7 are provided between the accommodated section 6AP and the inner surface AP3, and the gaps GP6 and GP8 are provided between the accommodated section 6AP and the inner surface AP4. The gaps GP1 and GP2 are provided between the accommodated section 6AP and the bottom surface AP5. Therefore, the accommodated section 6AP is in contact with none of the inner surfaces AP1 and AP2 along the Y-axis, is in contact with none of the inner surfaces AP3 and AP4 along the X-axis, and is not in contact with the bottom surface AP5 along the Z-axis.

Therefore, when the light guide 61 expands or contracts, or when an impact acts on the light source apparatus 3A along the X-axis or the Y-axis, the accommodated section 6AP comes into contact with none of the inner surfaces AP1 to AP4 and the bottom surface AP5.

Advantages of First Embodiment

The projector 1 according to the present embodiment described above provides the advantages below.

The projector 1 includes the light source apparatus 3A, the light modulators 27, and the projection optical apparatus 29.

The light modulators 27 correspond to the image forming apparatus, and modulate light output from the light source apparatus 3A to form image light. The projection optical apparatus 29 projects the formed image light.

The light source apparatus 3A includes the substrate 51, the light guide 61, the angle converter 63, the base 71, and the first cover member 74.

The light guide 61 has the side surfaces 611 to 614 extending in the +Z direction, and the first end surface 615 and the second end surface 616, which intersect with the side surfaces 611 to 614 and are located opposite each other. The +Z direction corresponds to a first direction.

The angle converter 63 is bonded to the first end surface 615. The angle converter 63 converts the angle of the light output via the first end surface 615.

The light guide 61 is disposed at the base 71.

The light source 52, which outputs light toward the first side surface 611, is mounted on the substrate 51. The substrate 51 is disposed at the side opposite the base 71 with the light guide 61 therebetween, covers the light guide 61, and is fixed to the base 71.

The first cover member 74 is fixed to the base 71, and accommodates along with the base 71 the angle converter 63. The first cover member 74 corresponds to a cover member.

The base 71 includes the first accommodating section 711 and the second accommodating section 712.

The first accommodating section 711 accommodates the light guide 61 in the state in which the first side surface 611 is exposed. The light guide 61 is fixed to the first accommodating section 711.

The second accommodating section 712 accommodates along with the first cover member 74 the accommodated section 6AP, which is the portion from the angle converter 63 to a portion of the light guide 61 that faces the angle converter 63.

The second accommodating section 712 and the first cover member 74 surround the circumference of the accommodated section 6AP and form the accommodating space SP, which accommodates the accommodated section 6AP.

The portion of the light guide 61 that is fixed to the first accommodating section 711 is a fixed end.

A portion of the light guide 61 that has the first end surface 615, to which the angle converter 63 is bonded, and faces the angle converter 63, is a free end.

According to the configuration described above, the accommodated section 6AP described above is accommodated in the accommodating space SP formed by the second accommodating section 712 and the first cover member 74. An external force thus does not act on the circumferential surface of the angle converter 63 around the optical axis Ax of the angle converter 63.

In addition, since a portion of the light guide 61 that faces the angle converter 63 is a free end of the light guide 61. Therefore, even when the light guide 61 expands or contracts, or the projector 1 falls or is otherwise displaced so that an external force acts on the angle converter 63, the angle converter 63 is allowed to move and swing in the accommodating space SP. That is, when the light guide 61 is displaced by the expansion or contraction of the light guide 61 or the effect of an external force, the angle converter 63 can follow the displacement of the light guide 61. Separation of the angle converter 63 from the light guide 61 can therefore be suppressed. Therefore, the light source apparatus 3A can output light in a stable manner, and the projector 1 can output image light in a stable manner.

In the light source apparatus 3A, the angle converter 63 is bonded to the first end surface 615 with the adhesive 64. The second accommodating section 712 and the first cover member 74, which form the accommodating space SP, allow the angle converter 63 to be moved along the +Z direction by at least one of expansion and contraction of the adhesive 64.

The second accommodating section 712 opens in the +Z direction, and the gap GP1 is provided between the inner surface 7124 of the second accommodating section 712 and the accommodated section 6AP. The accommodating recessed section 741 of the first cover member 74, which along with the second accommodating section 712 forms the accommodating space SP, opens in the +Z direction. The accommodating recessed section 741 passes through the first cover member 74 along the Z-axis, and the gap GP2 is provided between the accommodated section 6AP and the substrate 51 located at a position shifted in the -Z direction from the first cover member 74. The angle converter 63 is therefore movable in the +Z direction and the -Z direction.

Therefore, even when the adhesive 64 expands or contracts due to heat and the angle converter 63 therefore moves along the +Z direction, the second accommodating section 712 and the first cover member 74 do not prevent the movement of the angle converter 63 along the +Z direction. No load therefore acts on the portion where the angle converter 63 and the light guide 61 are bonded to each other. Separation of the angle converter 63 from the light guide 61 can therefore be suppressed.

The light source apparatus 3A includes the holder 65.

The holder 65 includes the first holding section 661 and the second holding section 671, which hold the side surfaces 611 to 614, and the first fixed section 662 and the second fixed section 672, which are fixed to the angle converter 63. The holder 65 is disposed so as to extend over the portion where the light guide 61 and the angle converter 63 are bonded to each other. The holder 65 is disposed in the accommodating space SP.

According to the configuration described above, the portion where the light guide 61 and the angle converter 63 are bonded to each other can be protected by the holder 65 disposed as described above. Therefore, even when an external force acts on the angle converter 63, separation of the angle converter 63 from the light guide 61 can be suppressed. The light source apparatus 3A can therefore output light in a stable manner.

In the light source apparatus 3A, the first cover member 74 has the inner surfaces 742 to 744, which form the accommodating space SP. The inner surfaces 742 to 744 correspond to the first inner surface. The second accommodating section 712 has the inner surfaces 7121-7124, which form the accommodating space SP. The inner surfaces 7121 to 7124 correspond to the second inner surface. The holder 65 is in contact with none of the inner surfaces 7121 to 7124 and 742 to 744.

The configuration described above can prevent the holder 65 from colliding with the inner surfaces 7121 to 7124 and 742 to 744 not only when the holder 65 moves along the +Z direction due to expansion or contraction caused by a change in the temperature, but also when the holder 65 swings in a direction that intersects with the +Z direction due to an external force acting on the light source apparatus 3A. Breakage of the portion where the light guide 61 and the angle converter 63 are bonded to each other can therefore be suppressed, so that separation of the angle converter 63 from the light guide 61 can be effectively suppressed.

The light source apparatus 3A includes the reflector 62 and the urging member 73.

The reflector 62 is disposed at the second end surface 616. The reflector 62 reflects the light output via the second end surface 616 toward the light guide 61.

The urging member 73 is fixed to the base 71 and urges the reflector 62 against the second end surface 616.

When the second end surface 616 is fixed, and the light guide 61 expands or contracts due, for example, to heat, the position of the first end surface 615 in the +Z direction tends to move.

In contrast, according to the configuration described above, even when the light guide 61 expands or contracts, extension or contraction of the urging member 73 can reduce the amount of movement of the first end surface 615 in the +Z direction. Breakage of the portion where the light guide 61 and the angle converter 63 are bonded to each other can therefore be suppressed, so that separation of the angle converter 63 from the light guide 61 can be effectively suppressed.

In the light source apparatus 3A, the base 71 and the first cover member 74 are each capable of heat dissipation.

According to the configuration described above, the heat transferred from the light guide 61 and the angle converter 63 can be readily dissipated by the base 71 and the first cover member 74 out of the light source apparatus 3A. The light source apparatus 3A can therefore readily output light in a stable manner.

In the light source apparatus 3A, the area of the cross section of the light guide 61 that is perpendicular to the +Z direction is greater than or equal to 0.25 mm$^2$ but smaller than or equal to 4.00 mm$^2$.

Since the angle converter 63 is bonded to the first end surface 615, a small cross-sectional area of the light guide 61 tends to cause the angle converter 63 to be separate from the light guide 61.

In contrast, since the second accommodating section 712 and the first cover member 74, which form the accommodating space SP, which accommodates the accommodated section 6AP, are unlikely to come into contact with the angle converter 63, the separation of the angle converter 3 from the thin light guide 61 can be effectively suppressed.

In the light source apparatus 3A, the light source 52 outputs the excitation light EL. The light guide 61 converts the wavelength of the incident excitation light EL and outputs the resultant fluorescence YL.

According to the configuration described above, the light guide 61 can convert the wavelength of the excitation light EL output from the light source 52 and output the fluorescence YL. Since the light guide 61 extends in the +Z direction, the optical path along which the incident excitation light EL travels inside the light guide 61 can be prolonged. The efficiency at which the light guide 61 converts the excitation light EL into the fluorescence YL can therefore be increased.

The light source apparatus 3A instead includes the substrate 51, the light guide 61, the angle converter 63, the holder 65, the base 71, and the first cover member 74.

The light guide 61 has the side surfaces 611 to 614 extending in the +Z direction, and the first end surface 615, which intersects with the side surfaces 611 to 614. The +Z direction corresponds to the first direction.

The angle converter 63 is bonded to the first end surface 615. The angle converter 63 converts the angle of the light output via the first end surface 615.

The holder 65 includes the holding sections 661 and 671, which hold the side surfaces 611 to 614, and the fixed sections 662 and 672, which are fixed to the angle converter 63. The holder 65 is disposed so as to extend over the portion where the light guide 61 and the angle converter 63 are bonded to each other.

The light guide 61 is disposed at the base 71.

The light source 52, which outputs light toward the first side surface 611, is mounted on the substrate 51. The substrate 51 is disposed at the side opposite the base 71 with the light guide 61 therebetween, and is fixed to the base 71.

The first cover member 74 has the inner surfaces 742 to 744, which form, along with the base 71, the accommodating space SP, which accommodates the accommodated section 6AP, which is the portion from the angle converter 63 to the end portion of the light guide 61 that faces the angle converter 63 including the holder 65. The first cover member 74 is disposed at the side opposite the base 71 with the angle converter 63 therebetween, and fixed to the base 71. Note that the inner surfaces 742 to 744 correspond to the first inner surface.

The base 71 includes the first accommodating section 711 and the second accommodating section 712.

The light guide 61 is fixed to the first accommodating section 711 in the state in which the first side surface 611 is exposed.

The second accommodating section 712 has the inner surfaces 7121 to 7124, which along with the first cover member 74 form the accommodating space SP. The inner surfaces 7121 to 7124 correspond to the second inner surface. The second accommodating section 712 along with the first cover member 74 accommodates the accommodated section 6AP in the accommodating space SP.

The portion of the light guide 61 that is fixed to the first accommodating section 711 is a fixed end.

A portion of the light guide 61 that has the first end surface 615, to which the angle converter 63 is bonded, and faces the angle converter 63, is a free end.

The holder 65 is in contact with none of the inner surfaces 7121 to 7124 and 742 to 744.

According to the configuration described above, the portion where the light guide 61 and the angle converter 63 are bonded to each other can be protected by the holder 65, as described above. Therefore, even when an external force acts on the angle converter 63, separation of the angle converter 63 from the light guide 61 can be suppressed.

In addition, the accommodated section 6AP including the holder 65 is accommodated in the accommodating space SP formed by the second accommodating section 712 and the first cover member 74. No external force thus acts on the circumferential surface of the holder 65 around the optical axis Ax of the angle converter 63.

Furthermore, a portion of the light guide 61 that faces the angle converter 63 is a free end of the light guide, and the holder 65 is in contact with none of the inner surfaces 7121 to 7124 and 742 to 744, which form the accommodating space. Therefore, when the light guide 61 expands or contracts or when the projector 1 falls or is otherwise displaced so that an external force acts on the holder 65, and even when the holder 65 therefore moves or swings in the accommodating space SP, the holder 65 comes into contact with none of the inner surfaces 7121 to 7124 and 742 to 744. The situation in which the holder 65, for example, comes into contact with the second accommodating section 712 and the first cover member 74 and an external force therefore acts on the holder 65 can thus be suppressed, so that separation of the angle converter 63 from the light guide 61 can be suppressed.

The light source apparatus 3A can therefore output light in a stable manner.

The light source apparatus 3A instead includes the substrate 51, the light source 52, the light outputting member 6A, the base 71, and the first cover member 74.

The light outputting member 6A extends in the +Z direction and outputs light in the +Z direction. The +Z direction corresponds to the first direction.

The light outputting member 6A is disposed at the base 71.

The light source 52 outputs light to be incident on the light outputting member 6A along the −Y direction, which intersects with the +Z direction. The −Y direction corresponds to a second direction.

The light source 52 is mounted on the substrate 51. The substrate 51 is disposed at the side opposite the base 71 with the light outputting member 6A interposed therebetween in the −Y direction, and covers a portion of the light outputting member 6A that faces the negative end in the Z direction.

The first cover member 74 is disposed at the side opposite the base 71 with the light outputting member 6A therebetween.

The light outputting member 6A includes the light guide 61, the angle converter 63, and the holder 65.

The light guide 61 has the side surfaces 611 to 614 extending in the +Z direction, including the first side surface 611, on which the light output from the light source 52 is incident, and the first end surface 615, which faces the positive end in the Z direction and intersects with the side surfaces 611 to 614. The first end surface 615 corresponds to an end surface.

The angle converter 63 is bonded to the first end surface 615 and converts the angle of the light output via the first end surface 615.

The holder 65 includes the holding sections 661 and 671, which hold the side surfaces 611 to 614, and the fixed sections 662 and 672, which are fixed to the angle converter 63. The holder 65 is disposed so as to extend over the portion where the light guide 61 and the angle converter 63 are bonded to each other.

The base 71 includes the first accommodating section 711 and the second accommodating section 712.

The light guide 61 is fixed to the first accommodating section 711 in the state in which the first side surface 611 is exposed.

The second accommodating section 712 is provided at a position shifted in the +Z direction from the first accommodating section 711. The second accommodating section 712, along with the first cover member 74, forms the accommodating space SP, which accommodates the accommodated section 6AP, which is a portion of the light outputting member 6A that is from the angle converter 63 to the portion of the light guide 61 that faces the positive end in the Z direction including the holder 65.

The accommodated section 6AP is not in contact with the inner surfaces of the accommodating space SP.

According to the configuration described above, separation of the angle converter 63 from the light guide 61 can be suppressed, so that the light source apparatus 3A can output light in a stable manner, as described above.

Second Embodiment

A second embodiment of the present disclosure will next be described.

A projector according to the present embodiment is configured in the same manner as the projector 1 according to the first embodiment, but differs therefrom in that the holder that constitutes the light outputting member of the light apparatus includes fins. In the following description, portions that are the same or substantially the same as the portions having been already described have the same reference characters and will not be described.

Schematic Configurations of Projector and Light Source Apparatus

Figure 24:
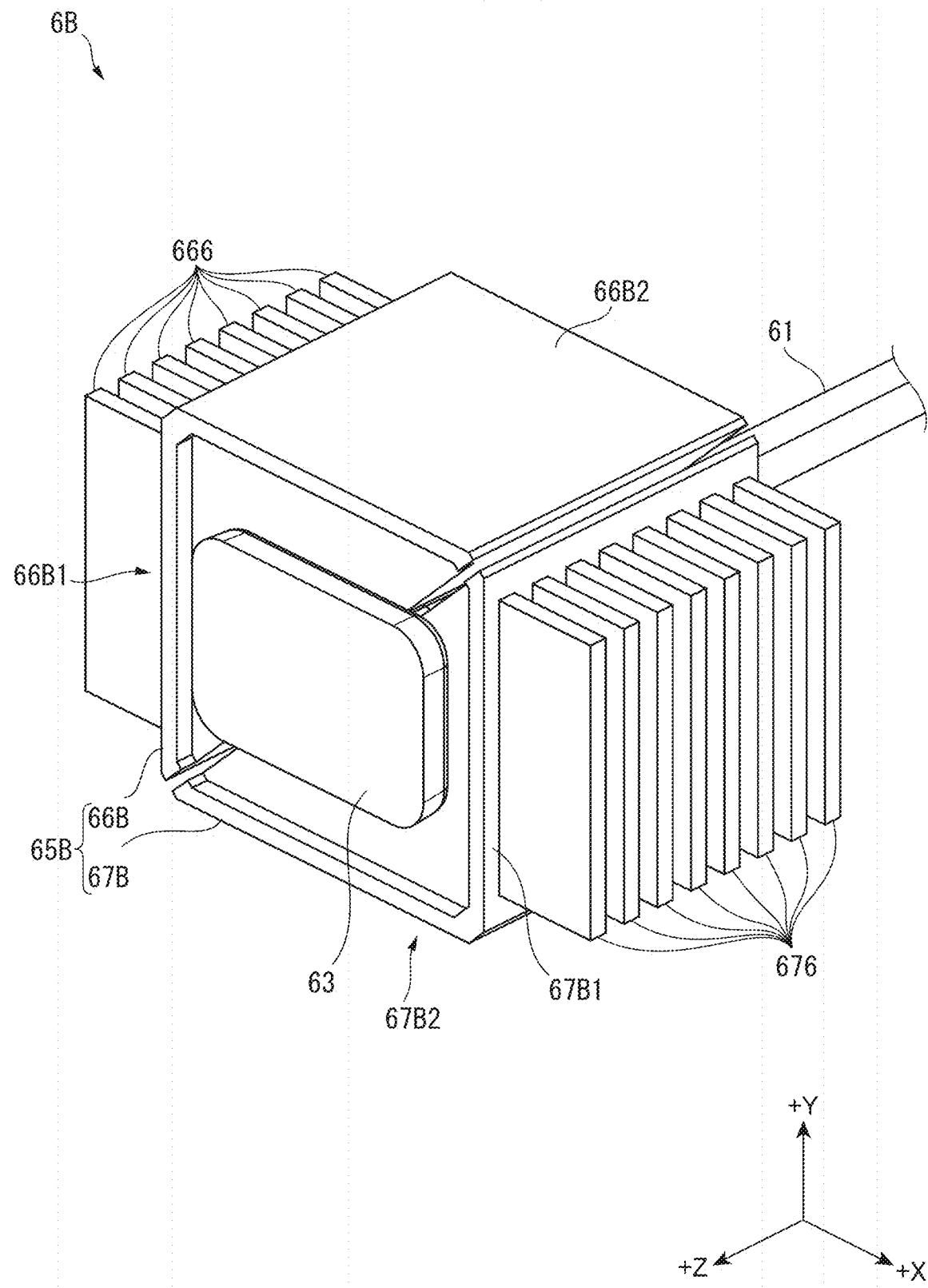
FIG. 24 is a perspective view showing a portion of a light outputting member that constitutes a light source apparatus provided in a projector according to a second embodiment.

FIG. 24 is a perspective view showing a portion of a light outputting member 6B, which constitutes the light source apparatus 3A provided in the projector according to the present embodiment.

The projector according to the present embodiment has configurations and functions that are the same as those of the projector 1 according to the first embodiment except that the light outputting member 6A is replaced with the light outputting member 6B, a portion of which is shown in FIG. 24. That is, the light source apparatus 3A according to the present embodiment includes the light outputting member 6B in place of the light outputting member 6A.

Configuration of Light Outputting Member

The light outputting member 6B has configurations and functions that are the same as those of the light outputting member 6A according to the first embodiment except that the holder 65 is replaced with a holder 65B.

The holder 65B includes a first holding member 66B and a second holding member 67B, and the holding members 66B and 67B are bonded to each other with the adhesive 68, as in the holder 65.

The first holding member 66B has configurations and functions that are the same as those of the first holding member 66 except that multiple fins 666 are further provided.

In the first holding member 66B, the multiple fins 666 protrude in the −X direction from an outer surface 66B1, which faces the negative end in the X direction, and are arranged along the Z-axis. Note that the multiple fins 666 may be arranged along the Y-axis. In the first holding member 66B, the multiple fins 666 may protrude in the +Y direction from an outer surface 66B2, which faces the positive end in the Y direction, or may be provided at each of the outer surface 66B1 and the outer surface 66B2.

The second holding member 67B has configurations and functions that are the same as those of the second holding member 67 except that multiple fins 676 are further provided.

In the second holding member 67B, the multiple fins 676 protrude in the +X direction from an outer surface 67B1, which faces the positive end in the X direction, and are arranged along the Z-axis. Note that the multiple fins 676 may be arranged along the Y-axis. In the second holding member 67B, the multiple fins 676 may protrude in the −Y direction from an outer surface 67B2, which faces the negative end in the Y direction, or may be provided at each of the outer surface 67B1 and the outer surface 67B2.

Advantages of Second Embodiment

The projector according to the present embodiment described above provides the advantages below as well as the same advantages provided by the projector 1 according to the first embodiment.

In the light source apparatus 3A according to the present embodiment, the holder 65B includes the multiple fins 666 and 676.

According to the configuration described above, the heat transferred from the light guide 61 and the angle converter 63 can be readily dissipated out of the holder 65B. An increase in temperature of each of the light guide 61 and the angle converter 63 can therefore be suppressed.

Third Embodiment

A third embodiment of the present disclosure will next be described.

A projector according to the present embodiment is configured in the same manner as the projector 1 according to the first embodiment, but differs therefrom in terms of the configuration that links the first and second holding members of the holder to each other. In the following description, portions that are the same or substantially the same as the portions having been already described have the same reference characters and will not be described.

Schematic Configurations of Projector and Light Source Apparatus

Figure 25:
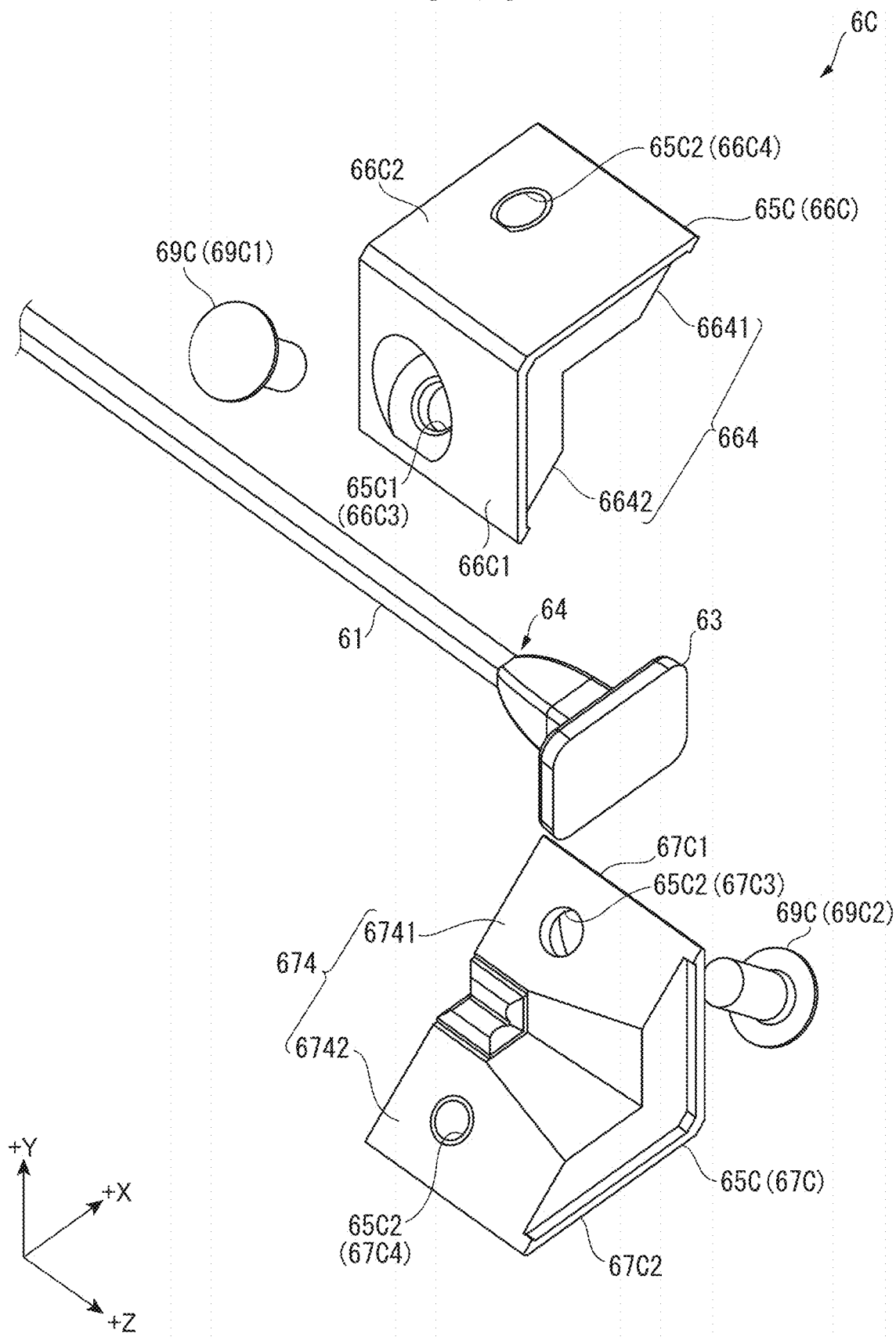
FIG. 25 is an exploded perspective view showing a portion of a light outputting member that constitutes a light source apparatus provided in a projector according to a third embodiment.

FIG. 25 is an exploded perspective view showing a portion of a light outputting member 6C, which constitutes the light source apparatus 3A provided in the projector according to the present embodiment.

The projector according to the present embodiment has configurations and functions that are the same as those of the projector 1 according to the first embodiment except that the light outputting member 6A is replaced with the light outputting member 6C, a portion of which is shown in FIG. 25. That is, the light source apparatus 3A according to the present embodiment includes the light outputting member 6C in place of the light outputting member 6A.

Configuration of Light Outputting Member

The light outputting member 6C has configurations and functions that are the same as those of the light outputting member 6A according to the first embodiment except that the holder 65 is replaced with a holder 65C and a fixture 69C.

The holder 65C includes a first holding member 66C and a second holding member 67C, as the holder 65, and the holding members 66C and 67C are linked to each other by the fixture 69C. The holder 65C includes a first linkage section 65C1 and a second linkage section 65C2 in place of the first linkage section 651 and the second linkage section 652 each configured with the adhesive 68.

The first holding member 66C has configurations and functions that are the same as those of the first holding member 66 except that the first holding member 66C has an insertion hole 66C3, which opens through an outer surface 66C1 facing the negative end in the X direction, and a locking section 66C4 provided at an outer surface 66C2 facing the positive end in the Y direction. Note that the first holding member 66C may include the multiple fins 666.

The insertion hole 66C3 opens through the outer surface 66C1 and the second linkage region 6642. The fixture 69C is inserted through the insertion hole 66C3. The insertion hole constitutes the first linkage section 65C1.

The locking section 66C4 opens through the outer surface 66C2 and the first linkage region 6641. The locking section 66C4 locks the fixture 69C inserted through an insertion hole 67C3, which will be described later. In the present embodiment, the locking section 66C4 is a threaded hole and constitutes the second linkage section 65C2.

The second holding member 67C has configurations and functions that are the same as those of the second holding member 67 except that the second holding member 67C has the insertion hole 67C3, which opens through an outer surface 67C1 facing the positive end in the X direction, and a locking section 67C4 provided at an outer surface 67C2 facing the negative end in the Y direction. Note that the second holding member 67C may include the multiple fins 676.

The insertion hole 67C3 opens through the outer surface 67C1 and the third linkage region 6741. The fixture 69C is inserted through the insertion hole 67C3. The insertion hole 67C3 constitutes the second linkage section 65C2. When the first holding member 66C and the second holding member 67C are combined with each other, the center axis of the insertion hole 67C3 and the center axis of the locking section 66C4 substantially coincide with each other.

The locking section 67C4 opens through the outer surface 66C2 and the fourth linkage region 6742. The locking section 67C4 locks the fixture 69C inserted through the insertion hole 66C3. In the present embodiment, the locking section 67C4 is a threaded hole and constitutes the first linkage section 65C1. When the first holding member 66C and the second holding member 67C are combined with each other, the center axis of the locking section 67C4 and the center axis of the insertion hole 66C3 substantially coincide with each other.

The fixture 69C is configured with two screws 69C1 and 69C2.

Figure 26:
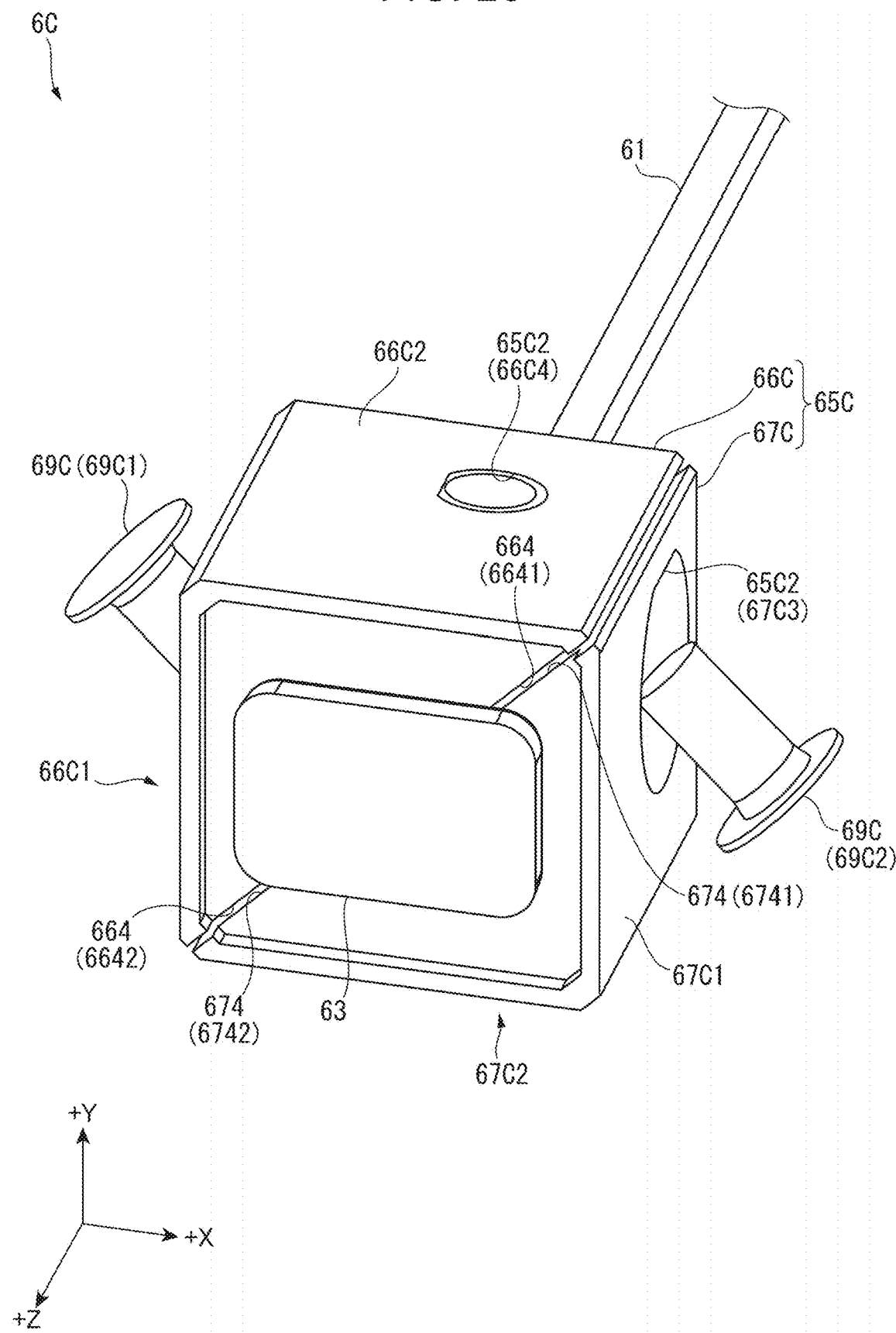
FIG. 26 is a perspective view showing a holder according to a third embodiment.

FIG. 26 is a perspective view showing the holder 65C, which is the combination of the first holding member 66C and the second holding member 67C.

When the first holding member 66C and the second holding member 67C are linked to each other, in a state in which the first linkage region 6641 and the third linkage region 6741 are in contact with each other and the second linkage region 6642 and the fourth linkage region 6742 are in contact with each other, the screw 69C1 is inserted into the insertion hole 66C3 of the first holding member 66C from the side facing the outer surface 66C1 so as to advance in the −Y direction as advancing in the +X direction, and a front end portion of the screw 69C1 is then locked by the locking section 67C4 of the second holding member 67C, as shown in FIG. 26. Similarly, the screw 69C2 is inserted into the insertion hole 67C3 of the second holding member 67C from the side facing the outer surface 67C1 so as to advance in the +Y direction as advancing in the −X direction, and a front end portion of the screw 69C2 is then locked by the locking section 66C4 of the first holding member 66C. The first holding member 66C and the second holding member 67C are thus linked to each other, so that the holder 65C holds the light guide 61.

Advantages of Third Embodiment

The projector according to the present embodiment described above provides the advantages below as well as the same advantages provided by the projector 1 according to the first embodiment.

The light source apparatus 3A according to the present embodiment includes the fixture 69C, which fixes the first holding member 66C and the second holding member 67C to each other. The holder 65C includes the first linkage section 65C1 and the second linkage section 65C2. The first linkage section 65C1 and the second linkage section 65C2 correspond to a linkage section.

The first linkage section 65C1 has the insertion hole 66C3 and the locking section 67C4.

The insertion hole 66C3 is provided in the first holding member 66C out of the first holding member 66C and the second holding member 67C. The screw 69C1, which constitutes the fixture 69C, is inserted through t the insertion hole 66C3.

The locking section 67C4 is provided in the second holding member 67C out of the first holding member 66C and the second holding member 67C. The locking section 67C4 locks the screw 69C1 inserted into the insertion hole 66C3.

The second linkage section 65C2 has the insertion hole 67C3 and the locking section 66C4.

The insertion hole 67C3 is provided in the second holding member 67C out of the first holding member 66C and the second holding member 67C. The screw 69C2, which constitutes the fixture 69C, is inserted through the insertion hole 67C3.

The locking section 66C4 is provided in the first holding member 66C out of the first holding member 66C and the second holding member 67C. The locking section 66C4 locks the screw 69C2 inserted through the insertion hole 67C3.

According to the configuration described above, the first holding member 66C and the second holding member 67C can be firmly and readily fixed to each other. The light guide 61 and the angle converter 63 can be firmly and readily fixed to each other by the holder 65C, so that separation of the angle converter 63 from the light guide 61 can be effectively suppressed.

Fourth Embodiment

A fourth embodiment of the present disclosure will next be described.

A projector according to the present embodiment is configured in the same manner as the projector 1 according to the first embodiment, but differs therefrom in terms of the configuration that links the first and second holding members of the holder to each other. In the following description, portions that are the same or substantially the same as the portions having been already described have the same reference characters and will not be described.

Schematic Configurations of Projector and Light Source Apparatus

Figure 27:
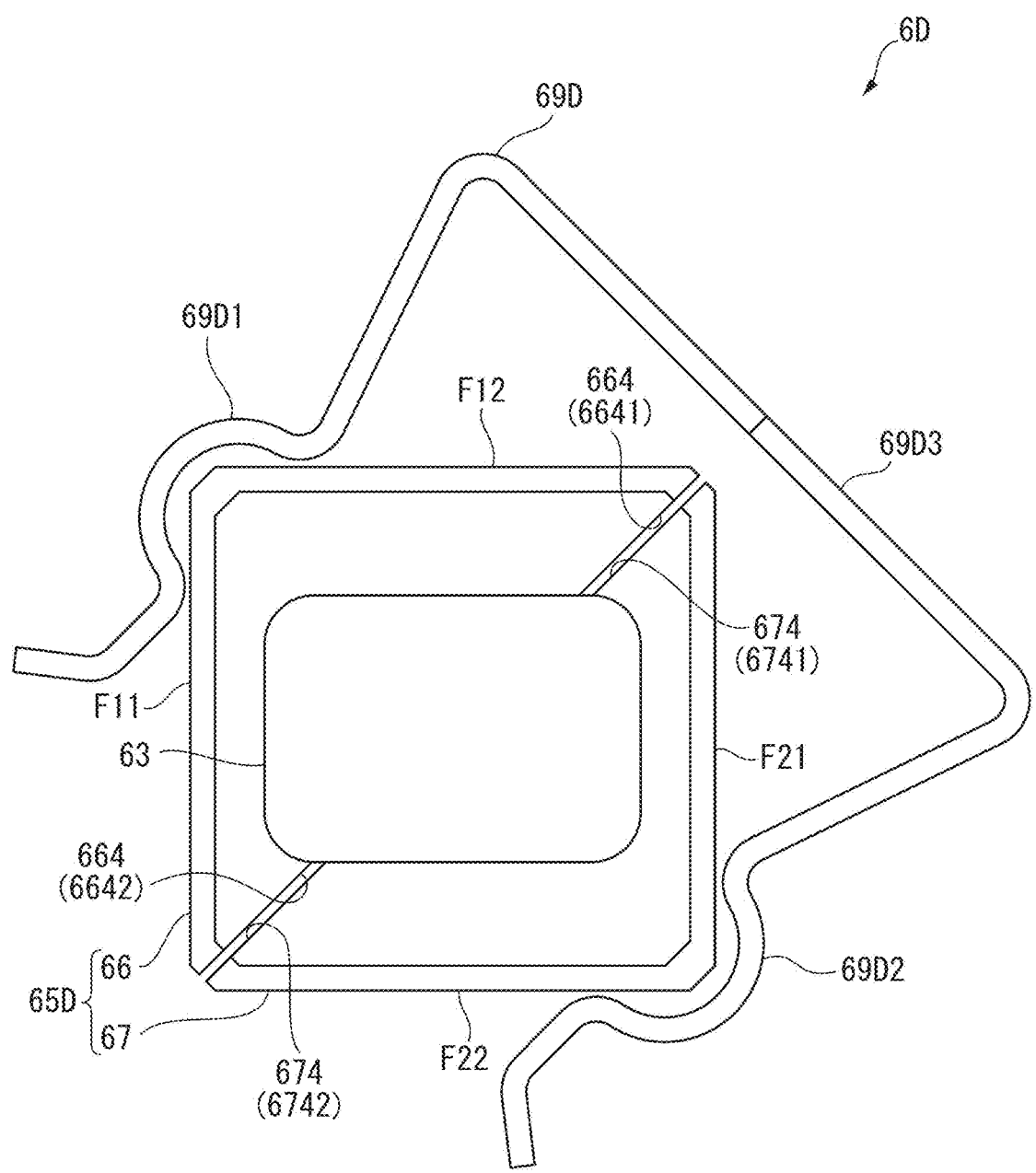
FIG. 27 shows a light outputting member that constitutes a light source apparatus provided in a projector according to a fourth embodiment.

FIG. 27 shows a light outputting member 6D, which constitutes the light source apparatus 3A provided in the projector according to the present embodiment, the light outputting member 6D viewed in the +Z direction.

The projector according to the present embodiment has configurations and functions that are the same as those of the projector 1 according to the first embodiment except that the light outputting member 6A is replaced with the light outputting member 6D shown in FIG. 27. That is, the light source apparatus 3A according to the present embodiment includes the light outputting member 6D in place of the light outputting member 6A.

Configuration of Light Outputting Member

The light outputting member 6D has configurations and functions that are the same as those of the light outputting member 6A according to the first embodiment except that the holder 65 is replaced with a holder 65D and a fixture 69D.

The holder 65D includes the first holding member 66 and the second holding member 67, as the holder 65. Note that the holder 65D may or may not include the first linkage section 651 and the second linkage section 652 each configured with the adhesive 68 provided between the first linkage surface 664 and the second linkage surface 674.

The fixture 69D is an elastic member that sandwiches the holder 65D and fixes the holder 65D to the light guide 61. In detail, the fixture 69D is a plate spring. The fixture 69D includes a first pressing element 69D1, a second pressing element 69D2, and a coupling element 69D3.

The first pressing element 69D1 is in contact with an outer surface F11 of the first holding member 66, which faces the negative end in the X direction, and an outer surface F12 of the first holding member 66, which faces the positive end in the Y direction, and presses the first holding member 66 in the direction toward the second holding member 67.

The second pressing element 69D2 is in contact with an outer surface F21 of the second holding member 67, which faces the positive end in the X direction, and an outer surface F22 of the second holding member 67, which faces the negative end in the Y direction, and presses the second holding member 67 in the direction toward the first holding member 66.

The coupling element 69D3 couples the first pressing element 69D1 and the second pressing element 69D2 to each other.

The thus configured fixture 69D presses the first holding member 66 and the second holding member 67 in directions in which the two holding members approach each other, so that the state in which the first holding member 66 and the second holding member 67 are linked to each other is maintained.

Advantages of Fourth Embodiment

The projector according to the present embodiment described above provides the advantages below as well as the same advantages provided by the projector 1 according to the first embodiment.

The light source apparatus 3A according to the present embodiment includes the fixture 69D, which sandwiches the holder 65D and fixes the holder 65D to the light guide 61.

The holder 65D includes the first holding member 66 and the second holding member 67. The first holding member 66 includes the first holding section 661, the first fixed section 662, and the first linkage surface 664. The second holding member 67 includes the second holding section 671, the second fixed section 672, and the second linkage surface 674.

The fixture 69D, which is an elastic member, includes the first pressing element 69D1, the second pressing element 69D2, and the coupling element 69D3.

The first pressing element 69D1 presses the first holding member 66 in the direction toward the second holding member 67. The second pressing element 69D2 presses the second holding member 67 in the direction toward the first holding member 66. The coupling element 69D3 couples the first pressing element 69D1 and the second pressing element 69D2 to each other.

According to the configuration described above, the fixture 69D can be readily attached to the holder 65D, and can readily sandwich the first holding member 66 and the second holding member 67. The holder 65D can therefore be readily attached to the light guide 61 and the angle converter 63, so that separation of the angle converter 63 from the light guide 61 can be readily suppressed.

Note that the first pressing element 69D1 may sandwich the outer surface F12 of the first holding member 66 and the outer surface F21 of the second holding member 67 to press the first holding member 66 and the second holding member 67 in the directions in which the two holding members approach each other.

Instead, the second pressing element 69D2 may sandwich the outer surface F11 of the first holding member 66 and the outer surface F22 of the second holding member 67 to press the first holding member 66 and the second holding member 67 in the directions in which the two holding members approach each other.

Fifth Embodiment

A fifth embodiment of the present disclosure will next be described.

A projector according to the present embodiment is configured in the same manner as the projector 1 according to the first embodiment, but differs therefrom in the state in which the holder and the light guide are in contact with each other. In the following description, portions that are the same or substantially the same as the portions having been already described have the same reference characters and will not be described.

Schematic Configurations of Projector and Light Source Apparatus

Figure 28:
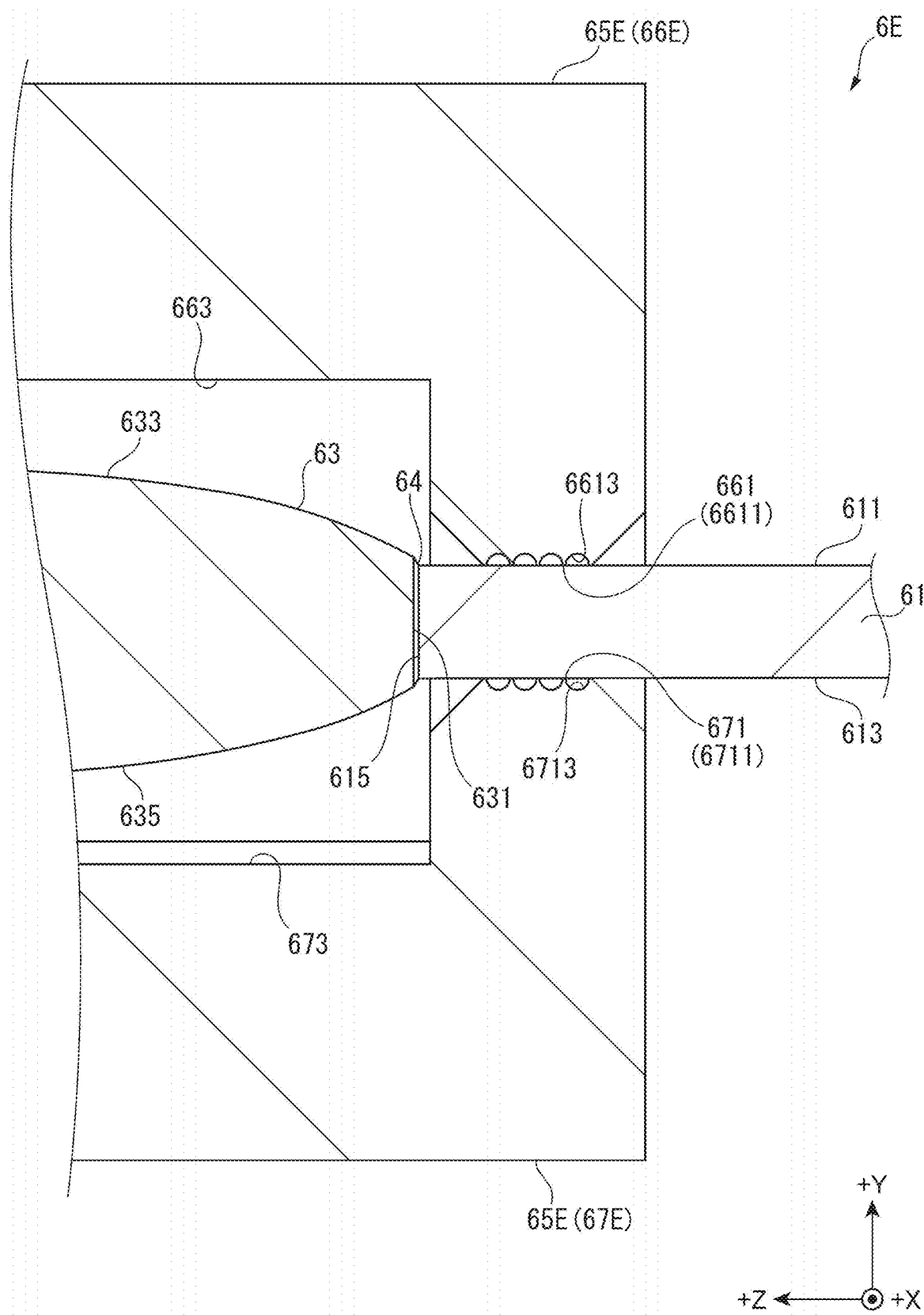
FIG. 28 is a cross-sectional view showing a light outputting member that constitutes a light source apparatus provided in a projector according to a fifth embodiment.

FIG. 28 is a partial enlarged cross-sectional view showing a light outputting member 6E taken along the YZ plane, which constitutes the light source apparatus 3A provided in the projector according to the present embodiment.

The projector according to the present embodiment has configurations and functions that are the same as those of the projector 1 according to the first embodiment except that the light outputting member 6A is replaced with the light outputting member 6E, a portion of which is shown in FIG. 28. That is, the light source apparatus 3A according to the present embodiment includes the light outputting member 6E in place of the light outputting member 6A.

Configuration of Light Outputting Member

The light outputting member 6E has configurations and functions that are the same as those of the light outputting member 6A according to the first embodiment except that the holder 65 is replaced with a holder 65E. The holder 65E includes a first holding member 66E and a second holding member 67E.

The first holding member 66E has configurations and functions that are the same as those of any of the first holding members 66, 66B, and 66C according to the first, second, and third embodiments.

Multiple recesses 6613 are provided in the first contact section 6611 of the first holding section 661 of the first holding member 66E. The first contact section 6611 is therefore in point contact with the first side surface 611 of the light guide 61 at multiple locations along the +Z direction on the first contact section 6611.

Although not shown, the same multiple recesses 6613 are provided also in the second contact section 6612 of the first holding section 661 of the first holding member 66E. The second contact section 6612 is therefore in point contact with the second side surface 612 of the light guide 61 at multiple locations along the +Z direction on the second contact section 6612.

The second holding member 67E has configurations and functions that are the same as those of any of the second holding members 67, 67B, and 67C according to the first, second, and third embodiments.

Multiple recesses 6713 are provided in the third contact section 6711 of the second holding section 671 of the second holding member 67E. The third contact section 6711 is therefore in point contact with the third side surface 613 of the light guide 61 at multiple locations along the +Z direction on the third contact section 6711.

Although not shown, the same multiple recesses 6713 are also provided in the fourth contact section 6712 of the second holding section 671 of the second holding member 67E. The fourth contact section 6712 is therefore in point contact with the fourth side surface 614 of the light guide 61 at multiple locations along the +Z direction on the fourth contact section 6712.

Advantages of Fifth Embodiment

The projector according to the present embodiment described above provides the advantages below as well as the same advantages provided by the projector 1 according to the first embodiment.

In the light source apparatus 3A according to the present embodiment, the contact of at least one of the first holding section 661 and the second holding section 671 with the light guide 61 is point contact at multiple locations along the +Z direction. In the present embodiment, the contact between the first contact section 6611 of the first holding section 661 and the first side surface 611 of the light guide 61 and the contact between the second contact section 6612 of the first holding section 661 and the second side surface 612 of the light guide 61 are each point contact at multiple locations along the +Z direction. Similarly, the contact between the third contact section 6711 of the second holding section 671 and the third side surface 613 of the light guide 61 and the contact between the fourth contact section 6712 of the second holding section 671 and the fourth side surface 614 of the light guide 61 are each point contact at multiple locations along the +Z direction.

The critical angle for the light traveling inside the light guide 61 and internally reflected at a portion where another member is in contact with the side surface of the light guide 61 tends to be smaller than the critical angle at a portion in contact with the air, so that the light tends to leak out of the light guide 61.

In contrast, the configuration described above can reduce the area where the first holding section 661 and the second holding section 671 are each in contact with the light guide 61. The light leakage from the portions where the light guide 61 is in contact with the first holding section 661 and the second holding section 671 can be suppressed.

Sixth Embodiment

A sixth embodiment of the present disclosure will next be described.

A projector according to the present embodiment is configured in the same manner as the projector 1 according to the first embodiment, but differs therefrom in that the light outputting member, which constitutes the light source apparatus, includes no holder. In the following description, portions that are the same or substantially the same as the portions having been already described have the same reference characters and will not be described.

Schematic Configurations of Projector and Light Source Apparatus

Figure 29:
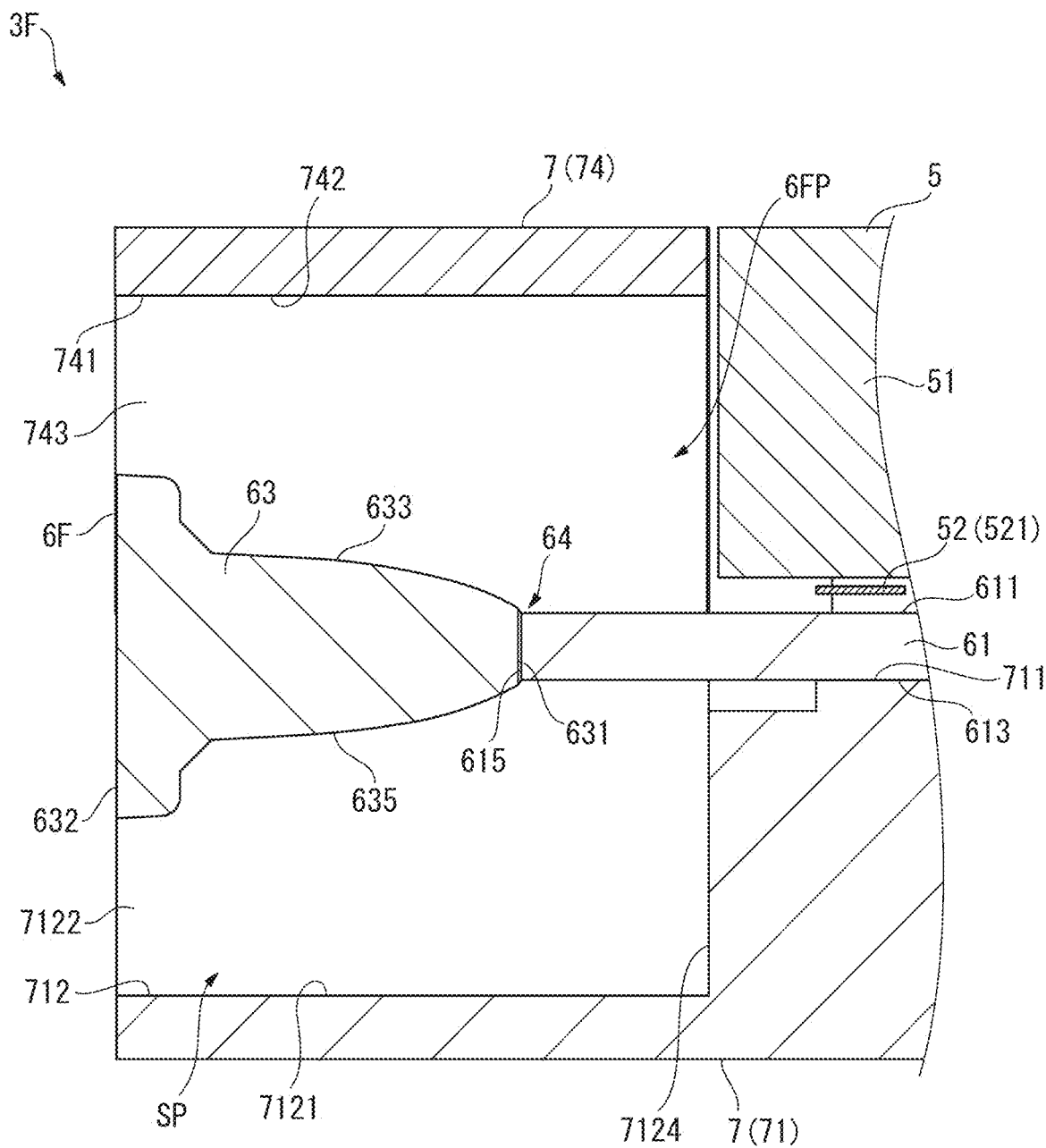
FIG. 29 is a cross-sectional view showing a light source apparatus provided in a projector according to a sixth embodiment.

FIG. 29 is a partial cross-sectional view showing a light source apparatus 3F provided in the projector according to the present embodiment taken along the YZ plane.

The projector according to the present embodiment has configurations and functions that are the same as those of the projector 1 according to the first embodiment except that the light source apparatus 3A is replaced with the light source apparatus 3F shown in FIG. 29.

The light source apparatus 3F has configurations and functions that are the same as those of the light source apparatus 3A according to the first embodiment except that the light outputting member 6A is replaced with a light outputting member 6F. That is, the light source apparatus 3F includes the light source section 5, the light outputting member 6F, and the housing 7.

Configuration of Light Outputting Member

The light outputting member 6F has configurations and functions that are the same as those of the light outputting member 6A according to the first embodiment except that the holder 65 is not provided. That is, the light outputting member 6F includes the light guide 61, the reflector 62, the angle converter 63, and the adhesive 64. A portion of the light guide 61 that has the first end surface 615 and faces the angle converter 63, the angle converter 63, and the adhesive 64 constitute an accommodated section 6FP, which is accommodated in the accommodating space SP formed by the second accommodating section 712 of the base 71 and the first cover member 74. Note that the accommodated section 6FP is a free end of the light outputting member 6F.

Although not shown in detail, gaps are provided between the accommodated section 6FP and the inner surfaces 7121 to 7124 of the second accommodating section 712, which constitute the accommodating space SP. Gaps are also provided between the accommodated section 6FP and the inner surfaces 742 to 744 of the accommodating recessed section 741, which constitute the accommodating space SP. That is, the accommodated section 6FP is not in contact with the inner surfaces of the accommodating space SP configured with the second accommodating section 712 and the accommodating recessed section 741.

Therefore, when the light guide 61 expands or contracts, or when an impact acts on the light source apparatus 3F along the X-axis or the Y-axis, a situation in which the accommodated section 6FP comes into contact with any of the inner surfaces of the accommodating space SP and the angle converter 63 is caused to separate from the light guide 61 is avoided.

Advantages of Sixth Embodiment

The projector according to the present embodiment described above provides the same advantages provided by the projector 1 according to the first embodiment.

That is, the light source apparatus 3F includes the substrate 51, the light guide 61, the angle converter 63, the base 71, and the first cover member 74.

The light guide 61 has the side surfaces 611 to 614 extending in the +Z direction, and the first end surface 615, which intersects with the side surfaces 611 to 614. The +Z direction corresponds to the first direction.

The angle converter 63 is bonded to the first end surface 615. The angle converter 63 converts the angle of the light output via the first end surface 615.

The light guide 61 is disposed at the base.

The light source 52, which outputs light toward the first side surface 611, is mounted on the substrate 51. The substrate 51 is disposed at the side opposite the base 71 with the light guide 61 therebetween, and is fixed to the base 71.

The first cover member 74 has the inner surfaces 742 to 744, which along with the base 71 form the accommodating space SP, which accommodates the accommodated section 6FP, which is the portion from the angle converter 63 to the end portion of the light guide 61 that faces the angle converter 63. The inner surfaces 742 to 744 correspond to the first inner surface. The first cover member 74 is disposed at the side opposite the base 71 with the angle converter 63 therebetween, and fixed to the base 71.

The base 71 includes the first accommodating section 711 and the second accommodating section 712.

The light guide 61 is fixed to the first accommodating section 711 in the state in which the first side surface 611 is exposed.

The second accommodating section 712 has the inner surfaces 7121 to 7124, which along with the first cover member 74 form the accommodating space SP. The inner surfaces 7121 to 7124 correspond to the second inner surface. The second accommodating section 712 along with the first cover member 74 accommodates the accommodated section 6FP in the accommodating space SP.

The portion of the light guide 61 that is fixed to the first accommodating section 711 is a fixed end.

A portion of the light guide 61 that has the first end surface 615, to which the angle converter 63 is bonded, and faces the angle converter 63, is a free end.

Since the angle converter 63 described above is in contact with none of the inner surfaces 7121 to 7124 and 742 to 744, the angle converter 63, which is further separate from the inner surfaces 7121 to 7124 and 742 to 744, is in contact with none of the inner surfaces 7121 to 7124 and 742 to 744.

According to the configuration described above, no external force acts on the circumferential surface of the angle converter 63 around the optical axis Ax of the angle converter 63, as described above.

In addition, the portion of the light guide 61 that faces the angle converter 63 is a free end of the light guide 61, and the angle converter 63 is in contact with none of the inner surfaces 7121 to 7124 and 742 to 744. Therefore, when the light guide 61 expands or contracts or when the projector 1 falls or is otherwise displaced so that an external force acts on the angle converter 63, and even when the angle converter 63 therefore moves or swings in the accommodating space SP, the angle converter 63 comes into contact with none of the inner surfaces 7121 to 7124 and 742 to 744. The configuration described above can suppress the situation in which the angle converter 63, for example, comes into contact with the second accommodating section 712 and the first cover member 74 and an external force therefore acts on the angle converter 63 to separate the angle converter 63 from the light guide 61. The light source apparatus 3A can therefore output light in a stable manner.

The light source apparatus 3F instead includes the substrate 51, the light source 52, the light outputting member 6F, the base 71, and the first cover member 74.

The light outputting member 6F extends in the +Z direction and outputs light in the +Z direction. The +Z direction corresponds to the first direction.

The light outputting member 6F is disposed at the base 71.

The light source 52 outputs light to be incident on the light outputting member 6F along the −Y direction, which intersects with the +Z direction. The −Y direction corresponds to the second direction.

The light source 52 is mounted on the substrate 51. The substrate 51 is disposed at the side opposite the base 71 with the light outputting member 6F interposed therebetween in the −Y direction, and covers a portion of the light outputting member 6F that is opposite the negative end in the Y direction. That is, the substrate 51 covers a portion of the light outputting member 6F that faces the positive end in the Y direction.

The first cover member 74 corresponds to the cover member. The first cover member 74 is disposed at the side opposite the base 71 with the light outputting member 6F therebetween.

The light outputting member 6F includes the light guide 61 and the angle converter 63.

The light guide 61 has the first side surface 611, which extends in the +Z direction and on which the light output from the light source 52 is incident, and the first end surface 615, which faces the positive end in the Z direction and intersects with the first side surface 611. The first side surface 611 corresponds to a side surface, and the first end surface 615 corresponds to the end surface.

The angle converter 63 is bonded to the first end surface 615 and converts the angle of the light output via the first end surface 615.

The base 71 includes the first accommodating section 711 and the second accommodating section 712.

The light guide 61 is fixed to the first accommodating section 711 in the state in which the first side surface 611 is exposed.

The second accommodating section 712 is provided at a position shifted in the +Z direction from the first accommodating section 711. The second accommodating section 712, along with the first cover member 74, forms the accommodating space SP, which accommodates the accommodated section 6FP, which is the portion of the light outputting member 6F that is from the angle converter 63 to the portion of the light guide 61 that faces the positive end in the Z direction.

The accommodated section 6FP is not in contact with the inner surfaces of the accommodating space SP.

The configuration described above can suppress the situation in which the angle converter 63 comes into contact with any of the inner surfaces of the accommodating space SP and is caused to separate from the light guide 61, so that the light source apparatus 3F can output light in a stable manner.

Variations of Embodiments

The present disclosure is not limited to the embodiments described above, and variations, improvements, and other modifications thereof to the extent that the advantage of the present disclosure is achieved fall within the scope of the present disclosure.

It is assumed in the embodiments described above that the projector includes the three light modulators 27, but not necessarily. The present disclosure is also applicable to a projector including two or fewer or four or greater number of light modulators.

It is assumed in the embodiments described above that the light guide 61 is a wavelength converter containing a phosphor excited by the incident excitation light, but not necessarily. The light guide 61 may output the incident light without converting an optical characteristic of the incident light such as the wavelength. The light guide 61 may instead convert an optical characteristic of incident light other than the wavelength.

It is assumed in the embodiments described above that the holders 65, 65B, 65C, 65D, and 65E each include one of the first holding members 66, 66B, 66C, and 66E and one of the second holding members 67, 67B, 67C, and 67E, but not necessarily. The holder may be an integrated part. In this case, the light guide 61 to which the angle converter 63 is bonded may be inserted into the holder along the Z-axis to bring the holding sections 661 and 671 into contact with the side surfaces 611 to 614 of the light guide 61.

It is assumed in the embodiments described above that the holder 65 includes the adhesive relief sections 653 and 654, but not necessarily. The adhesive relief sections 653 and 654 may be omitted. The same holds for the other holders 65B, 65C, 65D, and 65E.

It is assumed in the embodiments described above that the area of the cross section of the light guide 61 that is perpendicular to the +Z direction is greater than or equal to 0.25 mm$^2$ but smaller than or equal to 4.00 mm$^2$, but not necessarily. The area of the cross section of the light guide 61 that is perpendicular to the +Z direction may be smaller than 0.25 mm$^2$ or may exceed 4.00 mm$^2$.

It is assumed in the embodiments described above that the light guide 61 has the side surfaces 611 to 614, which intersect with the first end surface 615 and the second end surface 616, and that the excitation light EL is incident on the first side surface 611, but not necessarily. When the first end surface 615 is the light exiting surface, any of the other side surfaces or the second end surface may include a light incident region on which the light is incident.

It is assumed in the embodiments described above that the base 71 and the first cover member 74 of the housing 7 are parts separate from each other, and the first cover member 74 is fixed to the base 71, but not necessarily. The housing 7 may include the base 71 with which the first cover member 74 is integrated.

It is assumed in the embodiments described above that the light modulators 27 include transmissive liquid crystal panels each having a light incident surface and a light exiting surface different from each other, but not necessarily. The light modulators may each include a reflective liquid crystal panel having a surface that serves both as the light incident surface and the light exiting surface. Furthermore, a light modulator using any element other than a liquid-crystal-based element, such as a device using micromirrors, for example, a digital micromirror device (DMD), may be employed as long as the element is capable of modulating an incident luminous flux to form an image according to image information.

The aforementioned embodiments have been described with reference to the case where a projector uses the light source apparatus 3A or 3F according to the present disclosure. Any of the light source apparatuses according to the present disclosure may instead be used for a lighting instrument, a headlight of an automobile, or the like.

SUMMARY OF THE PRESENT DISCLOSURE

The present disclosure will be summarized below as additional remarks.

Additional Remark 1

A light source apparatus including:
a light guide having a side surface extending in a first direction and a first end surface and a second end surface that intersect with the side surface and are located opposite each other;
an angle converter bonded to the first end surface and configured to convert an angle of light output via the first end surface;
a base at which the light guide is disposed;
a substrate on which a light source configured to output light toward the side surface is mounted, the substrate disposed at a side opposite the base with the light guide therebetween to cover the light guide, the substrate fixed to the base; and
a cover member fixed to the base and configured to accommodate along with the base the angle converter,
wherein the base includes
a first accommodating section configured to accommodate the light guide in a state in which the side surface is exposed, the light guide fixed to the first accommodating section, and
a second accommodating section configured to accommodate along with the cover member an accommodated section that is a portion from the angle converter to a portion of the light guide that faces the angle converter,
the second accommodating section and the cover member surround a circumference of the accommodated section and form an accommodating space configured to accommodate the accommodated section,
a portion of the light guide that is fixed to the first accommodating section is a fixed end, and
a portion of the light guide that has the first end surface, to which the angle converter is bonded, and faces the angle converter is a free end.

According to the configuration described above, the accommodating space formed by the second accommodating section and the cover member accommodates the accommodated section, which is the portion from the angle converter to the portion of the light guide that faces the angle converter. No external force thus does not act on the circumferential surface of the angle converter around the optical axis.

In addition, a portion of the light guide that faces the angle converter is a free end of the light guide. Therefore, even when the light guide expands or contracts, or the light source apparatus falls or is otherwise displaced so that an external force acts on the angle converter, the angle converter is allowed to move and swing in the accommodating space. That is, when the light guide is displaced by the expansion or contraction of the light guide or the effect of an external force, the angle converter can follow the displacement of the light guide. Separation of the angle converter from the light guide can therefore be suppressed. The light source apparatus can therefore output light in a stable manner.

Additional Remark 2

The light source apparatus according to the additional remark 1, wherein
the angle converter is bonded to the first end surface with an adhesive, and
the second accommodating section and the cover member, which form the accommodating space, allow movement of the angle converter along the first direction due to at least one of expansion and contraction of the adhesive.

According to the configuration described above, even when the adhesive expands or contracts due to heat to move the angle converter along the first direction, the second accommodating section and the cover member do not prevent the movement of the angle converter along the first direction. No load therefore does not act on the portion where the angle converter and the light guide are bonded to each other. Separation of the angle converter from the light guide can therefore be suppressed.

Additional Remark 3

The light source apparatus according to the additional remark 1 or 2, further including
a holder including a holding section configured to hold the side surface and a fixed section fixed to the angle converter, the holder extending over a portion where the light guide and the angle converter are bonded to each other,
wherein the holder is disposed in the accommodating space.

According to the configuration described above, the holder, which includes the holding section, which holds the side surface of the light guide, and the fixed section fixed to the angle converter, is disposed so as to extend over the portion where the light guide and the angle converter are bonded to each other, so that the portion where the light guide and the angle converter are bonded to each other can be protected. Therefore, even when an external force acts on the angle converter, separation of the angle converter from the light guide can be suppressed. The light source apparatus can therefore output light in a stable manner.

Additional Remark 4

The light source apparatus according to the additional remark 3, wherein
the cover member has a first inner surface configured to form the accommodating space,
the second accommodating section has a second inner surface configured to form the accommodating space, and
the holder is in contact with none of the first inner surface and the second inner surface.

The configuration described above can prevent the holder from colliding with the first and second inner surfaces not only when the holder moves along the first direction due to expansion or contraction of the adhesive caused by a change in temperature, but also when the holder swings in a direction that intersects with the first direction due to an external force acting on the light source apparatus. Therefore, breakage of the portion where the light guide and the angle converter are bonded to each other can be suppressed, and separation of the angle converter from the light guide can be effectively suppressed.

Additional Remark 5

The light source apparatus according to any one of the additional remarks 1 to 4, further including:
a reflector disposed at the second end surface and configured to reflect, toward the light guide, light output via the second end surface; and
an urging member fixed to the base and configured to urge the reflector against the second end surface.

When the second end surface is fixed, and the light guide expands or contracts due, for example, to heat, the position of the first end surface in the first direction tends to move.

In contrast, according to the configuration described above, even when the light guide expands or contracts, the extension or contraction of the urging member can reduce the amount of movement of the first end surface in the first direction. Therefore, breakage of the portion where the light guide and the angle converter are bonded to each other can be suppressed, and separation of the angle converter from the light guide can be effectively suppressed.

Additional Remark 6

The light source apparatus according to any one of the additional remarks 1 to 5, wherein
the base and the cover member are each capable of heat dissipation.

According to the configuration described above, the heat transferred from the light guide and the angle converter can be readily dissipated by the base and the cover member out of the light source apparatus. The light source apparatus can therefore readily output light in a stable manner.

Additional Remark 7

The light source apparatus according to any one of the additional remarks 1 to 6, wherein
an area of a cross section of the light guide that is perpendicular to the first direction is greater than or equal to 0.25 mm$^2$ but smaller than or equal to 4.00 mm$^2$.

According to the configuration described above, the angle converter attached to the thin light guide as described above tends to separate from the light guide.

In contrast, since the second accommodating section and the cover member, which form the accommodating space, which accommodates the accommodated section described above, are unlikely to come into contact with the angle converter, separation of the angle converter from the thin light guide can be effectively suppressed.

Additional Remark 8

The light source apparatus according to any one of the additional remarks 1 to 7, wherein
the light source outputs excitation light, and
the light guide is a wavelength converter configured to convert a wavelength of the incident excitation light and output converted light as a result of the conversion.

According to the configuration described above, the light guide can convert the wavelength of the excitation light output from the light source and output the converted light. Since the light guide extends in the first direction, the optical path along which the incident excitation light travels inside the light guide can be prolonged. The efficiency at which the light guide converts the excitation light into the converted light can be increased.

Additional Remark 9

A projector including:
the light source apparatus according to any one of the additional remarks 1 to 8;
a light modulator configured to modulate light output from the light source apparatus to form image light; and
a projection optical apparatus configured to project the image light.

According to the configuration described above, the same advantages as those provided by the light source apparatus described above can be provided, and the projector can output the image light in a stable manner.

Additional Remark 10

A light source apparatus including:
a light guide having a side surface extending in a first direction and a first end surface that intersects with the side surface;
an angle converter bonded to the first end surface and configured to convert an angle of light output via the first end surface;
a base at which the light guide is disposed;
a substrate on which a light source configured to output light toward the side surface is mounted, the substrate disposed at a side opposite the base with the light guide therebetween, the substrate fixed to the base; and
a cover member having a first inner surface configured to form along with the base an accommodating space configured to accommodate an accommodated section that is a portion from the angular converter to a portion of the light guide that faces the angular converter, the cover member disposed at a side opposite the base with the angular converter therebetween, the cover member fixed to the base,
wherein the base includes
a first accommodating section to which the light guide is fixed in a state in which the side surface is exposed, and
a second accommodating section having a second inner surface configured to form along with the cover member the accommodating space, the second accommodating section configured to accommodate along with the cover member the accommodated section in the accommodating space,
a portion of the light guide that is fixed to the first accommodating section is a fixed end,
a portion of the light guide that has the first end surface, to which the angle converter is bonded, and faces the angle converter is a free end, and
the angular converter is in contact with none of the first and second inner surfaces.

According to the configuration described above, the accommodating space formed by the second accommodating section and the cover member accommodates the accommodated section, which is the portion from the angle converter to the portion of the light guide that faces the angle converter, as in the light source apparatus described above. No external force thus does not act on the circumferential surface of the angle converter around the optical axis of the angle converter.

In addition, a portion of the light guide that faces the angle converter is a free end of the light guide, and the angle converter is in contact with none of the first and second inner surfaces. Therefore, when the light guide expands or contracts or when the light source apparatus falls or is otherwise displaced so that an external force acts on the angle converter, and even when the angle converter therefore moves or swings in the accommodating space, the angle converter comes into contact with none of the first and second inner surfaces. The situation in which the angle converter, for example, comes into contact with the second accommodating section and the cover member and an external force therefore acts on the angle converter can thus be suppressed, and separation of the angle converter from the light guide can be suppressed. The light source apparatus can therefore output light in a stable manner.

Additional Remark 11

A light source apparatus including:
a light guide having a side surface extending in a first direction and a first end surface that intersects with the side surface;
an angle converter bonded to the first end surface and configured to convert an angle of light output via the first end surface;
a holder including a holding section configured to hold the side surface and a fixed section fixed to the angular converter, the holder disposed so as to extend over a portion where the light guide and the angular converter are bonded to each other;
a base at which the light guide is disposed;
a substrate on which a light source configured to output light toward the side surface is mounted, the substrate disposed at a side opposite the base with the light guide therebetween, the substrate fixed to the base; and
a cover member having a first inner surface configured to form along with the base an accommodating space configured to accommodate an accommodated section that is a portion from the angular converter to a portion of the light guide that faces the angular converter, the accommodated section including the holder, the cover member disposed at a side opposite the base with the angular converter therebetween, the cover member fixed to the base,
wherein the base includes
a first accommodating section to which the light guide is fixed in a state in which the side surface is exposed, and
a second accommodating section having a second inner surface configured to form along with the cover member the accommodating space, the second accommodating section configured to accommodate along with the cover member the accommodated section in the accommodating space,
a portion of the light guide that is fixed to the first accommodating section is a fixed end,
a portion of the light guide that has the first end surface, to which the angle converter is bonded, and faces the angle converter is a free end, and
the holder is in contact with none of the first and second inner surfaces.

According to the configuration described above, the holder, which includes the holding section, which holds the side surface of the light guide, and the fixed section fixed to the angle converter, is disposed so as to extend over the portion where the light guide and the angle converter are bonded to each other, so that the portion where the light guide and the angle converter are bonded to each other can be protected, as in the light source apparatus described above. Therefore, even when an external force acts on the angle converter, separation of the angle converter from the light guide can be suppressed.

In addition, the accommodated section including the holder is accommodated in the accommodating space formed by the second accommodating section and the cover member. No external force thus does not act on the circumferential surface of the holder around the optical axis of the angle converter.

Furthermore, a portion of the light guide that faces the angle converter is a free end of the light guide, and the holder is in contact with none of the first and second inner surfaces. Therefore, when the light guide expands or contracts or when the light source apparatus falls or is otherwise displaced so that an external force acts on the holder, and even when the holder therefore moves or swings in the accommodating space, the holder comes into contact with none of the first and second inner surfaces. The situation in which the holder, for example, comes into contact with the second accommodating section and the cover member and an external force therefore acts on the holder can thus be suppressed, and separation of the angle converter from the light guide can be suppressed.

The light source apparatus can therefore output light in a stable manner.

Additional Remark 12

A light source apparatus including:
a light outputting member extending in a first direction and configured to output light in the first direction;
a base at which the light outputting member is disposed;
a light source configured to output light to be incident on the light outputting member along a second direction that intersects with the first direction;
a substrate on which the light source is mounted, the substrate disposed at a side opposite the base with the light outputting member therebetween in the second direction, the substrate covering a portion of the light outputting member that is oriented in an opposite direction of the second direction; and
a cover member disposed at a side opposite the base with the light outputting member therebetween,
wherein the light outputting member includes
a light guide extending in the first direction and having a side surface on which the light output from the light source is incident, and an end surface that is located at a position shifted in the first direction and intersects with the side surface, and
an angle converter bonded to the end surface and configured to convert an angle of light output via the end surface,
the base includes
a first accommodating section to which the light guide is fixed in a state in which the side surface is exposed, and
a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at the position shifted in the first direction, and
the accommodated section is not in contact with an inner surface of the accommodating space.

According to the configuration described above, separation of the angle converter from the light guide can be suppressed, and the light source apparatus can output light in a stable manner, as the light source apparatus described above.

Additional Remark 13

A light source apparatus including:
a light outputting member extending in a first direction and configured to output light in the first direction;
a base at which the light outputting member is disposed;
a light source configured to output light to be incident on the light outputting member along a second direction that intersects with the first direction;
a substrate on which the light source is mounted, the substrate disposed at a side opposite the base with the light outputting member therebetween in the second direction, the substrate covering a portion of the light outputting member that is oriented in an opposite direction of the first direction; and
a cover member disposed at a side opposite the base with the light outputting member therebetween,
wherein the light outputting member includes
a light guide extending in the first direction and having a side surface on which the light output from the light source is incident, and an end surface that is located at a position shifted in the first direction and intersects with the side surface,
an angle converter bonded to the end surface and configured to convert an angle of light output via the end surface, and
a holder including a holding section configured to hold the side surface and a fixed section fixed to the angular converter, the holder disposed so as to extend over a portion where the light guide and the angular converter are bonded to each other,
the base includes
a first accommodating section to which the light guide is fixed in a state in which the side surface is exposed, and
a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at a position shifted in the first direction, the accommodated section including the holder, and
the accommodated section is not in contact with an inner surface of the accommodating space.

According to the configuration described above, separation of the angle converter from the light guide can be suppressed, and the light source apparatus can output light in a stable manner, as the light source apparatus described above.

What is claimed is:
1. A light source apparatus comprising:
a light guide having a side surface extending in a first direction and a first end surface and a second end surface that intersect with the side surface and are located opposite each other;
an angle converter bonded to the first end surface and configured to convert an angle of light output via the first end surface;
a base at which the light guide is disposed;
a substrate on which a light source configured to output light toward the side surface is mounted, the substrate disposed at a side opposite the base with the light guide therebetween to cover the light guide, the substrate fixed to the base; and
a cover member fixed to the base and configured to accommodate along with the base the angle converter, wherein the base includes
a first accommodating section configured to accommodate the light guide in a state in which the side surface is exposed, the light guide fixed to the first accommodating section, and a second accommodating section configured to accommodate along with the cover member an accommodated section that is a portion from the angle converter to a portion of the light guide that faces the angle converter, the second accommodating section and the cover member surround a circumference of the accommodated section and form an accommodating space configured to accommodate the accommodated section, a portion of the light guide that is fixed to the first accommodating section is a fixed end, and a portion of the light guide that has the first end surface, to which the angle converter is bonded, and faces the angle converter is a free end.

2. The light source apparatus according to claim 1, wherein the angle converter is bonded to the first end surface with an adhesive, and the second accommodating section and the cover member, which form the accommodating space, allow movement of the angle converter along the first direction due to at least one of expansion and contraction of the adhesive.

3. The light source apparatus according to claim 1, further comprising a holder including a holding section configured to hold the side surface and a fixed section fixed to the angle converter, the holder extending over a portion where the light guide and the angle converter are bonded to each other, wherein the holder is disposed in the accommodating space.

4. The light source apparatus according to claim 3, wherein the cover member has a first inner surface configured to form the accommodating space, the second accommodating section has a second inner surface configured to form the accommodating space, and the holder is in contact with none of the first inner surface and the second inner surface.

5. The light source apparatus according to claim 1, further comprising:

a reflector disposed at the second end surface and configured to reflect, toward the light guide, light output via the second end surface; and an urging member fixed to the base and configured to urge the reflector against the second end surface.

6. The light source apparatus according to claim 1, wherein the base and the cover member are each capable of heat dissipation.

7. The light source apparatus according to claim 1, wherein an area of a cross section of the light guide that is perpendicular to the first direction is greater than or equal to 0.25 mm$^2$ but smaller than or equal to 4.00 mm$^2$.

8. The light source apparatus according to claim 1, wherein the light source outputs excitation light, and the light guide is a wavelength converter configured to convert a wavelength of the incident excitation light and output converted light as a result of the conversion.

9. A projector comprising:

the light source apparatus according to claim 1;

a light modulator configured to modulate light output from the light source apparatus to form image light; and a projection optical apparatus configured to project the image light.

10. A light source apparatus comprising:

a light guide having a side surface extending in a first direction and a first end surface that intersects with the side surface;

an angle converter bonded to the first end surface and configured to convert an angle of light output via the first end surface;

a base at which the light guide is disposed;

a substrate on which a light source configured to output light toward the side surface is mounted, the substrate disposed at a side opposite the base with the light guide therebetween, the substrate fixed to the base; and a cover member having a first inner surface configured to form along with the base an accommodating space configured to accommodate an accommodated section that is a portion from the angular converter to a portion of the light guide that faces the angular converter, the cover member disposed at a side opposite the base with the angular converter therebetween, the cover member fixed to the base, wherein the base includes a first accommodating section to which the light guide is fixed in a state in which the side surface is exposed, and a second accommodating section having a second inner surface configured to form along with the cover member the accommodating space, the second accommodating section configured to accommodate along with the cover member the accommodated section in the accommodating space, a portion of the light guide that is fixed to the first accommodating section is a fixed end, a portion of the light guide that has the first end surface, to which the angle converter is bonded, and faces the angle converter is a free end, and the angular converter is in contact with none of the first and second inner surfaces.

11. A light source apparatus comprising:

a light guide having a side surface extending in a first direction and a first end surface that intersects with the side surface;

an angle converter bonded to the first end surface and configured to convert an angle of light output via the first end surface;

a holder including a holding section configured to hold the side surface and a fixed section fixed to the angular converter, the holder disposed so as to extend over a portion where the light guide and the angular converter are bonded to each other;

a base at which the light guide is disposed;

a substrate on which a light source configured to output light toward the side surface is mounted, the substrate disposed at a side opposite the base with the light guide therebetween, the substrate fixed to the base; and a cover member having a first inner surface configured to form along with the base an accommodating space configured to accommodate an accommodated section that is a portion from the angular converter to a portion of the light guide that faces the angular converter, the accommodated section including the holder, the cover member disposed at a side opposite the base with the angular converter therebetween, the cover member fixed to the base, wherein the base includes a first accommodating section to which the light guide is fixed in a state in which the side surface is exposed, and a second accommodating section having a second inner surface configured to form along with the cover member the accommodating space, the second accommodating section configured to accommodate along with the cover member the accommodated section in the accommodating space, a portion of the light guide that is fixed to the first accommodating section is a fixed end, a portion of the light guide that has the first end surface, to which the angle converter is bonded, and faces the angle converter is a free end, and the holder is in contact with none of the first and second inner surfaces.

12. A light source apparatus comprising:

a light outputting member extending in a first direction configured to output light in the first direction;

a base at which the light outputting member is disposed;

a light source configured to output light to be incident on the light outputting member along a second direction that intersects with the first direction;

a substrate on which the light source is mounted, the substrate disposed at a side opposite the base with the light outputting member therebetween in the second direction, the substrate covering a portion of the light outputting member that is oriented in an opposite direction of the second direction; and a cover member disposed at a side opposite the base with the light outputting member therebetween, wherein the light outputting member includes a light guide extending in the first direction and having a side surface on which the light output from the light source is incident, and an end surface that is located at a position shifted in the first direction and intersects with the side surface, and an angle converter bonded to the end surface and configured to convert an angle of light output via the end surface, the base includes a first accommodating section to which the light guide is fixed in a state in which the side surface is exposed, and a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at the position shifted in the first direction, and the accommodated section is not in contact with an inner surface of the accommodating space.

13. A light source apparatus comprising:

a light outputting member extending in a first direction and configured to output light in the first direction;

a base at which the light outputting member is disposed;

a light source configured to output light to be incident on the light outputting member along a second direction that intersects with the first direction;

a substrate on which the light source is mounted, the substrate disposed at a side opposite the base with the light outputting member therebetween in the second direction, the substrate covering a portion of the light outputting member that is oriented in an opposite direction of the first direction; and a cover member disposed at a side opposite the base with the light outputting member therebetween, wherein the light outputting member includes a light guide extending in the first direction and having a side surface on which the light output from the light source is incident, and an end surface that is located at a position shifted in the first direction and intersects with the side surface, an angle converter bonded to the end surface and configured to convert an angle of light output via the end surface, and a holder including a holding section configured to hold the side surface and a fixed section fixed to the angular converter, the holder disposed so as to extend over a portion where the light guide and the angular converter are bonded to each other, the base includes a first accommodating section to which the light guide is fixed in a state in which the side surface is exposed, and a second accommodating section provided at a position shifted in the first direction from the first accommodating section and configured to form along with the cover member an accommodating space configured to accommodate an accommodated section that is a portion of the light outputting member that is from the angle converter to a portion of the light guide that is located at a position shifted in the first direction, the accommodated section including the holder, and the accommodated section is not in contact with an inner surface of the accommodating space.

* * * * *